(12) United States Patent
Nishimura

(10) Patent No.: US 7,630,142 B2
(45) Date of Patent: Dec. 8, 2009

(54) BENT TYPE ZOOM OPTICAL SYSTEM AND IMAGING SYSTEM USING THE SAME

(75) Inventor: Kazuya Nishimura, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 97 days.

(21) Appl. No.: 11/974,155

(22) Filed: Oct. 10, 2007

(65) Prior Publication Data

US 2008/0180811 A1    Jul. 31, 2008

(30) Foreign Application Priority Data

Oct. 20, 2006    (JP) .............................. 2006-286008
Oct. 20, 2006    (JP) .............................. 2006-286009

(51) Int. Cl.
    *G02B 15/14*    (2006.01)

(52) U.S. Cl. .................. 359/687; 359/686; 359/676

(58) Field of Classification Search .................. 359/676, 359/683, 684, 686, 687, 694, 698
See application file for complete search history.

(56) References Cited

FOREIGN PATENT DOCUMENTS

| JP | 5-113538 | 5/1993 |
|---|---|---|
| JP | 8-327904 | 12/1996 |
| JP | 2001-75008 | 3/2001 |

*Primary Examiner*—David N Spector
(74) *Attorney, Agent, or Firm*—Kenyon & Kenyon LLP

(57) ABSTRACT

The invention relates to a slimmed-down, small-format, high-zoom-ratio bent type zoom optical system that can be tucked away in a lens mount and an imaging system incorporating the same. The bent type zoom optical system or taking system comprises, in order from its object side, a first lens group G1 of positive refracting power, a second lens group G2 of negative refracting power and a reflecting mirror R located on an image side with respect to the second lens group G2 for bending an optical axis at substantially right angles upon zooming. Between the reflecting mirror R and an imaging plane I there are a plurality of lens groups G2 and G4 interposed. For zooming, while the spacing between the first G1 and the second lens group G2 varies, at least one lens group of the plurality of lens groups G2 and G4 lying on the imaging plane side of the reflecting mirror R moves. The reflecting mirror R remains fixed with respect to the imaging plane I during taking operation, and upon tucked away in a lens amount, the angle of the reflecting mirror R varies such that the normal to the reflecting surface is substantially parallel with the optical axis through the first G1 and the second lens group G2, and the first G1 and the second lens group G2 draw near to the reflecting mirror R with a narrowing spacing between them.

16 Claims, 27 Drawing Sheets

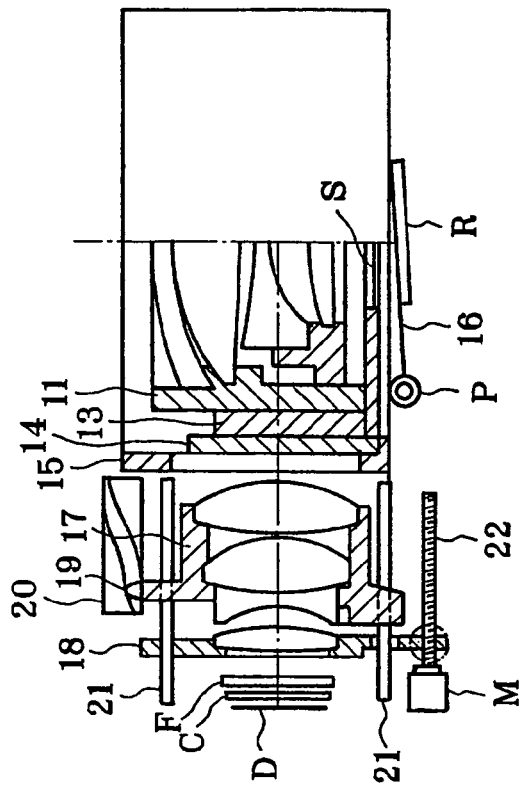
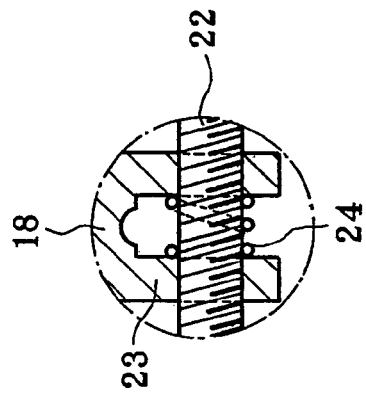
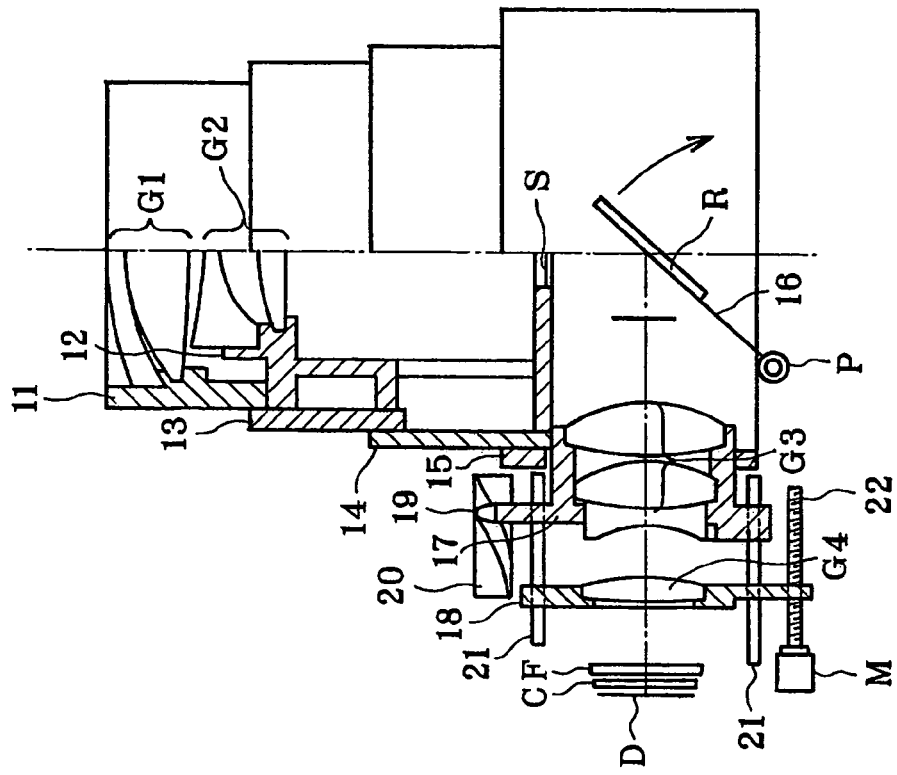
FIG. 22(a)
FIG. 22(b)
FIG. 22(c)

Image processing flowchart

Image processing (compression) chart

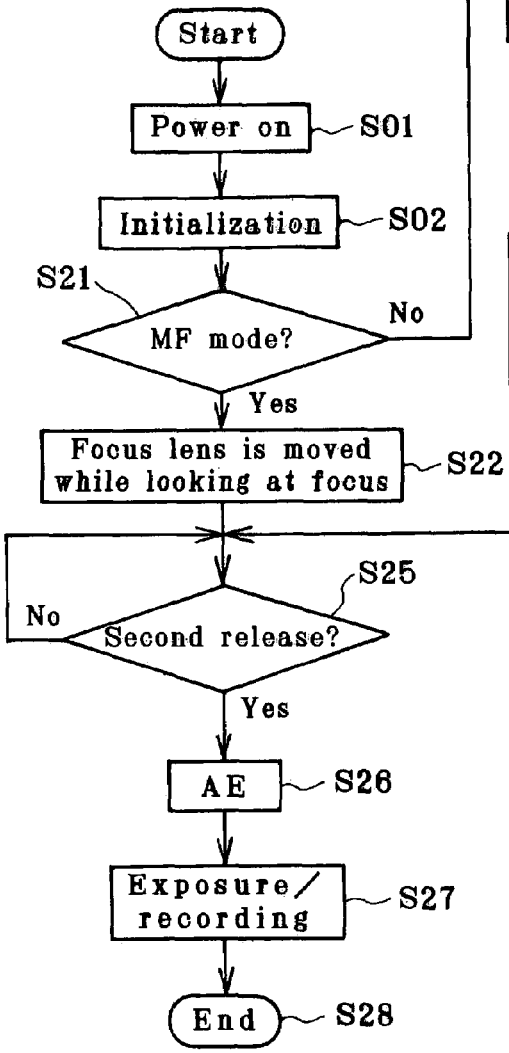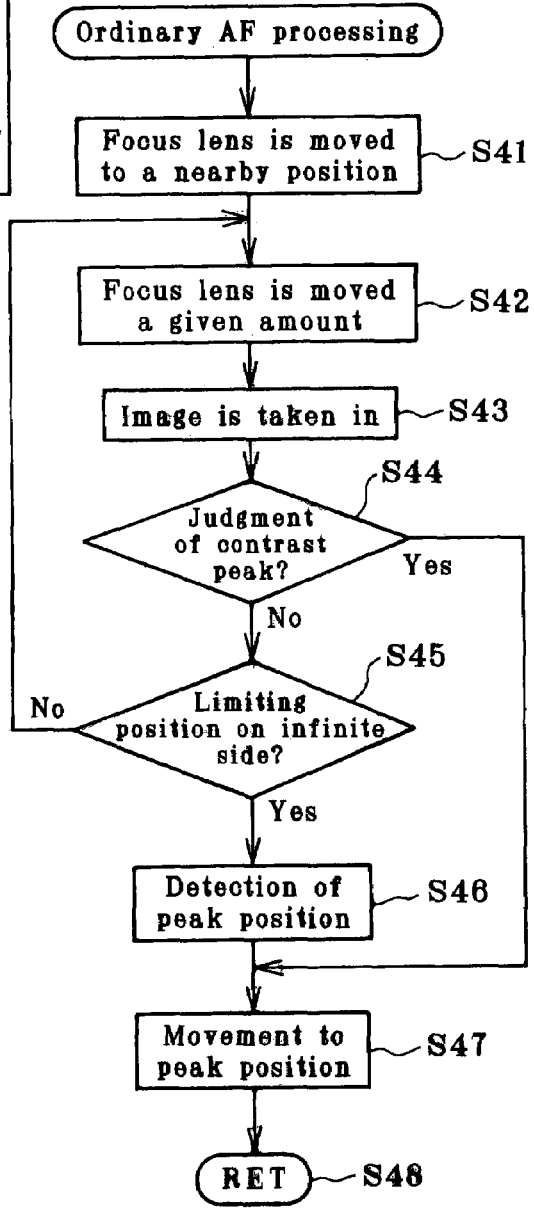

BENT TYPE ZOOM OPTICAL SYSTEM AND IMAGING SYSTEM USING THE SAME

This application claims benefits of Japanese Application No. 2006-286009 filed in Japan on Oct. 20, 2006, the contents of which are incorporated herein by this reference.

BACKGROUND OF THE INVENTION

The present invention relates generally to a bent type zoom optical system and an imaging system incorporating the same, and more particularly to a slimmed-down, small-format yet high-zoom-ratio bent type zoom optical system that can be tucked away in a lens mount and an imaging system incorporating the same.

In recent years, electronic imaging device-incorporated imaging systems like digital still cameras have caught on. With the development and increasing use of digital still cameras, there are now growing demands for higher image quality and further size reductions and, among others, there are strong demands for slimmed-down, high-zoom-ratio yet compact optical systems.

When it comes to a high-zoom-ratio optical system having a long optical length, however, it is not that slimmed down upon received or tucked away in a lens mount even by use of a lens barrel mechanism wherein the spaces between lens groups are simply narrowed down to curtail the whole length of the optical system upon received in the lens mount. To meet those demands, there are some proposals offered as set forth in Patent Publications 1 to 7.

Patent Publication 1 shows a mechanism with which some lens groups are moved back from on the optical axis and tucked away in another site in a lens barrel so that the pileup is slimmed down.

There is also an optical system or mechanism proposed, wherein a reflecting member is used in the optical axis through the lens group nearest to the object side to bend the optical path for thickness reductions, and, as in Patent Publications 2 and 3, there are an optical system and an imaging system proposed as well, wherein lenses on the object side with respect to the reflecting member are tucked away in the lens mount.

Moreover, such mechanisms as set forth in Patent Publications 4, 5 and 6 are made in the art.

Patent Publication 1
JP(A)2003-149723
Patent Publication 2
JP(A)2004-102089
Patent Publication 3
JP(A)2002-169088
Patent Publication 4
JP(A)2005-266173
Patent Publication 5
JP(A)2005-300562
Patent Publication 6
JP(A)7-168096
Patent Publication 7
JP(A)10-20191
Patent Publication 8
JP(A)11-64714

When the mechanism, with which some lens groups are moved back from on the optical axis to curtail the thickness of the optical system upon tucked away in the lens mount, is used as set forth in Patent Publication 1, the presence of a mechanism for making sure the total length of the optical system would incur a contradiction between the thickness of the optical system upon tucked away in the lens mount and an increase in the outer diameter of the lens barrel, unless the optical whole length of the optical system at the time of taking images or the amount of movement of lens groups moving for zooming is reduced. In other words, to slim down the optical system upon received in the lens mount, there is the need of shortening the length of the mechanism for moving forth and back the respective lens groups, which leads to another need of using a lot more structural parts for moving forth them a given length. Such a slimmed-down yet high-zoom-ratio arrangement as in Patent Publication 1 at the same time requires a decrease in the whole length; there is no choice but to strengthen the refracting power of each lens group, resulting in much difficulty in making sure optical performance.

With Patent Publications 2 and 3, much is still desired in view of reductions in the size of the optical system upon received in the lens mount, because an internal reflecting prism is used as the bending means.

Even with the mechanism with which, as in Patent Publication 4, the reflecting member is provided to the lens group nearest to the object side to bend the optical path, there is an obstacle to size reductions, because a high-zoom-ratio arrangement would have its whole length growing longer on the imaging plane side with respect to the reflecting member.

Patent Publications 5 and 6 come up with a lens barrel mechanism, but they do not disclose anything specific about the optical system; they do not disclose any optimum embodiment about the mechanism and optical system necessary for reducing the whole size of the lens barrel.

Patent Publication 7 proposes that the optical axis is bent 90° somewhere along the optical path for size reductions in the optical axis direction. Still, much is desired in view of size reductions of the optical system upon tucked away in the lens mount.

SUMMARY OF THE INVENTION

In consideration of such situations of the prior art as briefed above, the primary object of the invention is to provide a slimmed-down, small-format, high-zoom-ratio bent type zoom lens that can be tucked away in a lens mount, and an imaging system incorporating the same.

According to one embodiment of the first aspect of the invention, the aforesaid object is accomplished by the provision of a bent type zoom optical system comprising, in order from an object side thereof, a first lens group having positive refracting power, a second lens group having negative refracting power, a reflecting mirror located on an image side with respect to the second lens group and adapted to bend an optical axis at substantially right angles upon taking operation, and a plurality of lens groups disposed between the reflecting mirror and an imaging plane wherein for zooming, at least one lens group of the plurality of lens groups located on an imaging plane side with respect to the reflecting mirror moves with a varying spacing between the first lens group and the second lens group, characterized in that the reflecting mirror remains fixed with respect to the imaging plane upon taking operation, and upon tucked away in a lens mount, the reflecting mirror has an angle varying such that the normal to a reflecting surface is substantially parallel with an optical axis through the first lens group and the second lens group, and the first lens group and the second lens group draw near to the reflecting mirror with a narrowing space therebetween.

According to another embodiment of the first aspect of the invention, there is a bent type zoom optical system provided, which comprises, in order from an object side thereof, a first lens group having positive refracting power, a second lens group having negative refracting power, a reflecting member located on an image side with respect to the second lens group and adapted to bend an optical axis at substantially right angles upon taking operation, and a plurality of lens groups disposed between the reflecting member and an imaging plane wherein for zooming, at least one lens group of the plurality of lens groups located on an imaging plane side with respect to the reflecting member moves with a varying spacing between the first lens group and the second lens group, characterized in that:

the reflecting member remains fixed with respect to the imaging plane upon taking operation, and upon tucked away in a lens mount, the reflecting member moves back off optical axis through the first lens group and the second lens group to leave open a space in which the first lens group and the second lens group are tucked away.

The advantages of, and the requirements for, the aforesaid arrangement according to the first embodiment of the first aspect of the invention are now explained.

A zoom optical system with the forefront lens group having positive power is fit for ensuring high zoom ratios and large aperture, but it works a little against size reductions of the system upon received in the lens mount. However, if the optical axis is bent somewhere along an optical path, it is then possible to slim down the optical system in the direction of incidence of light. By moving back the reflecting mirror or member as described above, a space for receiving lens groups on the side of incidence of light is so ensured that the optical system upon received in the lens mount can be slimmed down.

Preferably in such cases, an aperture stop is integral with the reflecting mirror or member or with adjacent lens groups at the time of taking operation.

For the purpose of slimming down the system, it is preferable that the position of the aperture stop is proximate to the reflecting mirror or member to make the size of the moving parts small.

For the zoom optical system it is also preferable to satisfy the following condition (A).

$$-1.2 > f_2/f_w > -3.0 \quad (A)$$

Here $f_w$ is the focal length of the whole zoom optical system at the wide-angle end, and $f_2$ is the focal length of the second lens group.

As the lower limit of −3.0 to condition (A) is not reached, it will causes the position of the entrance pupil to remain deep and the first lens group to grow large, failing to slim down the optical system upon received in the lens mount. As the upper limit of −1.2 is exceeded, it will cause aberration fluctuations to grow large upon zooming, or the second lens group will have to be made up of a lot more lenses for correction of aberrations. In any case, it will be impossible to slim down the optical system during received in the lens mount.

More preferably, condition (A) should be reduced down to $$-1.4 > f_2/f_w > -2.0 \quad (A-1)$$

Set out below are the values of condition (A) in Examples 1, 2, 3 and 4 given later.

|  | Example 1 | Example 2 | Example 3 | Example 4 |
| --- | --- | --- | --- | --- |
| $f_2/f_w$ | −1.47 | −1.85 | −1.51 | −1.96 |

According to one embodiment of the second aspect of the invention, the aforesaid object is accomplished by the provision of a bent type zoom optical system comprising, in order from an object side thereof, a first lens group having positive refracting power, a second lens group negative refracting power and producing the maximum zooming effect upon zooming, a third lens group that includes a shutter and an aperture stop, remains fixed during zooming and has positive refracting power, a reflecting mirror for bending an optical axis at substantially right angles toward an imaging plane side of said third lens group, and at least one or more lens groups including a lens group that moves onto an optical axis bent by said reflecting mirror, characterized in that said second lens group is made up of a plurality of lens components including a single negative lens component.

According to another embodiment of the second aspect of the invention, there is a bent type zoom optical system provided, comprising, in order from an object side thereof, a first lens group having positive refracting power, a second lens group having negative refracting power and adapted to produce the maximum zooming effect upon zooming, a third lens group that includes a shutter and an aperture stop, remains fixed during zooming and has positive refracting power, a fourth lens group having positive refracting power and a fifth lens group having negative refracting power, characterized in that said zoom optical system satisfies the following conditions (1) and (2):

$$-10 < f_t/f_2 < -7 \quad (1)$$

$$-1.8 \leq f_t/f_{tg12} \leq -0.92 \quad (2)$$

where $f_t$ is the focal length of the whole system at the telephoto end, $f_2$ is the focal length of the second lens group, and $f_{tg12}$ is the combined focal length of the first lens group and the second lens group at the telephoto end.

The advantages of, and the requirements for, the aforesaid arrangements according to the second aspect of the invention are now explained.

As described above, if a zoom optical system is comprised of, in order from its object side, a first lens group having positive refracting power, a second lens group having negative refracting power and producing the maximum zooming effect upon zooming, a third lens group that includes a shutter and an aperture stop, remains fixed during zooming and has positive refracting power, and at least one or more lens groups including a lens group that moves during zooming, then that zoom optical system can have a high zoom ratio while the effective diameter of the front lens is kept relatively small.

A high-zoom-ratio optical system, because of having a long total length, makes the structure of a lens barrel unavoidably bulky and complicated. However, if the optical axis is bent somewhere along the optical path, especially on the imaging plane side of the third lens group, it is then possible to slim down that optical system in the direction of incidence of light. For the means for bending the optical axis, the reflecting mirror is superior to a prism in view of the weight and cost of parts.

Preferably in this case, the zoom optical system satisfies the following conditions (1) and (2):

$$-10 < f_t/f_2 < -7 \quad (1)$$

$$-1.8 \leq f_t/f_{tg12} \leq 0.92 \quad (2)$$

where $f_t$ is the focal length of the whole system at the telephoto end, $f_2$ is the focal length of the second lens group, and $f_{tg12}$ is the combined focal length of the first lens group and the second lens group at the telephoto end.

Condition (1) is about the focal length of the second lens group that produces the maximum zooming effect. As the upper limit of −7 to that is exceeded, it will cause the amount of movement of the second lens group to grow large, rendering the lens barrel bulky or complicated. As the lower limit of −10 is not reached, it will cause the sharing of the second lens group in zooming to grow large, giving rise to some considerable field tilt on the telephoto side due to the decentration of the second lens group.

Condition (2) is about the combined focal length of the first lens group and the second lens group at the telephoto end. As the upper limit of −0.92 to that is exceeded, it will cause the sharing of the second lens group in zooming to grow large with the result that it will be difficult to offer a sensible tradeoff between spherical aberrations on the telephoto side and off-axis aberrations on the wide-angle side, and the position of the entrance pupil will remain deep, resulting in an increase in the effective diameter of the first lens group and, hence, the inability to make the outer diameter of the lens barrel slender. As the lower limit of −1.8 is not reached, it will give rise to a large fluctuation of the position of the entrance pupil, which will fail to make sure the quantity of rim rays.

It is also desired that upon received in the lens mount, the first lens group, the second lens group and the third lens group are received in a collapsible lens mount while the spacing between adjacent lens groups becomes narrow, and it is further desired that they are received in the collapsible lens mount while the angle of the reflecting mirror varies such that the normal to the reflecting surface is substantially parallel with the optical axis through the third lens group.

By moving back the reflecting mirror in this way, the space for receiving the lens groups on the side of incidence of light is ensured so that the zoom optical system upon received in the lens mount can be more slimmed down.

The invention also includes an imaging system comprising each of the aforesaid bent type zoom optical systems and an imaging device located on an image side of the bent type zoom optical system for converting an optical image into electric signals.

Preferably in this case, there is a low-pass filter interposed between the bent type zoom optical system and the imaging device.

According to the invention as described above, it is possible to obtain a slimmed-down, small-format, high-zoom-ratio bent type zoom optical system that can be tucked away in the lens mount.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

BRIEF DESCRIPTION OF THE DRAWINGS

FIG. 22 is illustrative of one example of the mechanical setup for tucking away the inventive bent type zoom optical system in an associated lens mount.

FIG. 27 is one example of the flowchart illustrative of the content of processing implemented when the focus lens at the focusing block is preset at a position focusing at infinity.

DESCRIPTION OF THE PREFERRED EMBODIMENTS

The bent type zoom optical system of the invention is now explained with reference to Examples 1 to 10. FIGS. 1 to 10 are illustrative in lens arrangement section of Examples 1 to 10 at the wide-angle ends (a), in the intermediate states (b) and at the telephoto ends (c), respectively, upon focusing on an infinite object point, with the optical path taken apart. Throughout FIGS. 1 to 10, G1 stands for the first lens group, G2 the second lens group, S an aperture stop, G3 the third lens group, G4 the fourth lens group, G5 the fifth lens group, G6 the sixth lens group, F an optical low-pass filter, C the cover glass of a CCD or an electronic imaging device, and I the image plane of CCD. It is noted that a near infrared sharp cut coating, for instance, may be applied directly to the optical low-pass filter F or, alternatively, an infrared cut absorption filter may be separately provide or a transparent plane plate with a near infrared sharp cut coating applied to the entrance surface may be used.

EXAMPLE 1

Figure 1A:
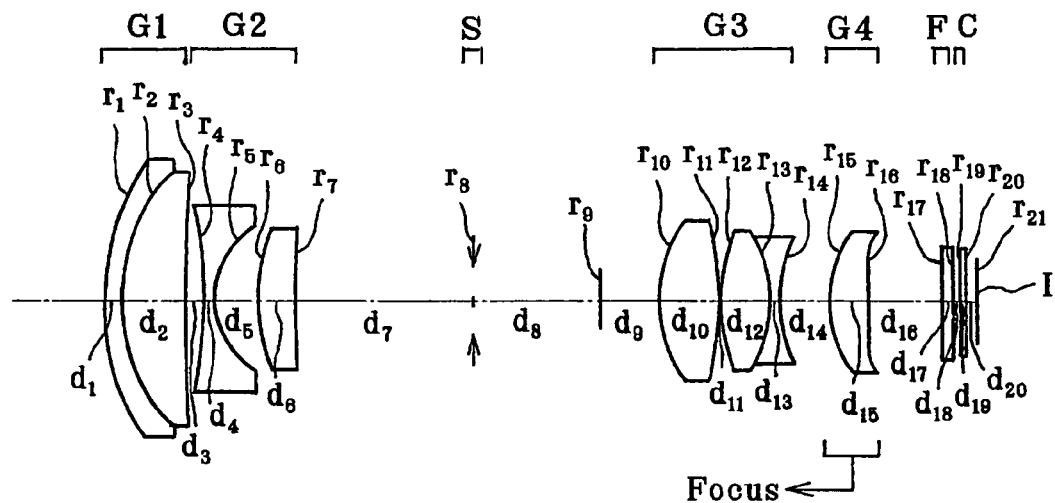
FIG. 1 is illustrative in lens arrangement section of Example 1 of the inventive bent type zoom lens at the wide-angle end (a), in an intermediate state (b) and at the telephoto end (c) upon focusing on an object point at infinity, with the optical path taken apart.
Figure 1B:
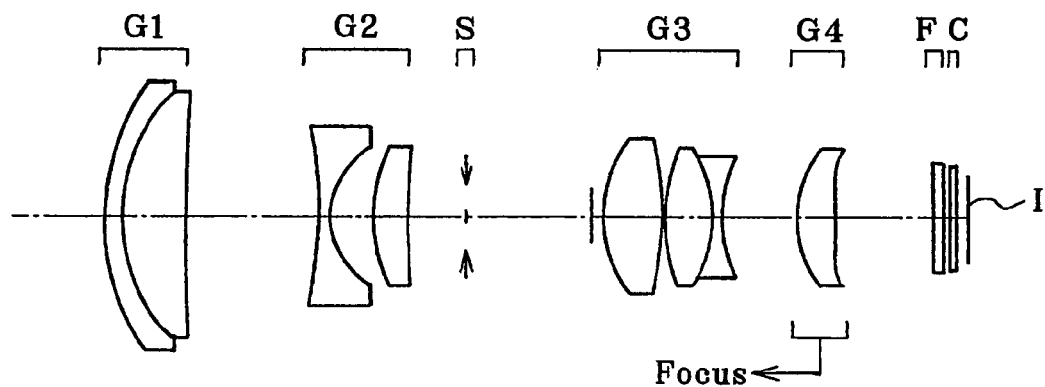
Figure 1C:
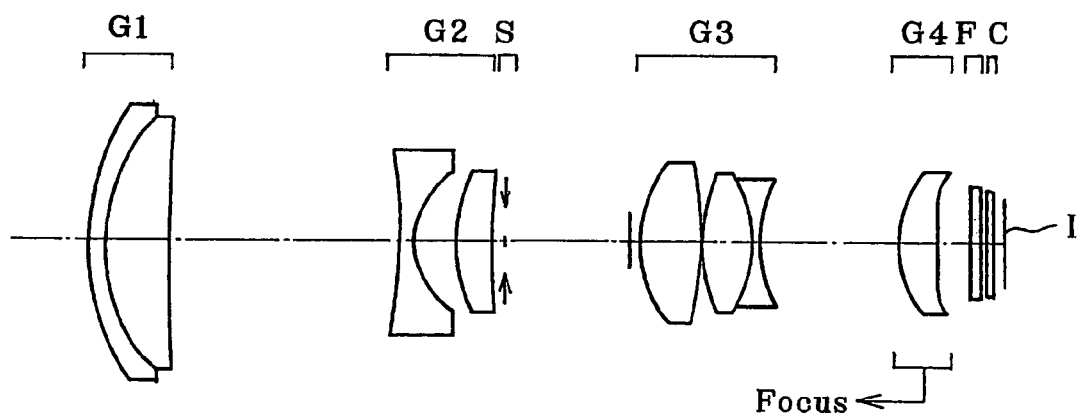

As shown in FIG. 1, this example is directed to a bent type zoom optical system made up of, in order from its object side, the first lens group G1 of positive refracting power, the second lens group G2 of negative refracting power, the aperture stop S, the third lens group G3 of positive refracting power, and the fourth lens group G4 of positive refracting power. Upon zooming from the wide-angle end to the telephoto end, the first lens group G1 moves in a concave orbit toward the object side and positioned more on the object side at the telephoto end than at the wide-angle end. The second lens group G2 moves monotonously toward the image side. The aperture stop S remains fixed, and the third lens group G3 moves toward the object side from the wide-angle end to the intermediate state and remains substantially fixed from the intermediate state to the telephoto end. The fourth lens group G4 moves in a convex orbit toward the object side while the spacing between the third lens group G3 and it grows wide, and positioned more on the image side at the telephoto end than at the wide-angle end.

In order from the object side of the optical system, the first lens group G1 is made up of a cemented lens of a negative meniscus lens convex on its object side and a positive meniscus lens convex on its object side; the second lens group G2 is made up of a double-concave negative lens and a positive meniscus lens convex on its object side; the third lens group G3 is made up of a double-convex positive lens and a cemented lens of a double-convex positive lens and a double-concave negative lens; and the fourth lens group G4 is made up of one double-convex positive lens.

Seven aspheric surfaces are used: one at a surface of the cemented lens in the first lens group G1 wherein said surface is nearest to the image side, two at both surfaces of the double-concave negative lens in the second lens group G2, two at both surfaces of the double-convex positive lens in the third lens group G3, and two at both surfaces of the double-convex positive lens in the fourth lens group G4.

And the $9^{th}$ surface $r_9$ in the numerical data given later is a virtual surface provided in view of the design requirement for preventing interference of the third lens group G3 with the reflecting surface; there is none of anything significant. And then, the reflecting surface for bending the optical axis through 90° is located between the stop S and that virtual surface $r_9$ at an angle of 45° with the optical axis, and that reflecting surface remains fixed in position together with the stop S during taking operation.

EXAMPLE 2

Figure 2A:
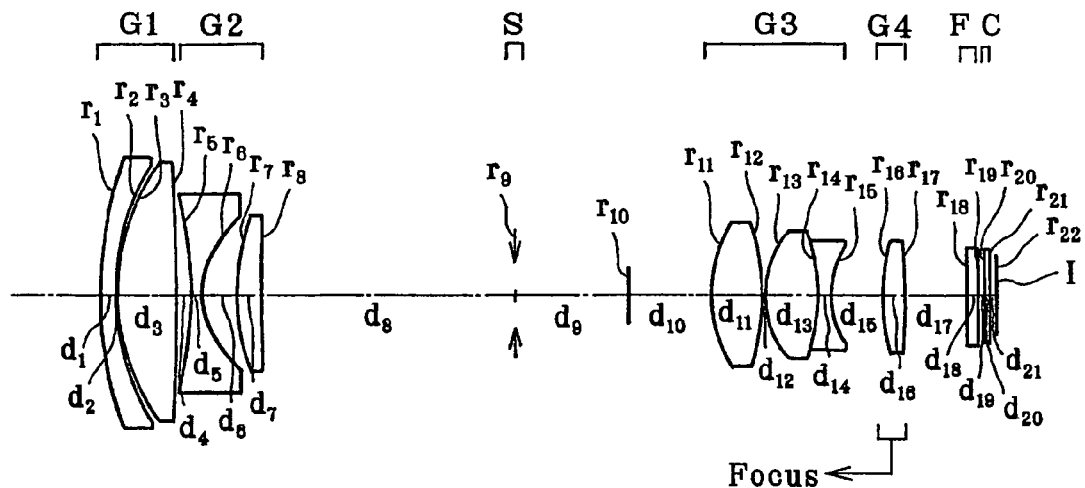
FIG. 2 is illustrative, as in FIG. 1, of Example 2 of the inventive bent type zoom lens.
Figure 2B:
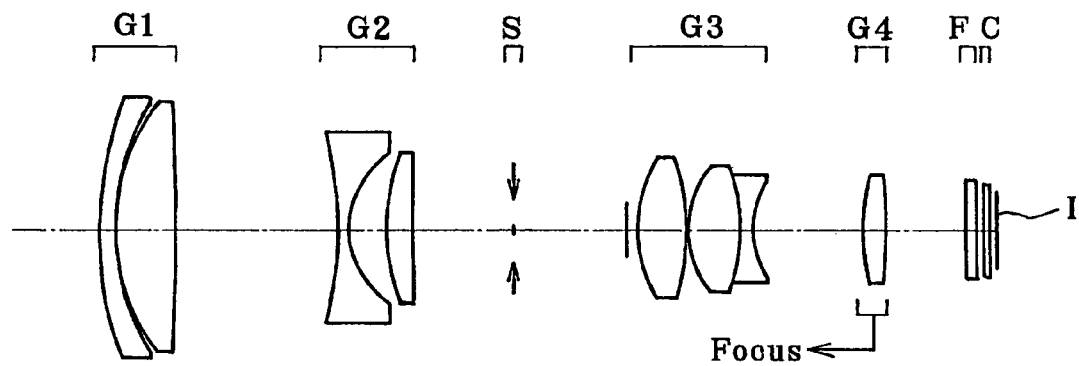
Figure 2C:
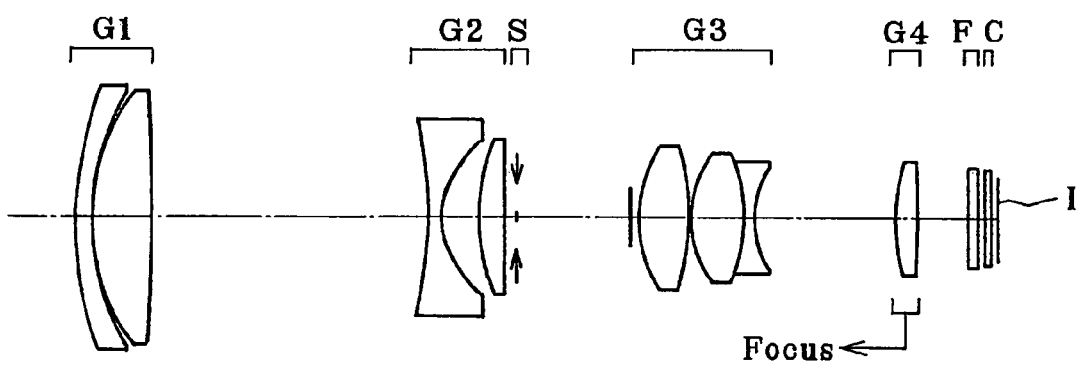

As shown in FIG. 2, this example is directed to a bent type zoom optical system made up of, in order from its object side, the first lens group G1 of positive refracting power, the second lens group G2 of negative refracting power, the aperture stop S, the third lens group G3 of positive refracting power, and the fourth lens group G4 of positive refracting power. Upon zooming from the wide-angle end to the telephoto end, the first lens group G1 remains substantially fixed from the wide-angle end to the intermediate state and moves toward the object side from the intermediate state to the telephoto end. The second lens group G2 moves monotonously toward the image side. The aperture stop S remains fixed, and the third lens group G3 moves toward the object side from the wide-angle end to the intermediate state and remains substantially fixed from the intermediate state to the telephoto end. The fourth lens group G4 moves in a convex orbit toward the object side while the spacing between the third lens group G3 and it grows wide, and positioned more on the image side at the telephoto end than at the wide-angle end.

In order from the object side of the optical system, the first lens group G1 is made up of a negative meniscus lens convex on its object side and a double-convex positive lens; the second lens group G2 is made up of a double-concave negative lens and a positive meniscus lens convex on its object side; the third lens group G3 is made up of a double-convex positive lens and a cemented lens of a double-convex positive lens and a double-concave negative lens; and the fourth lens group G4 is made up of one double-convex positive lens.

Six aspheric surfaces are used: one at the image-side surface of the double-convex positive lens in the first lens group G1, two at both surfaces of the double-concave negative lens in the second lens group G2, two at both surfaces of the double-convex positive lens in the third lens group G3, and one at the object-side surface of the double-convex positive lens in the fourth lens group G4.

And the $10^{th}$ surface $r_{10}$ in the numerical data given later is a virtual surface provided in view of the design requirement for preventing interference of the third lens group G3 with the reflecting surface; there is none of anything significant. And then, the reflecting surface for bending the optical axis through 90° is located between the stop S and that virtual surface $r_{10}$ at an angle of 45° with the optical axis, and that reflecting surface remains fixed in position together with the stop S during taking operation.

EXAMPLE 3

Figure 3A:
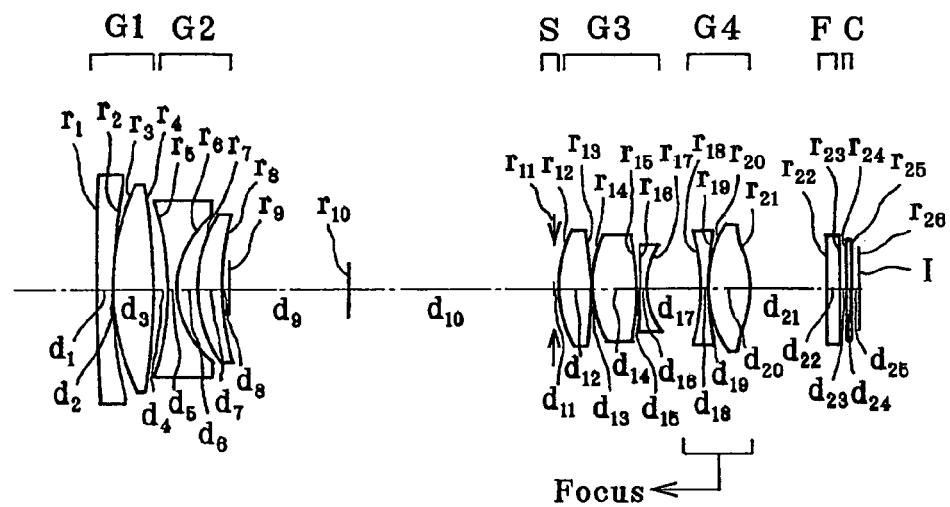
FIG. 3 is illustrative, as in FIG. 1, of Example 3 of the inventive bent type zoom lens.
Figure 3B:
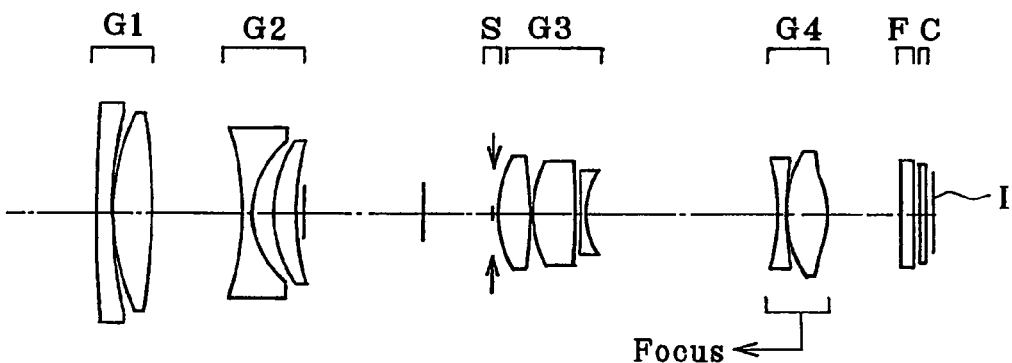
Figure 3C:
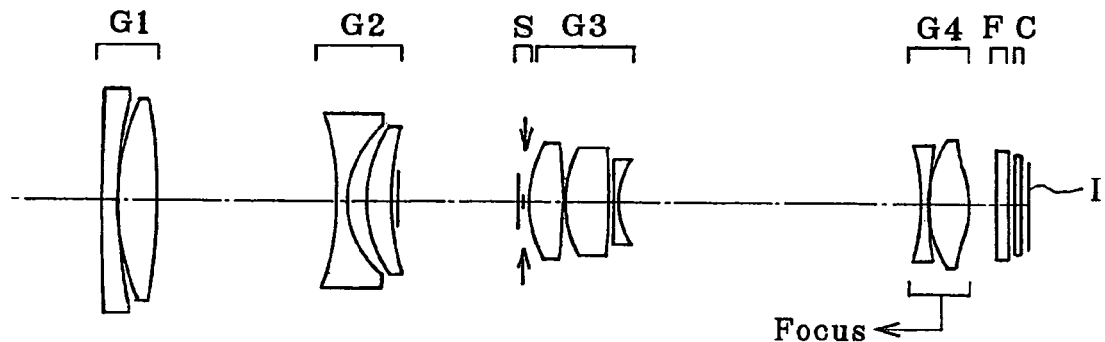

As shown in FIG. 3, this example is directed to a bent type zoom optical system made up of, in order from its object side, the first lens group G1 of positive refracting power, the second lens group G2 of negative refracting power, the aperture stop S, the third lens group G3 of positive refracting power and the fourth lens group G4 of negative refracting power. Upon zooming from the wide-angle end to the telephoto end, the first lens group G1 moves toward the object side. The second lens group G2 remains fixed, and the aperture stop S moves monotonously toward object side together with the third lens group G3. The fourth lens group G4 moves toward the image side.

In order from the object side of the optical system, the first lens group G1 is made up of a negative meniscus lens convex on its object side and a double-convex positive lens; the second lens group G2 is made up of a double-concave negative lens and a positive meniscus lens convex on its object side; the third lens group G3 is made up of a double-convex positive lens; a double-convex positive lens and a negative meniscus lens convex on its object side; and the fourth lens group G4 is made up of a double-concave negative lens and a double-convex positive lens.

Seven aspheric surfaces are used: one at the image-side surface of the double-convex positive lens in the first lens group G1, two at both surfaces of the double-concave negative lens in the second lens group G2, two at both surfaces of the double-convex positive lens on the object side of the third lens group G3, and two at both surfaces of the double-convex positive lens in the fourth lens group G4.

And the 9$^{th}$ surface $r_9$ and the 10$^{th}$ surface $r_{10}$ in the numerical data given later are virtual surfaces provided in view of the design requirement for preventing interference of the second lens group G2 and the stop S with the reflecting surface; there is none of anything significant. And then, the reflecting surface for bending the optical axis through 90° is located between the two virtual surfaces $r_9$ and $r_{10}$ at an angle of 45° with the optical axis, and that reflecting surface remains fixed in position together with the stop S during taking operation.

EXAMPLE 4

Figure 4A:
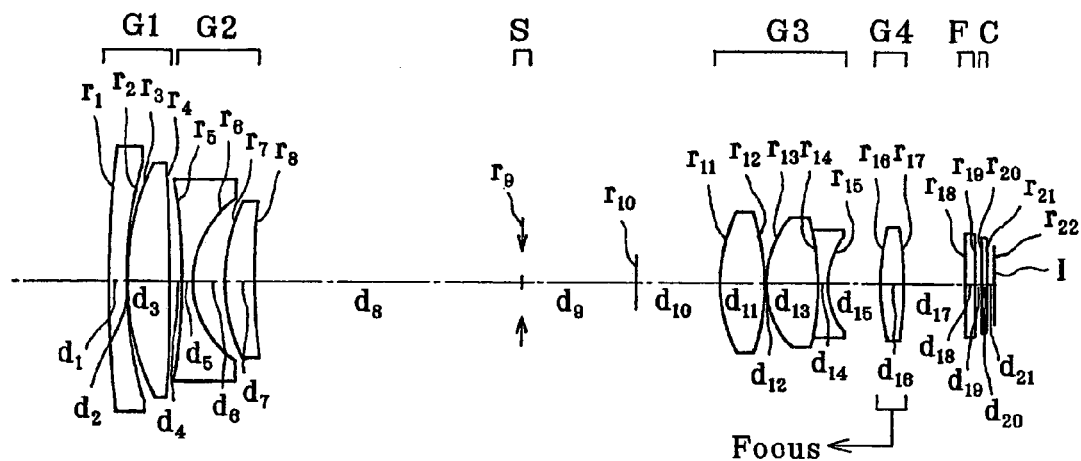
FIG. 4 is illustrative, as in FIG. 1, of Example 4 of the inventive bent type zoom lens.
Figure 4B:
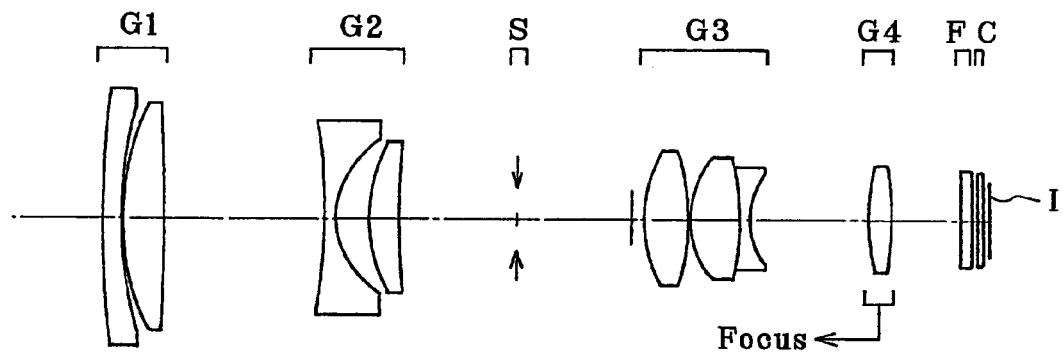
Figure 4C:
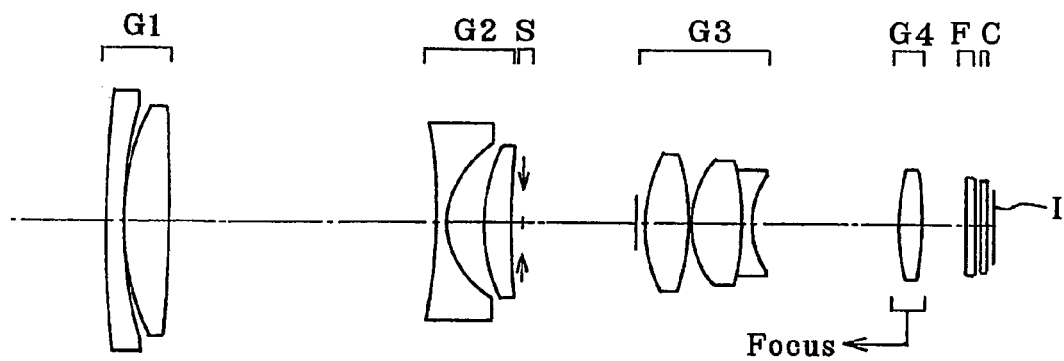

As shown in FIG. 4, this example is directed to a bent type zoom optical system made up of, in order from its object side, the first lens group G1 of positive refracting power, the second lens group G2 of negative refracting power, the aperture stop S, the third lens group G3 of positive refracting power and the fourth lens group G4 of positive refracting power. Upon zooming from the wide-angle end to the telephoto end, the first lens group G1 remains fixed, and the second lens group G2 moves monotonously toward the image side. The aperture stop S remains fixed, the third lens group G3 moves toward the object side, and the fourth lens group G4 moves toward the image side.

In order from the object side of the optical system, the first lens group G1 is made up of a negative meniscus lens convex on its object side and a double-convex positive lens; the second lens group G2 is made up of a double-concave negative lens and a positive meniscus lens convex on its object side; the third lens group G3 is made up of a double-convex positive lens and a cemented lens of a double-convex positive lens and a double-concave negative lens; and the fourth lens group G4 is made up of one double-convex positive lens.

Six aspheric surfaces are used: one at the image-side surface of the double-convex positive lens in the first lens group G1, two at both surfaces of the double-concave negative lens in the second lens group G2, two at both surfaces of the double-convex positive lens in the third lens group G3, and one at the object-side surface of the double-convex positive lens in the fourth lens group G4.

And the 10$^{th}$ surface $r_{10}$ in the numerical data given later is a virtual surface provided in view of the design requirement for preventing interference of the third lens group G3 with the reflecting surface; there is none of anything significant. And then, the reflecting surface for bending the optical axis through 90° is located between the stop S and that virtual surface $r_{10}$ at an angle of 45° with the optical axis, and that reflecting surface remains fixed in position together with the stop S during taking operation.

EXAMPLE 5

Figure 5A:
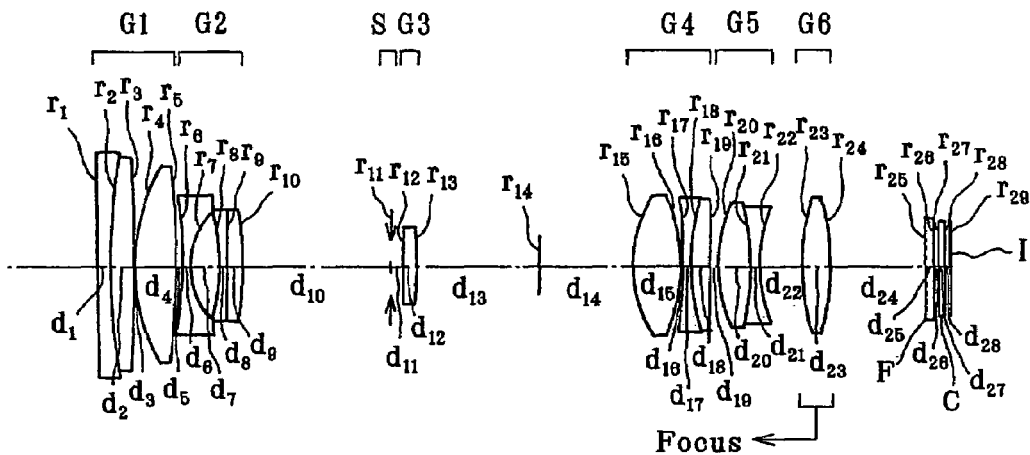
FIG. 5 is illustrative, as in FIG. 1, of Example 5 of the inventive bent type zoom lens.
Figure 5B:
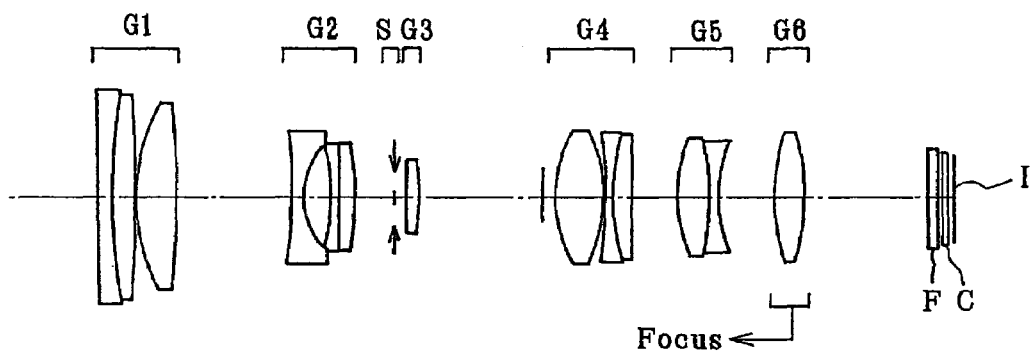
Figure 5C:
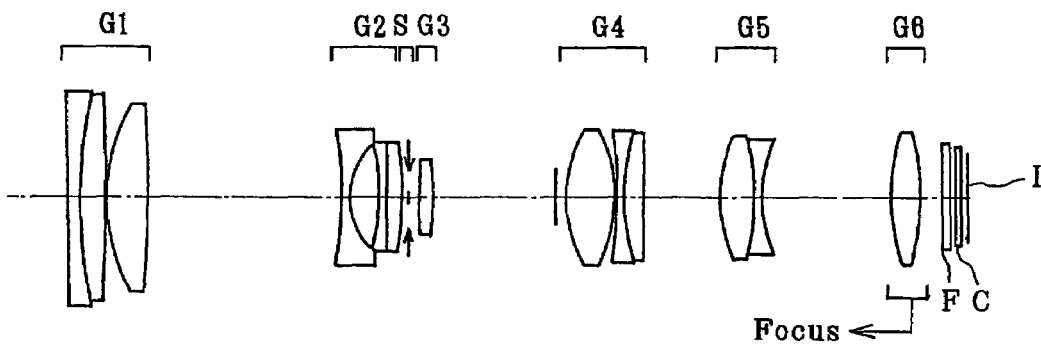

As shown in FIG. 5, this example is directed to a bent type zoom optical system made up of, in order from its object side, the first lens group G1 of positive refracting power, the second lens group G2 of negative refracting power, the aperture stop S, the third lens group G3 of positive refracting power, the fourth lens group G4 of positive refracting power, the fifth lens group G5 of negative refracting power and the sixth lens group G6 of positive refracting power. Upon zooming from the wide-angle end to the telephoto end of the optical system, the first lens group G1 moves toward the object side, and the second lens group G2 moves monotonously to the image side. The aperture stop S and the third lens group G3 remain fixed, the fourth lens group G4 moves toward the object side, and the fifth lens group G5 moves in a convex orbit toward the object side while the spacing between the fourth lens group G4 and it grows wide and positioned a bit more on the object side at the telephoto end than at the wide-angle end. The sixth lens group G6 moves in a convex orbit toward the object side while the spacing between the fifth lens group G5 and it grows wide and positioned more on image side at the telephoto end than at the wide-angle end.

In order from the object side of the optical system, the first lens group g1 is made up of a cemented lens of a negative meniscus lens convex on its object side and a double-convex positive lens; the second lens group G2 is made up of a double-concave negative lens and a cemented lens of a negative meniscus lens convex on its image side and a positive meniscus lens convex on its image side; the third lens group G3 is made up of one double-convex positive lens; the fourth lens group G4 is made up of a double-convex positive lens and a cemented lens of a double-concave negative lens and a double-convex positive lens; the fifth lens group G5 is made up of a cemented lens of a double-convex positive lens and a double-concave negative lens; and the sixth lens group G6 is made up of one double-convex positive lens.

Six aspheric surfaces are used: two at both surfaces of the single lens or the double-convex positive lens in the first lens group G1, one at the image-side surface of the double-concave negative lens in the second lens group G2, two at both surfaces of the single lens or the double-convex positive lens in the fourth lens group G4, and one at the image-side surface of the double-convex positive lens in the sixth lens group G6.

And the 14$^{th}$ surface $r_{14}$ in the numerical data given later is a virtual surface provided in view of the design requirement for preventing interference of the fourth lens group G4 with the reflecting surface; there is none of anything significant. And then, the reflecting surface for bending the optical axis substantially at right angles (e.g., 90°) is located between the third lens group G3 and that virtual surface $r_{14}$ at an angle of 45° with the optical axis, and that reflecting surface remains fixed in position together with the third lens group G3 during taking operation.

EXAMPLE 6

Figure 6A:
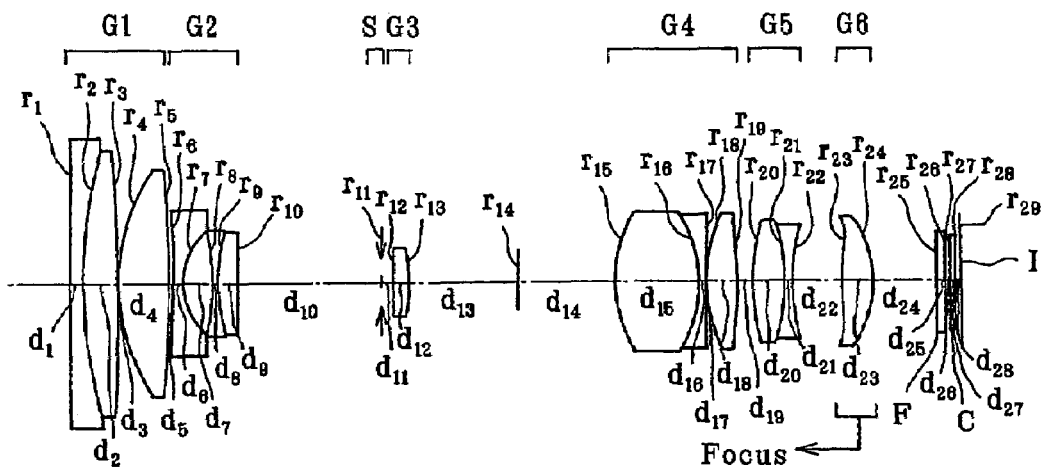
FIG. 6 is illustrative, as in FIG. 1, of Example 6 of the inventive bent type zoom lens.
Figure 6B:
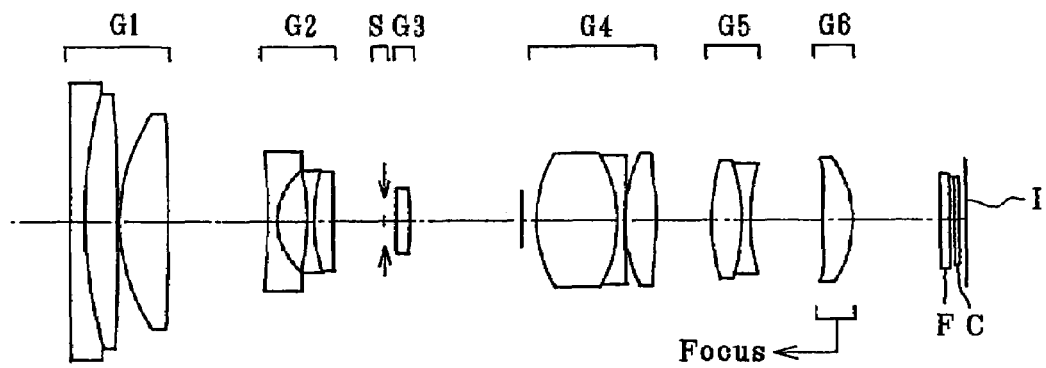
Figure 6C:
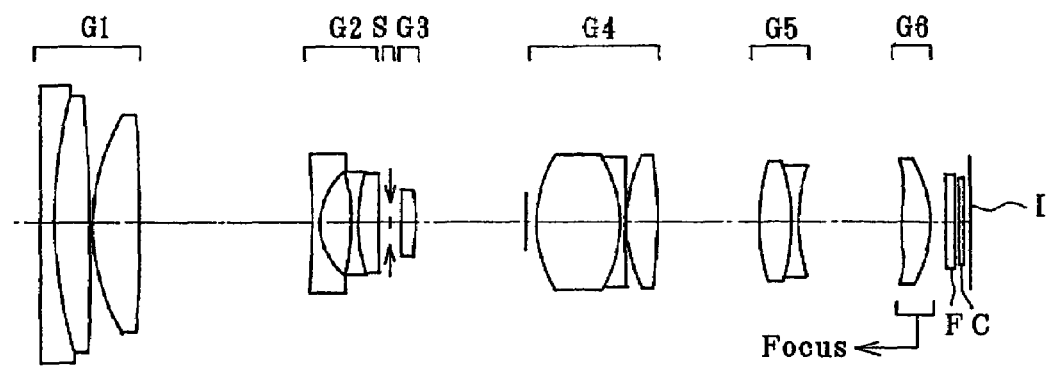

As shown in FIG. 6, this example is directed to a bent type zoom optical system made up of, in order from its object side, the first lens group G1 of positive refracting power, the second lens group G2 of negative refracting power, the aperture stop S, the third lens group G3 of positive refracting power, the fourth lens group G4 of positive refracting power, the fifth lens group G5 of negative refracting power and the sixth lens group G6 of positive refracting power. Upon zooming from the wide-angle end to the telephoto end of the optical system, the first lens group G1 moves toward the object side, and the second lens group G2 moves monotonously toward the image side. The aperture stop S and the third lens group G3 remain fixed, the fourth lens group G4 moves toward the object side, and the fifth lens group G5 moves in a convex orbit toward the object side while the spacing between the fourth lens group G4 and it grows wide and is positioned a bit more on the object side at the telephoto end than at the wide-angle end. The sixth lens group G7 moves in a convex orbit toward the object side while the spacing between the fifth lens group G5 and it grows wide and is positioned more on the image side at the telephoto end than at the wide-angle end.

In order from the object side of the optical system, the first lens group G1 is made up of a cemented lens of a negative meniscus lens convex on its object side and a double-convex positive lens and a double-convex positive lens; the second lens group G2 is made up of a double-concave negative lens and a cemented lens of a double-concave negative lens and a double-convex positive lens; the third lens group G3 is made up of one positive meniscus lens convex on its image side; the fourth lens group G4 is made up of a cemented lens of a double-convex positive lens and a double-concave negative lens and a double-convex positive lens; the fifth lens group G5 is made up of a cemented lens of a double-convex positive lens and a double-concave negative lens; and the sixth lens group G6 is made up of one double-convex positive lens.

Seven aspheric surfaces are used: two at both surfaces of the single lens or the double-convex positive lens in the first lens group G1, one at the image-side surface of the single lens or the double-concave negative lens in the second lens group G2, one at a surface of the cemented lens in the fourth lens group G4 wherein said surface is nearest to the object side, one at the image-side surface of the single lens or the double-convex positive lens in the fourth lens group G4, and two at both surfaces of the double-convex positive lens in the sixth lens group G6.

And the 14$^{th}$ surface $r_{14}$ in the numerical data given later is a virtual surface provided in view of the design requirement for preventing interference of the fourth lens group G4 with the reflecting surface; there is none of anything significant. And then, the reflecting surface for bending the optical axis substantially at right angles (e.g., 90°) is located between the third lens group G3 and that virtual surface $r_{14}$ at an angle of 45° with the optical axis, and that reflecting surface remains fixed in position together with the third lens group G3 during taking operation.

EXAMPLE 7

Figure 7A:
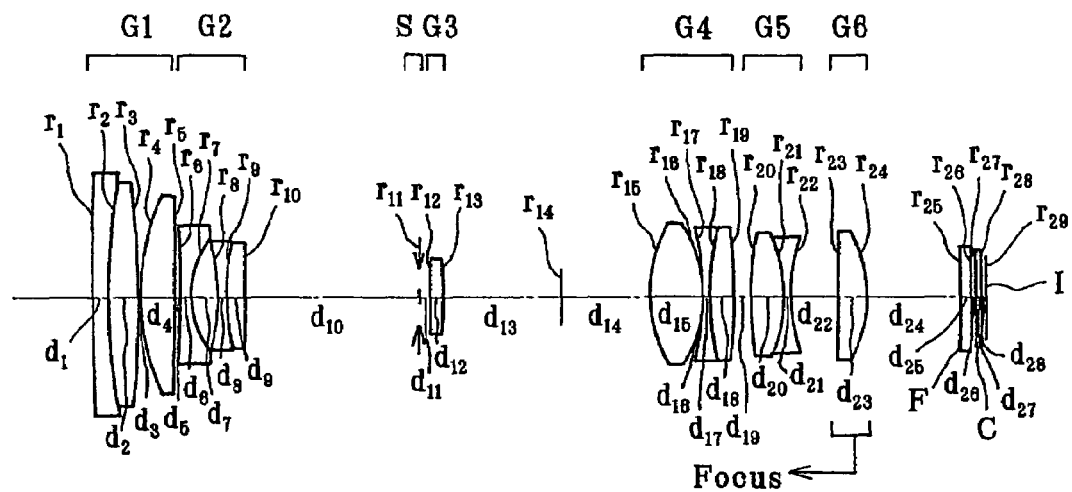
FIG. 7 is illustrative, as in FIG. 1, of Example 7 of the inventive bent type zoom lens.
Figure 7B:
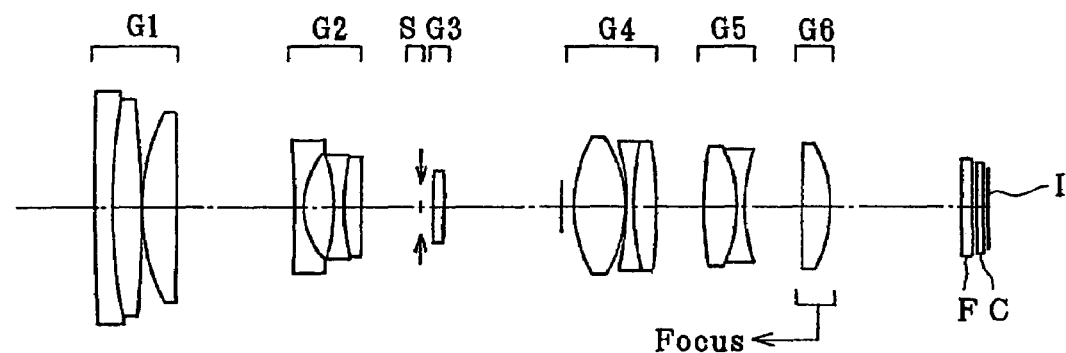
Figure 7C:
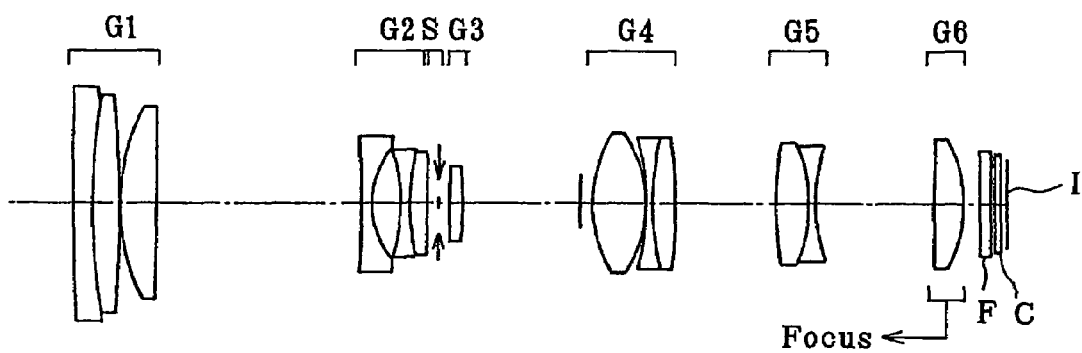

As shown in FIG. 7, this example is directed to a bent type zoom optical system made up of, in order from its object side, the first lens group G1 of positive refracting power, the second lens group G2 of negative refracting power, the aperture stop S, the third lens group G3 of positive refracting power, the fourth lens group G4 of positive refracting power, the fifth lens group G5 of negative refracting power and the sixth lens group G6 of positive refracting power. Upon zooming from the wide-angle end to the telephoto end of the optical system, the first lens group G1 moves in a convex orbit toward the image side and is positioned more on the object side at the telephoto end than at the wide-angle end. The second lens group G2 moves monotonously toward the image side. The aperture stop S and the third lens group G3 remain fixed, and the fourth lens group G4 moves in a convex orbit toward the object side and is positioned more on the object side at the telephoto end than at the wide-angle end. The fifth lens group G5 moves in a convex orbit toward the object side while the spacing between the fourth lens group G4 and it grows wide, and is positioned a bit more on the image side at the telephoto end than at the wide-angle end. The sixth lens group G6 moves in a convex orbit toward the object side while the spacing between the fifth lens group G5 and it grows wide, and is positioned more on the image side at the telephoto end than at the wide-angle end.

In order from the object side of the optical system, the first lens group G1 is made up of a cemented lens of a negative meniscus lens convex on its object side and a double-convex positive lens, and a positive meniscus lens convex on its object side; the second lens group G2 is made up of a double-concave negative lens, and a cemented lens of a double-concave negative lens and a positive meniscus lens convex on its object side; the third lens group G3 is made up of one double-convex positive lens; the fourth lens group G4 is made up of a cemented lens of a double-convex positive lens, and a cemented lens of a double-concave negative lens and a double-convex positive lens; the fifth lens group G5 is made up of a cemented lens of a double-convex positive lens and a double-concave negative lens; and the sixth lens group G6 is made up of one double-convex positive lens.

Seven aspheric surfaces are used: two at both surfaces of the positive meniscus lens in the first lens group G1, one at the image-side surface of the single lens or the double-concave negative lens in the second lens group G2, two at both surfaces of the single lens or the double-convex positive lens in the fourth lens group G4 and two at both surfaces of the double-convex positive lens in the sixth lens group G6.

And the 14$^{th}$ surface $r_{14}$ in the numerical data given later is a virtual surface provided in view of the design requirement for preventing interference of the fourth lens group G4 with the reflecting surface; there is none of anything significant. And then, the reflecting surface for bending the optical axis substantially at right angles (e.g., 90°) is located between the third lens group G3 and that virtual surface $r_{14}$ at an angle of 45° with the optical axis, and that reflecting surface remains fixed in position together with the third lens group G3 during taking operation.

EXAMPLE 8

Figure 8A:
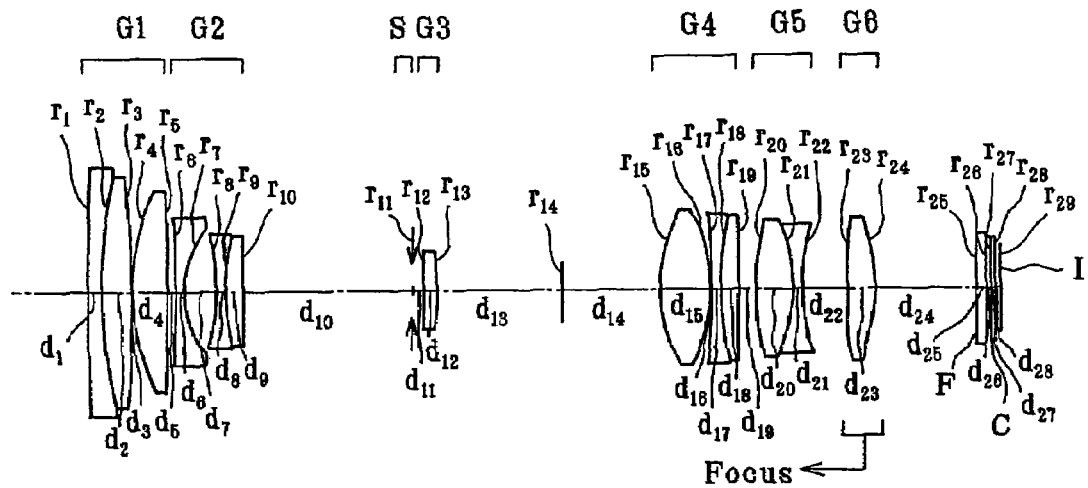
FIG. 8 is illustrative, as in FIG. 1, of Example 8 of the inventive bent type zoom lens.
Figure 8B:
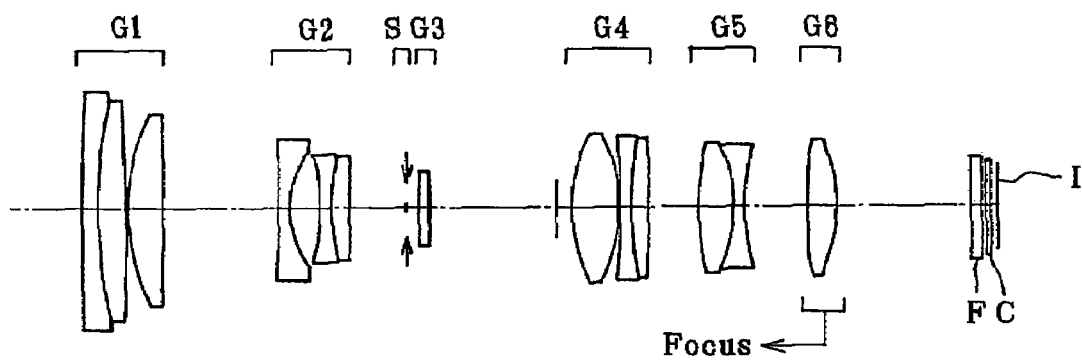
Figure 8C:
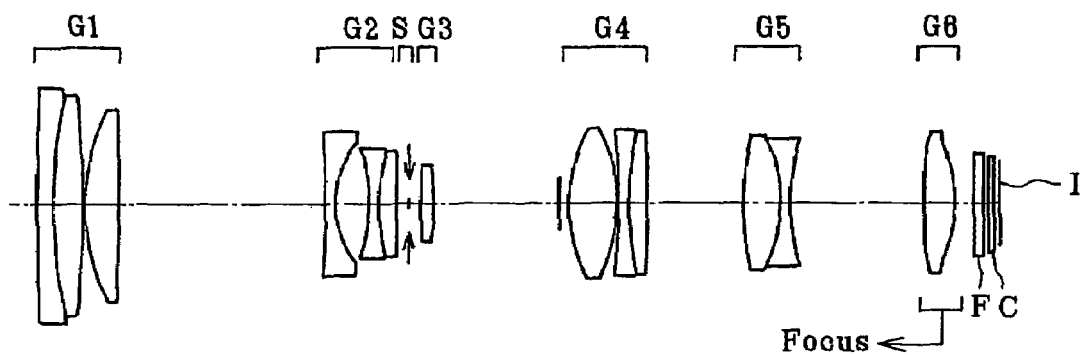

As shown in FIG. 8, this example is directed to a bent type zoom optical system made up of, in order from its object side, the first lens group G1 of positive refracting power, the second lens group G2 of negative refracting power, the aperture stop S, the third lens group G3 of positive refracting power, the fourth lens group G4 of positive refracting power, the fifth lens group G5 of negative refracting power, and the sixth lens group G6 of the positive refracting power. Upon zooming from the wide-angle end to the telephoto end of the optical system, the first lens group G1 moves in a convex orbit toward the image side, and is positioned more on the object side at the telephoto end than at the wide-angle end. The second lens group G2 moves monotonously toward the image side. The aperture stop S and the third lens group G3 remain fixed, the fourth lens group G4 moves toward the object side, and the fifth lens group G5 moves in a convex orbit toward the object side while the spacing between the fourth lens group G4 and it grows wide, and is positioned more on the object side at the telephoto end than at the wide-angle end. The sixth lens group G6 moves in a convex orbit toward the object side while the spacing between the fifth lens group G5 and it grows wide, and is positioned more on the image side at the telephoto end than at the wide-angle end.

In order from the object side of the optical system, the first lens group G1 is made up of a cemented lens of a negative meniscus lens convex on its object side and a double-convex positive lens, and a double-convex positive lens; the second lens group G2 is made up of a double-concave negative lens, and a cemented lens of a double-concave negative lens and a positive meniscus lens convex on its object side; the third lens group G3 is made up of one double-convex positive lens; the fourth lens group G4 is made up of a double-convex positive lens, and a cemented lens of a double-concave negative lens and a double-convex positive lens; the fifth lens group G5 is made up of a cemented lens of a double-convex positive lens and a double-concave negative lens; and the sixth lens group G6 is made up of one double-convex positive lens.

Seven aspheric surfaces are used: two at both surfaces of the double-convex positive lens in the first lens group G1, one at the image-side surface of the single lens or the double-concave negative lens in the second lens group G2, two at both surfaces of the single lens or the double-convex positive lens in the fourth lens group G4, and two at both surfaces of the double-convex positive lens in the sixth lens group G6.

And the 14$^{th}$ surface $r_{14}$ in the numerical data given later is a virtual surface provided in view of the design requirement for preventing interference of the fourth lens group G4 with the reflecting surface; there is none of anything significant. And then, the reflecting surface for bending the optical axis substantially at right angles (e.g., 90°) is located between the third lens group G3 and that virtual surface $r_{14}$ at an angle of 45° with the optical axis, and that reflecting surface remains fixed in position together with the third lens group G3 during taking operation.

EXAMPLE 9

Figure 9A:
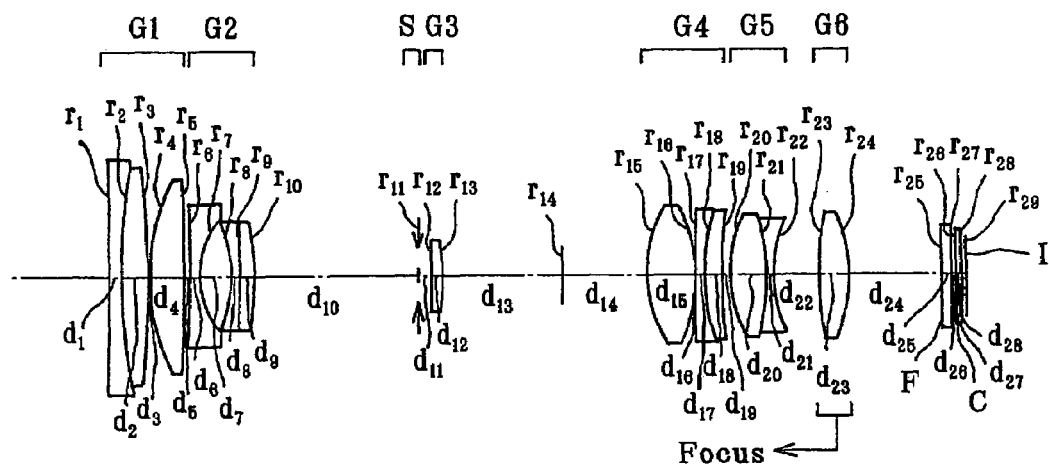
FIG. 9 is illustrative, as in FIG. 1, of Example 9 of the inventive bent type zoom lens.
Figure 9B:
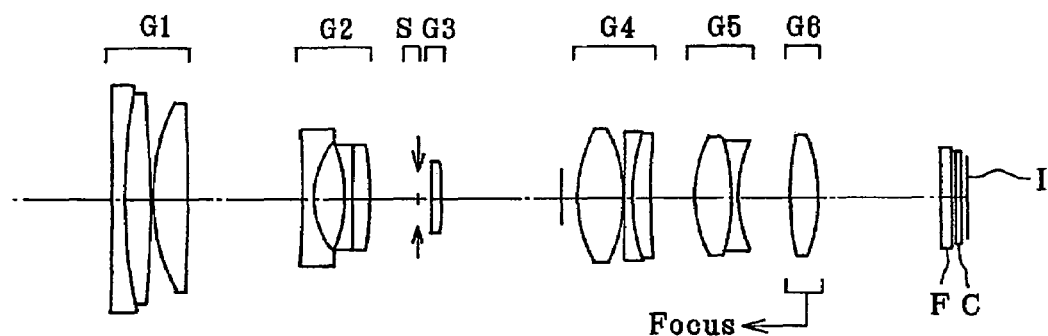
Figure 9C:
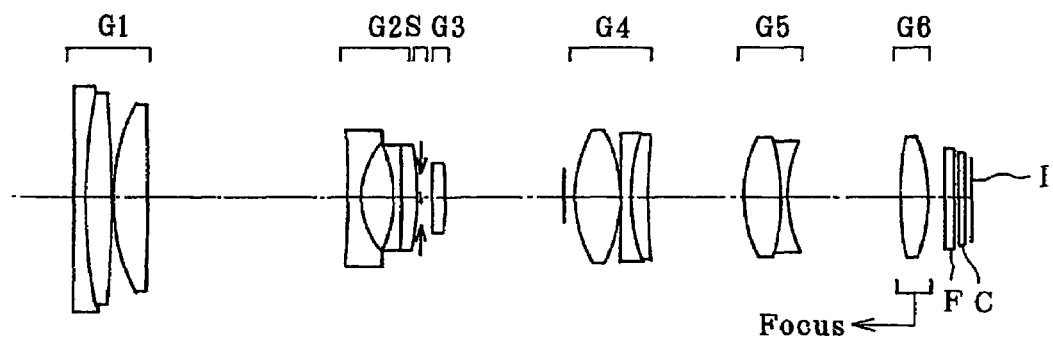

As shown in FIG. 9, this example is directed to a bent type zoom optical system made up of, in order from its object side, the first lens group G1 of positive refracting power, the second lens group G2 of negative refracting power, the aperture stop S, the third lens group G3 of positive refracting power, the fourth lens group G4 of positive refracting power, the fifth lens group G5 of negative refracting power, and the sixth lens group G6 of the positive refracting power. Upon zooming from the wide-angle end to the telephoto end of the optical system, the first lens group G1 moves in a convex orbit toward the image side, and is positioned more on the object side at the telephoto end than at the wide-angle end. The second lens group G2 moves monotonously toward the image side. The aperture stop S and the third lens group G3 remain fixed, the fourth lens group G4 moves toward the object side, and the fifth lens group G5 moves in a convex orbit toward the object side while the spacing between the fourth lens group G4 and it grows wide, and is positioned more on the image side at the telephoto end than at the wide-angle end. The sixth lens group G6 moves in a convex orbit toward the object side while the spacing between the fifth lens group G5 and it grows wide, and is positioned more on the image side at the telephoto end than at the wide-angle end.

In order from the object side of the optical system, the first lens group G1 is made up of a cemented lens of a negative meniscus lens convex on its object side and a double-convex positive lens, and a double-convex positive lens; the second lens group G2 is made up of a double-concave negative lens, and a cemented lens of a negative meniscus lens convex on its image side and a positive meniscus lens convex on its image side; the third lens group G3 is made up of one positive meniscus lens convex on its image side; the fourth lens group G4 is made up of a double-convex positive lens, and a cemented lens of a double-concave negative lens and a positive meniscus lens convex on its object side; the fifth lens group G5 is made up of a cemented lens of a double-convex positive lens and a double-concave negative lens; and the sixth lens group G6 is made up of one double-convex positive lens.

Six aspheric surfaces are used: two at both surfaces of the double-convex positive lens in the first lens group G1, one at the image-side surface of the double-concave negative lens in the second lens group G2, two at both surfaces of the double-convex positive lens in the fourth lens group G4, and one at the image-side surface of the double-convex positive lens in the sixth lens group G6.

And the 14$^{th}$ surface $r_{14}$ in the numerical data given later is a virtual surface provided in view of the design requirement for preventing interference of the fourth lens group G4 with the reflecting surface; there is none of anything significant. And then, the reflecting surface for bending the optical axis substantially at right angles (e.g., 90°) is located between the third lens group G3 and that virtual surface $r_{14}$ at an angle of 45° with the optical axis, and that reflecting surface remains fixed in position together with the third lens group G3 during taking operation.

EXAMPLE 10

Figure 10A:
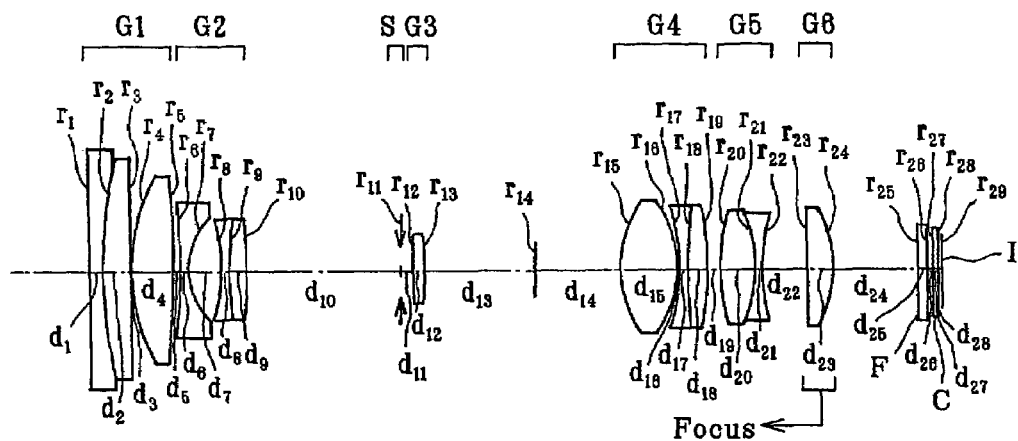
FIG. 10 is illustrative, as in FIG. 1, of Example 10 of the inventive bent type zoom lens.
Figure 10B:
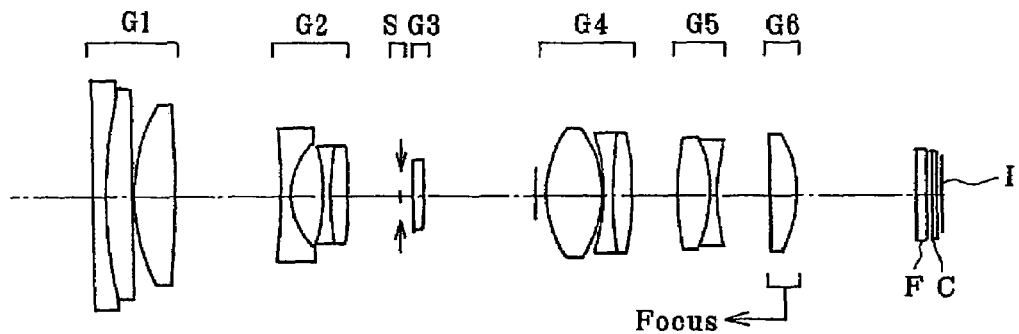
Figure 10C:
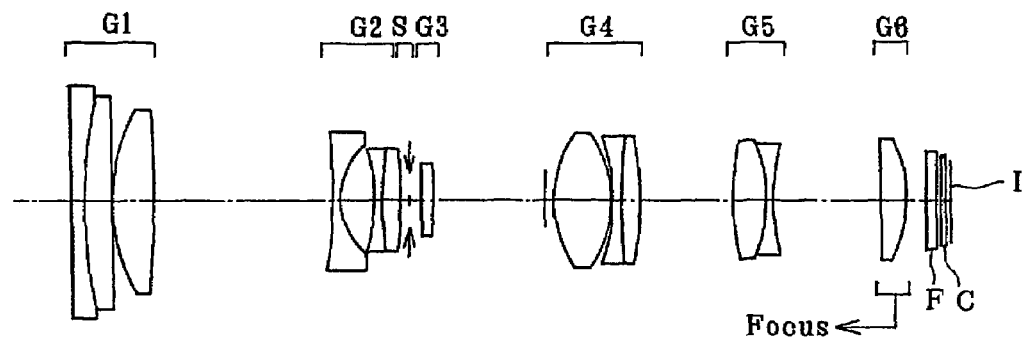
Figure 11A:
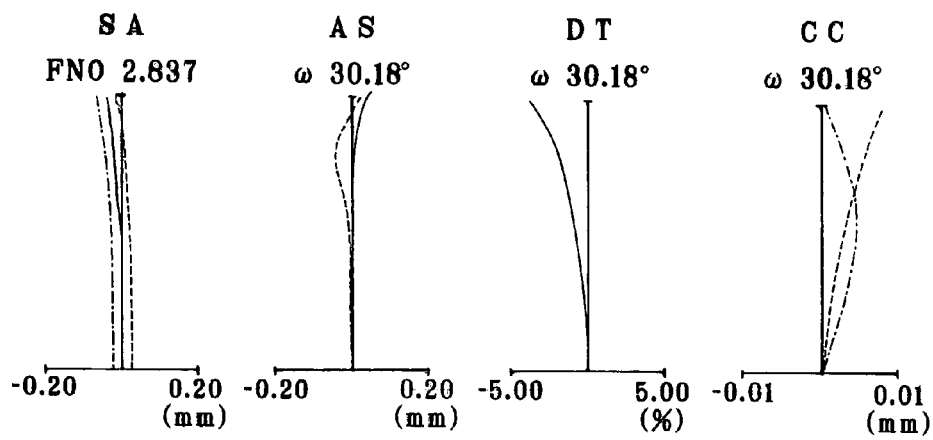
FIG. 11 is indicative of aberrations of Example 1 at the wide-angle end (a), in the intermediate state (b) and at the telephoto end (c), respectively, upon focusing on an object point at infinity.
Figure 11B:
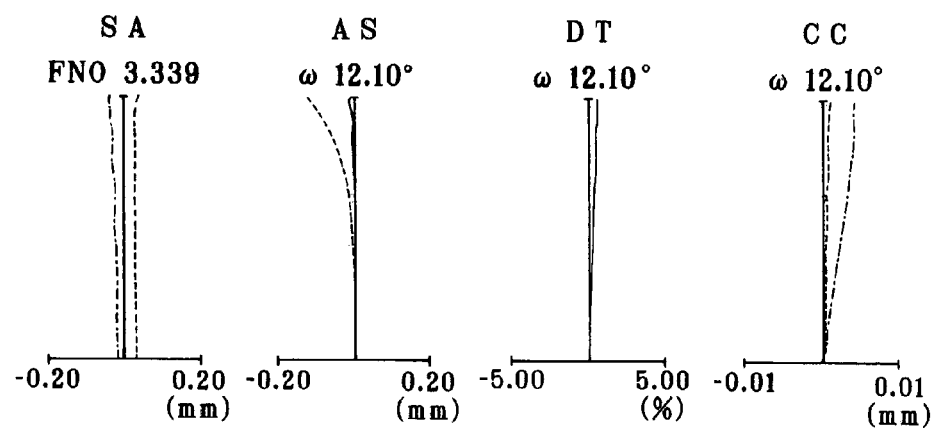
Figure 11C:
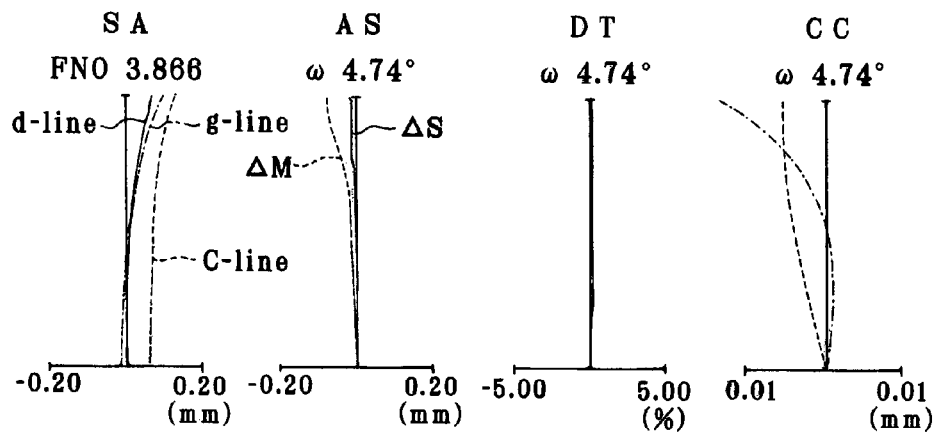
Figure 12A:
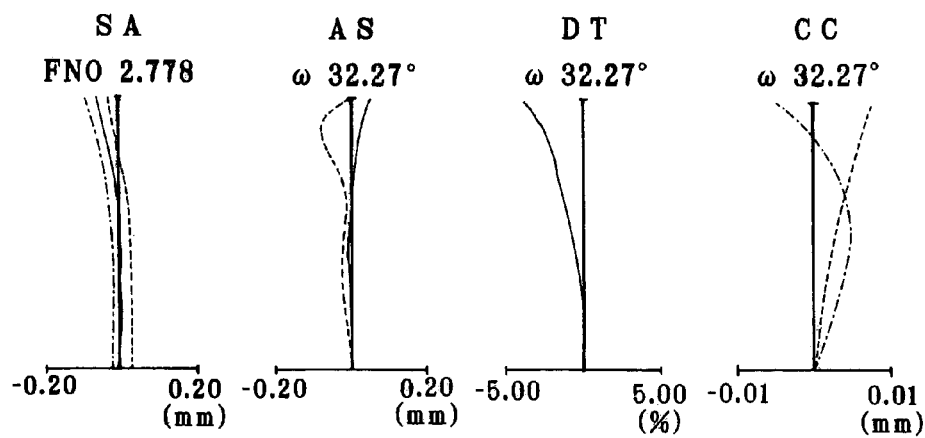
FIG. 12 is indicative, as in FIG. 11, of aberrations of Example 2.
Figure 12B:
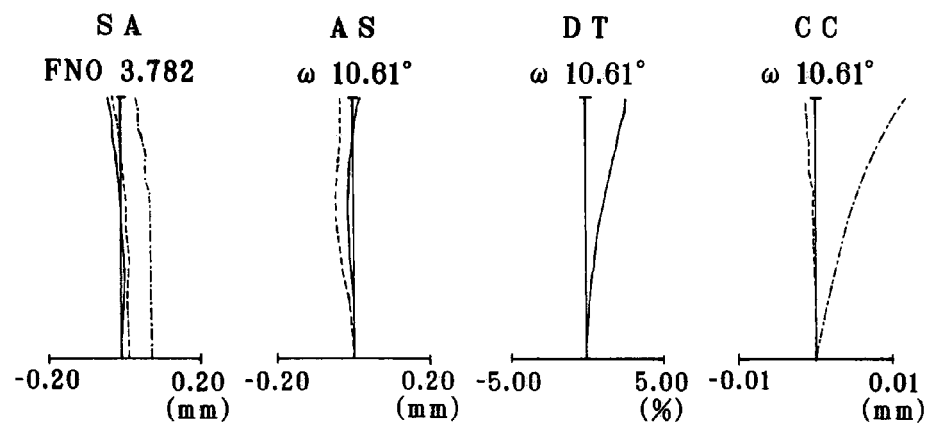
Figure 12C:
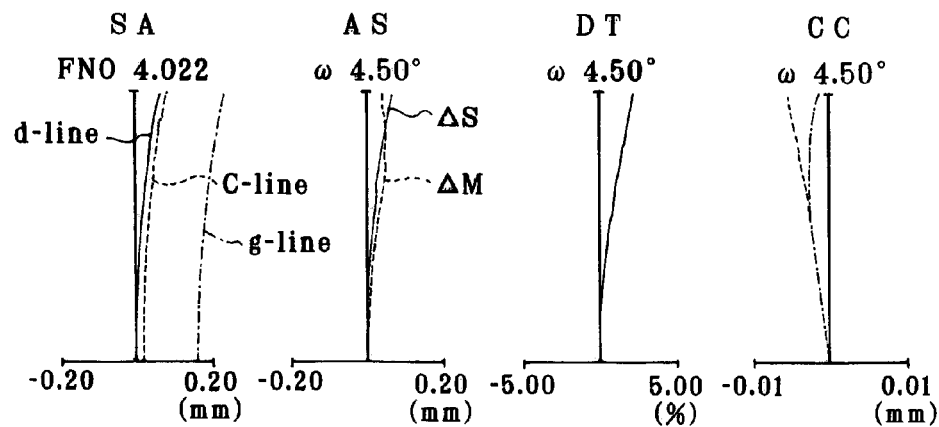
Figure 13A:
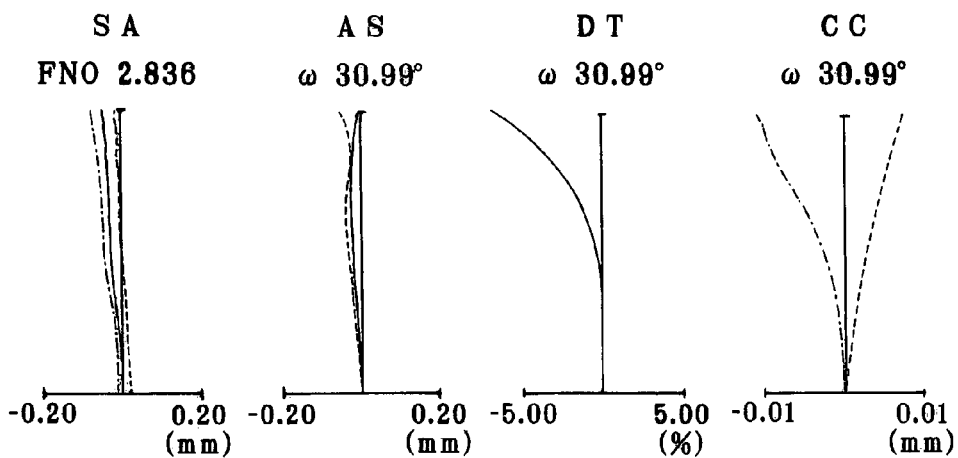
FIG. 13 is indicative, as in FIG. 11, of aberrations of Example 3.
Figure 13B:
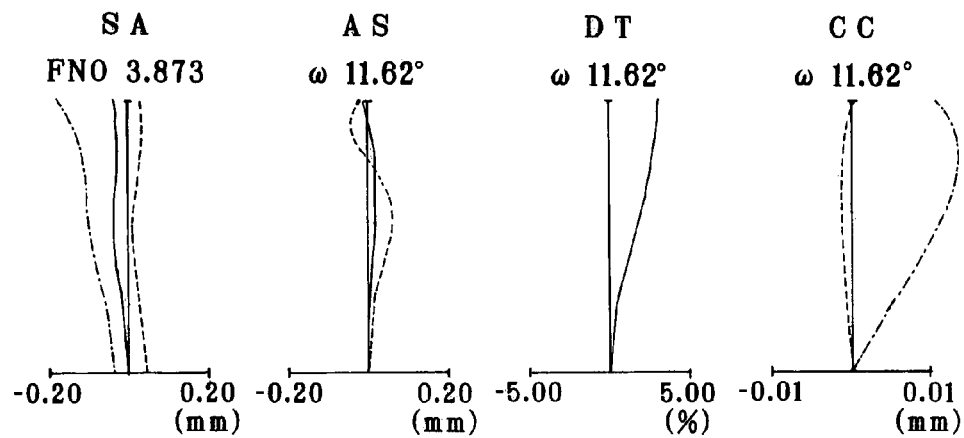
Figure 13C:
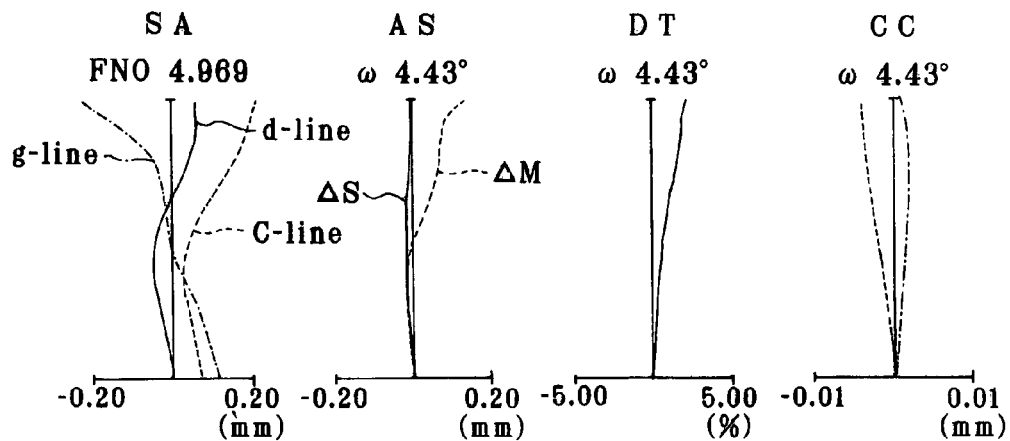
Figure 14A:
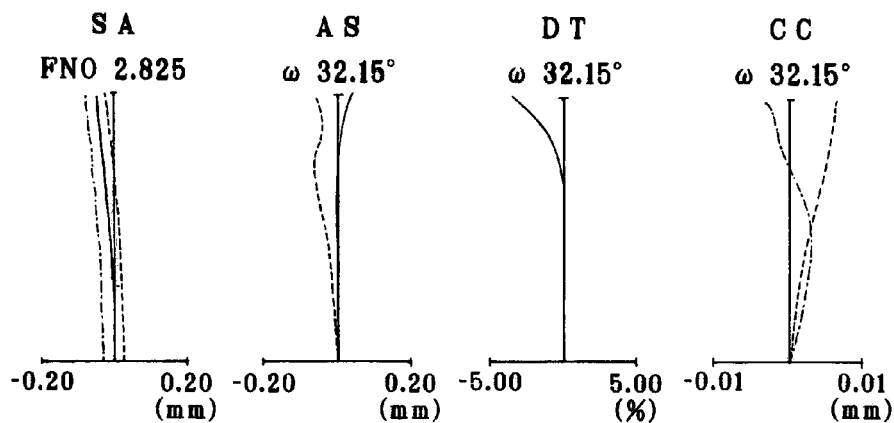
FIG. 14 is indicative, as in FIG. 11, of aberrations of Example 4.
Figure 14B:
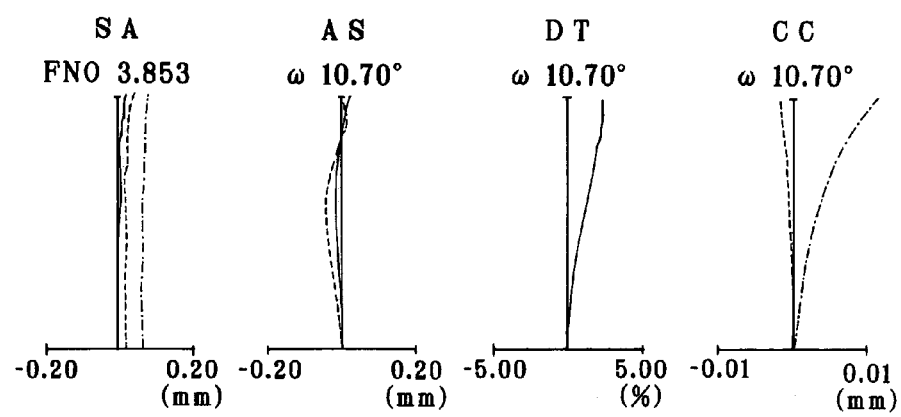
Figure 14C:
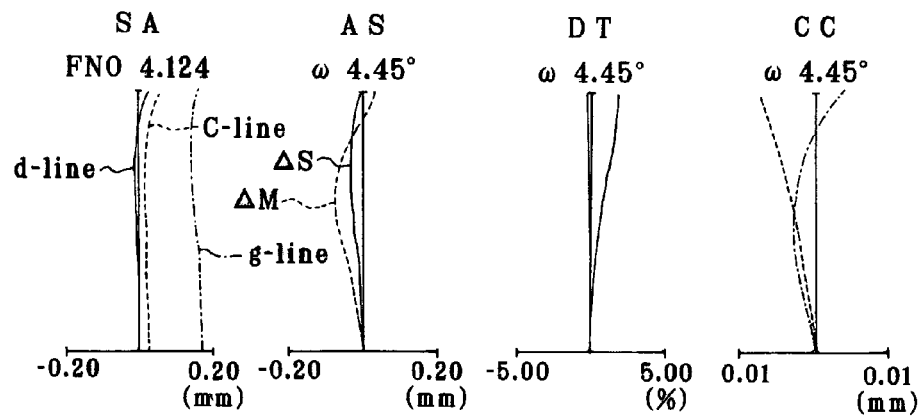
Figure 15A:
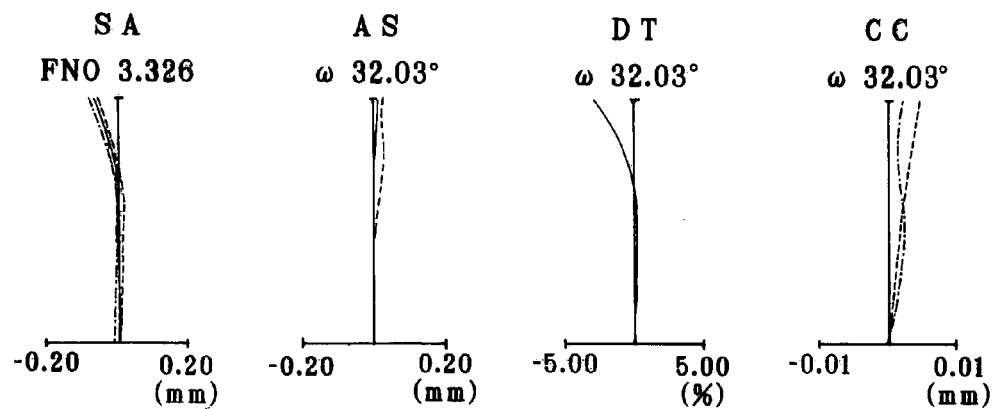
FIG. 15 is indicative, as in FIG. 11, of aberrations of Example 5.
Figure 15B:
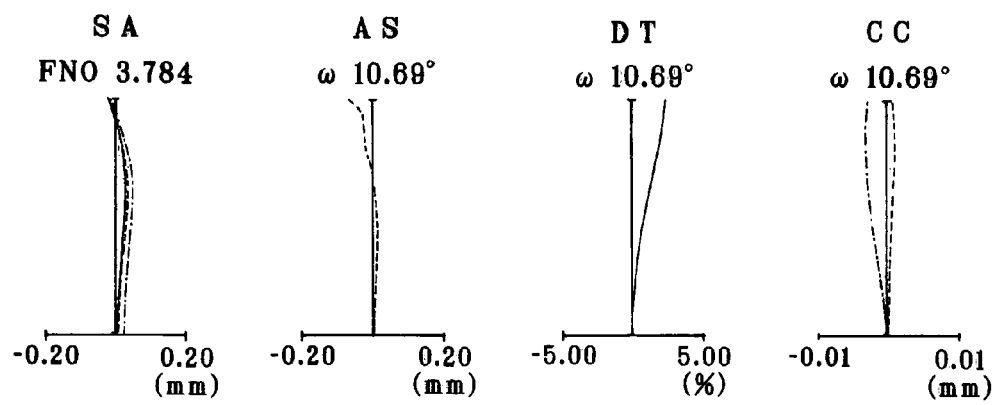
Figure 15C:
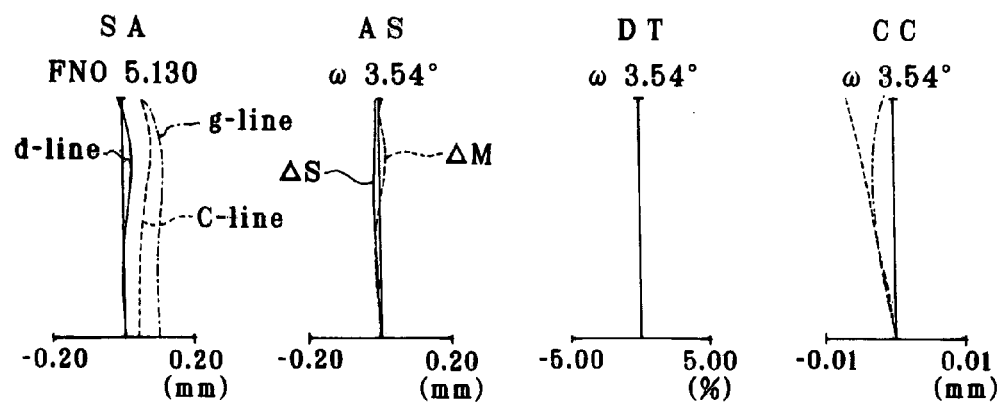
Figure 16A:
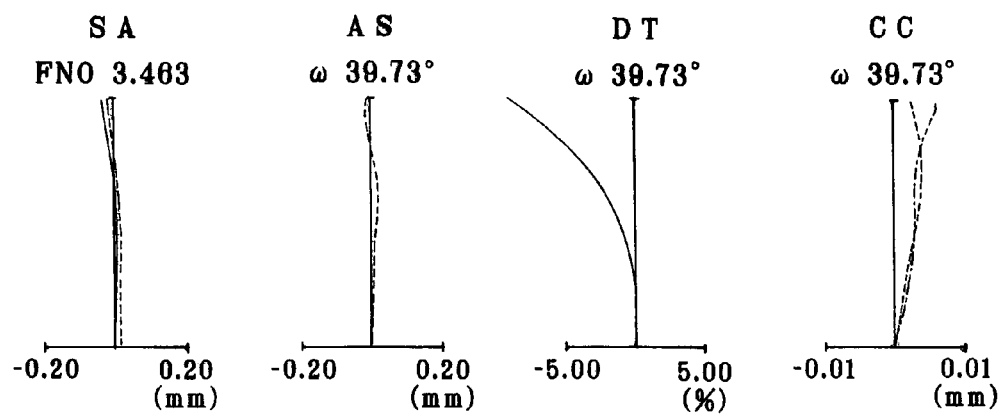
FIG. 16 is indicative, as in FIG. 11, of aberrations of Example 6.
Figure 16B:
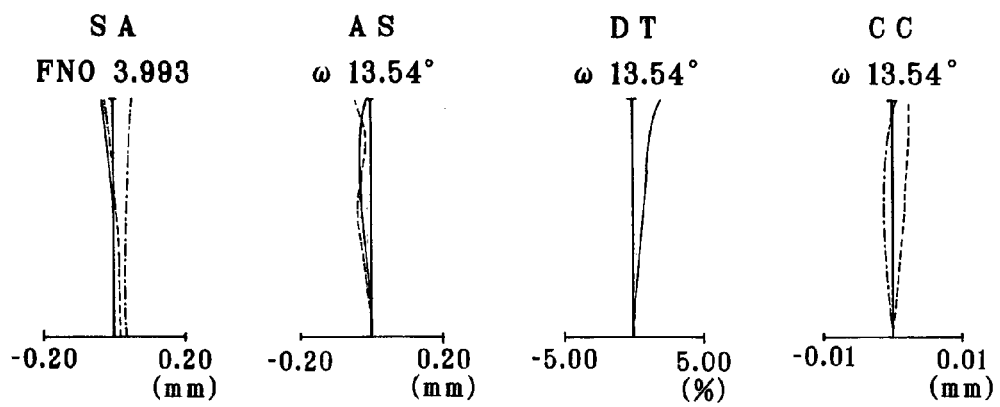
Figure 16C:
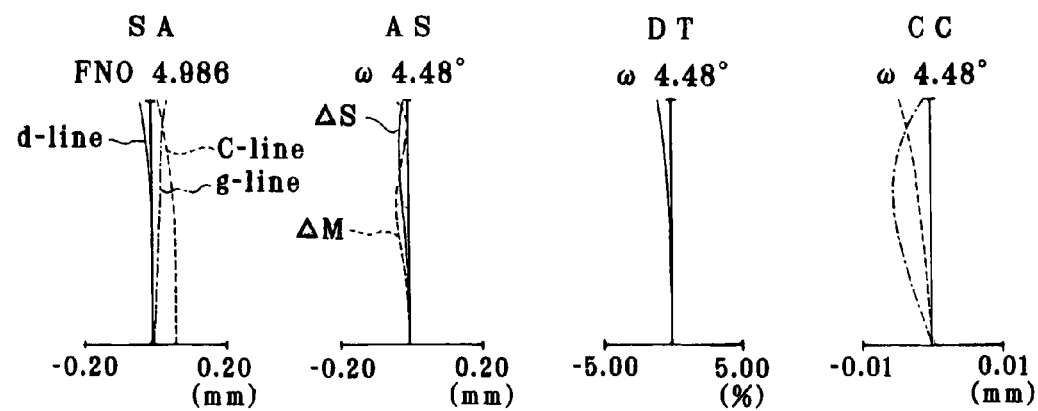
Figure 17A:
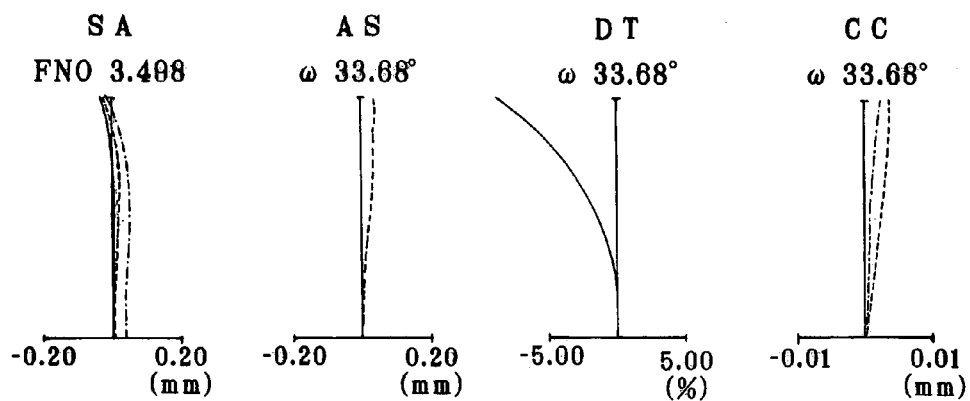
FIG. 17 is indicative, as in FIG. 11, of aberrations of Example 7.
Figure 17B:
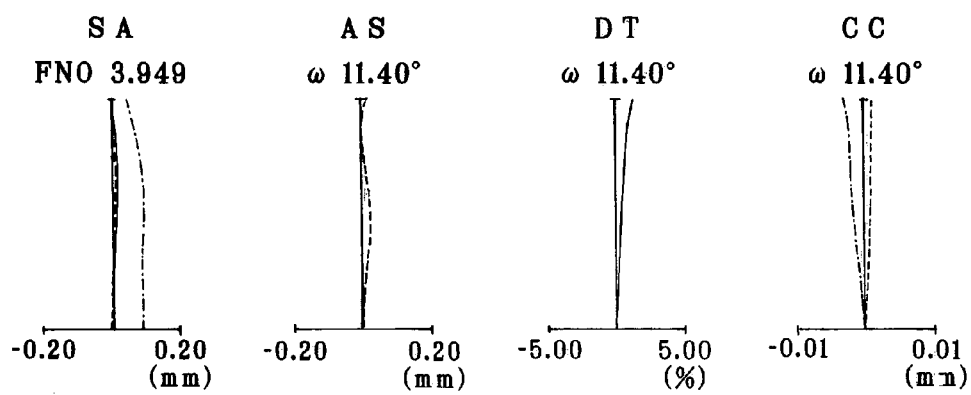
Figure 17C:
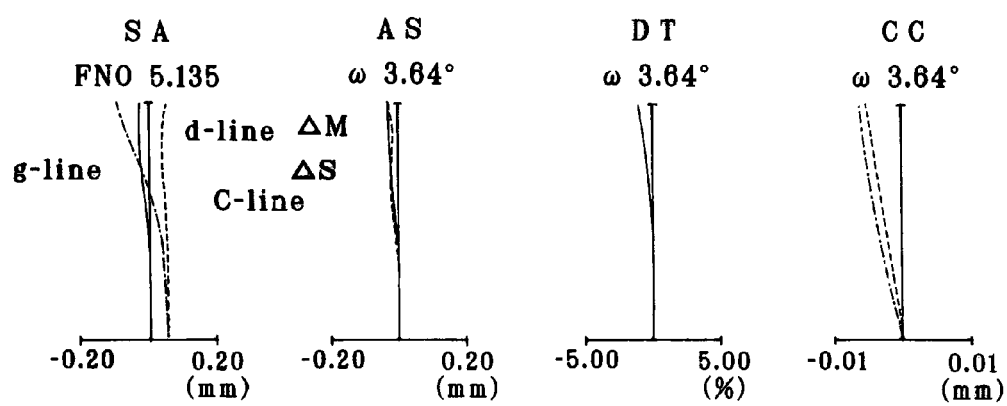
Figure 18A:
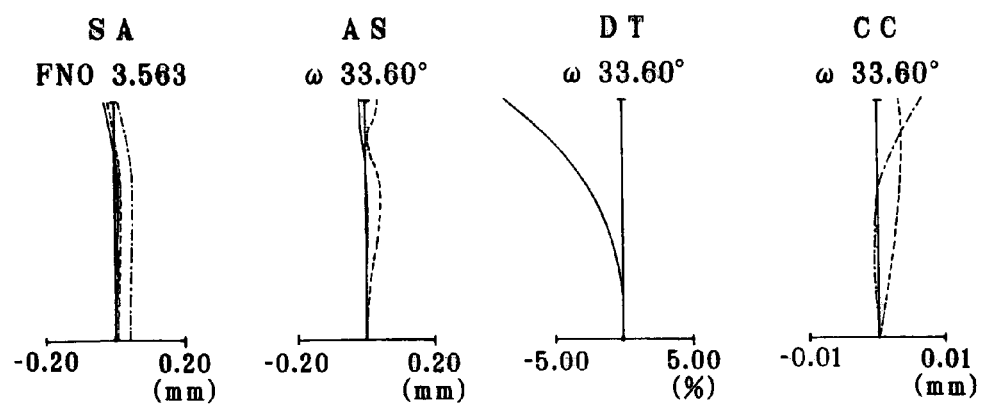
FIG. 18 is indicative, as in FIG. 11, of aberrations of Example 8.
Figure 18B:
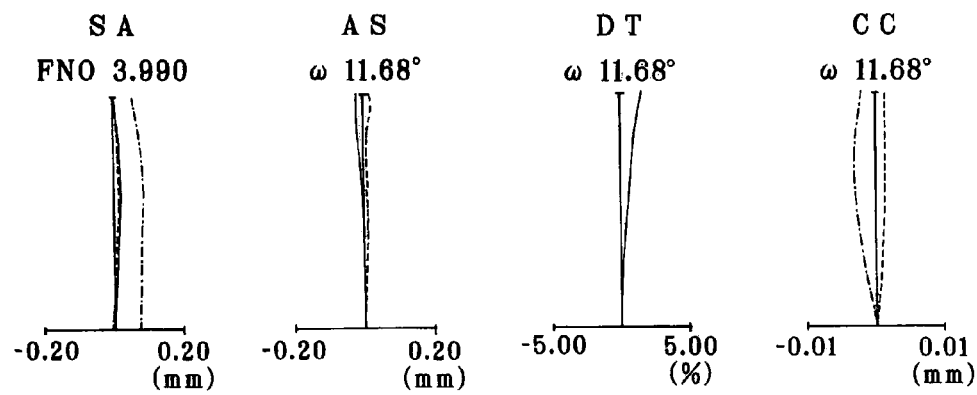
Figure 18C:
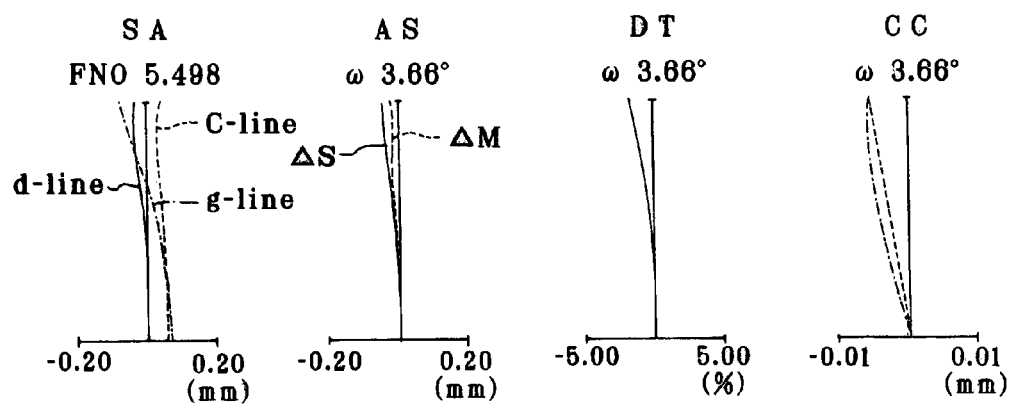
Figure 19A:
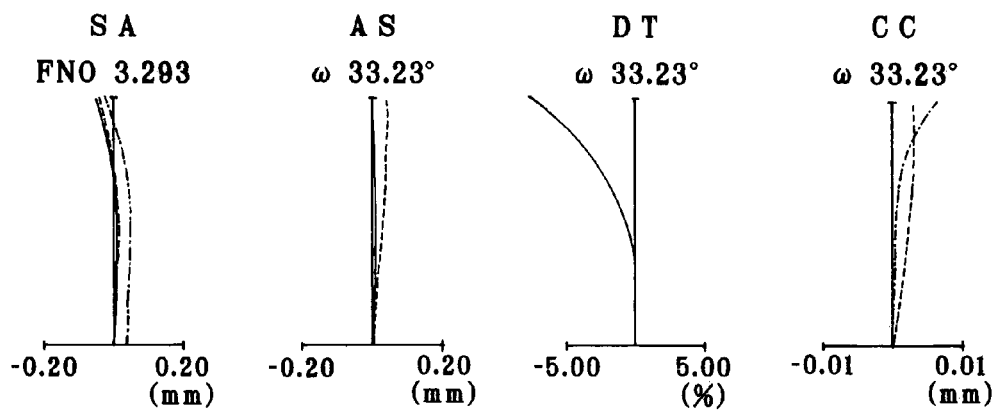
FIG. 19 is indicative, as in FIG. 11, of aberrations of Example 9.
Figure 19B:
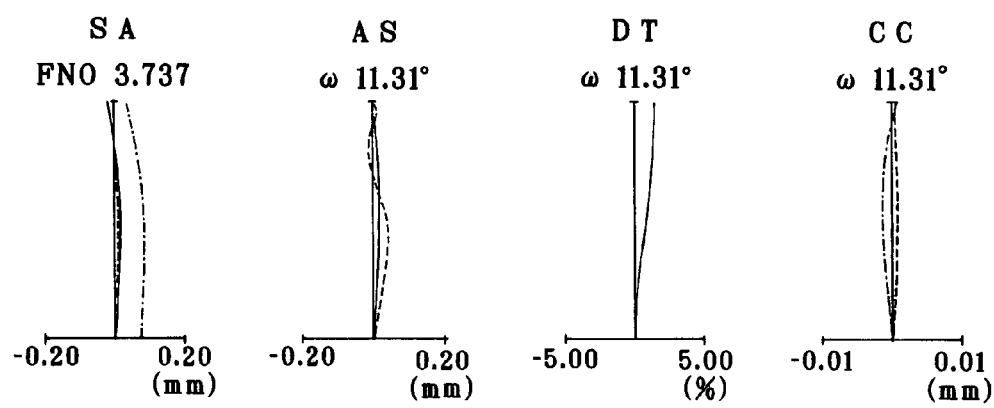
Figure 19C:
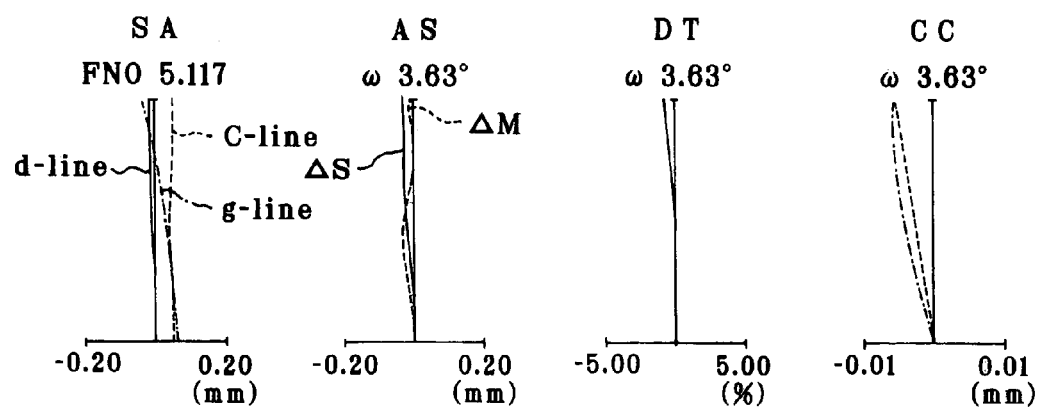
Figure 20A:
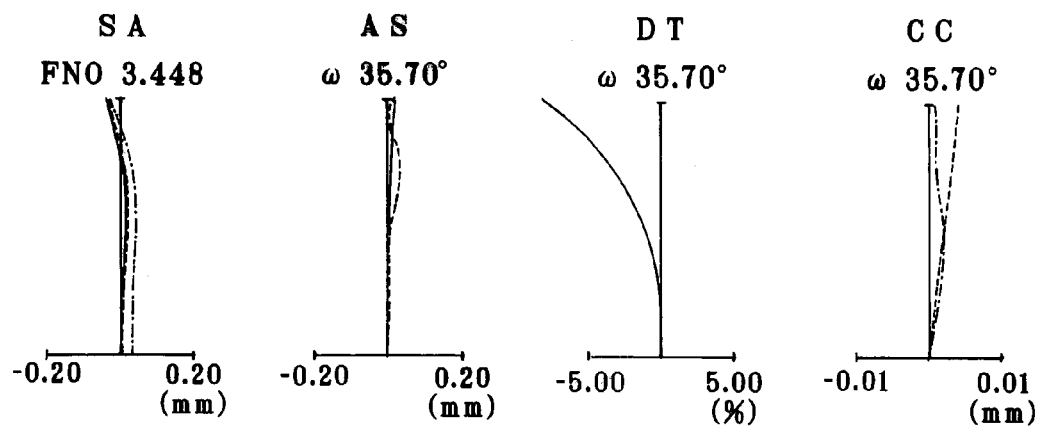
FIG. 20 is indicative, as in FIG. 11, of aberrations of Example 10.
Figure 20B:
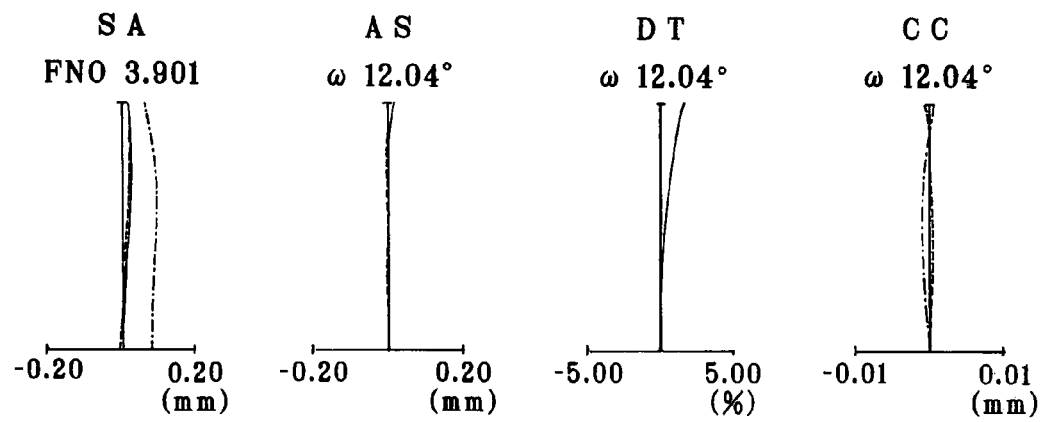
Figure 20C:
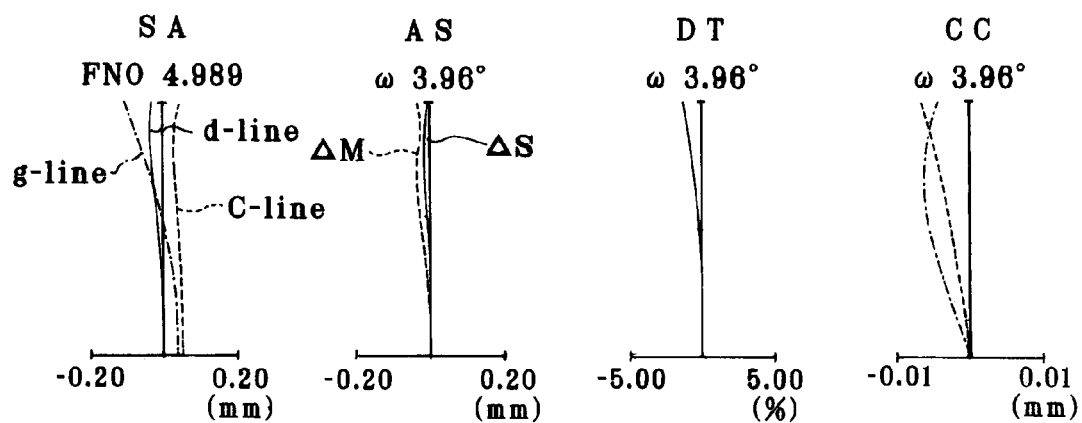

As shown in FIG. 10, this example is directed to a bent type zoom optical system made up of, in order from its object side, the first lens group G1 of positive refracting power, the second lens group G2 of negative refracting power, the aperture stop S, the third lens group G3 of positive refracting power, the fourth lens group G4 of positive refracting power, the fifth lens group G5 of negative refracting power, and the sixth lens group G6 of the positive refracting power. Upon zooming from the wide-angle end to the telephoto end of the optical system, the first lens group G1 moves in a convex orbit toward the image side, and is positioned more on the object side at the telephoto end than at the wide-angle end. The second lens group G2 moves monotonously toward the image side. The aperture stop S and the third lens group G3 remain fixed, the fourth lens group G4 moves toward the object side, and the fifth lens group G5 moves in a convex orbit toward the object side while the spacing between the fourth lens group G4 and it grows wide, and is positioned more on the image side at the telephoto end than at the wide-angle end. The sixth lens group G6 moves in a convex orbit toward the object side while the spacing between the fifth lens group G5 and it grows wide, and is positioned more on the image side at the telephoto end than at the wide-angle end.

In order from the object side of the optical system, the first lens group G1 is made up of a cemented lens of a negative meniscus lens convex on its object side and a double-convex positive lens, and a double-convex positive lens; the second lens group G2 is made up of a double-concave negative lens, and a cemented lens of a double-concave negative lens and a double-convex positive lens; the third lens group G3 is made up of one double-convex positive lens; the fourth lens group G4 is made up of a double-convex positive lens, and a cemented lens of a double-concave negative lens and a double-convex positive lens; the fifth lens group G5 is made up of a cemented lens of a double-convex positive lens and a double-concave negative lens; and the sixth lens group G6 is made up of one double-convex positive lens.

Seven aspheric surfaces are used: two at both surfaces of the single lens or the double-convex positive lens in the first lens group G1, one at the image-side surface of the double-concave negative lens in the second lens group G2, two at both surfaces of the double-convex positive lens in the fourth lens group G4, and two at both surfaces of the double-convex positive lens in the sixth lens group G6.

And the 14$^{th}$ surface $r_{14}$ in the numerical data given later is a virtual surface provided in view of the design requirement for preventing interference of the fourth lens group G4 with the reflecting surface; there is none of anything significant. And then, the reflecting surface for bending the optical axis substantially at right angles (e.g., 90°) is located between the third lens group G3 and that virtual surface $r_{14}$ at an angle of 45° with the optical axis, and that reflecting surface remains fixed in position together with the third lens group G3 during taking operation.

In Examples 1 to 4, focusing may be implemented just only by extending the fourth lens group G4 out toward the object side but also with other lens group.

In Examples 5 to 10, focusing may likewise be implemented just only by extending the sixth lens group G6 out toward the object side but also with other lens group.

Numerical data about each of Examples 1 to 10 are enumerated below. The symbols used hereinafter but not hereinbefore have the following meanings.

f: focal length of the whole optical system,
$F_{NO}$: F-number,
$2\omega$: full angle of view,
WE: wide-angle end,
ST: intermediate state,
TE: telephoto end,
$r_1, r_2 \ldots$ : radius of curvature of each lens surface,
$d_1, d_2 \ldots$ : space between adjacent lens surfaces,
$n_{d1}, n_{d2} \ldots$ : d-line refractive index of each lens, and
$\nu_{d1}, \nu_{d2} \ldots$ : Abbe number of each lens.

Here let x be an optical axis provided that the direction of travel of light is taken as positive and y be a direction orthogonal to the optical axis. Then, aspheric shape is given by $$x=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and $A_4, A_6, A_8$ and $A_{10}$ are the $4^{th}$-, $6^{th}$-, $8^{th}$-, and $10^{th}$-order aspheric coefficients, respectively.

In the data given just below, "HPP" stands for a virtual surface.

EXAMPLE 1

| | | | |
|---|---|---|---|
| $r_1 = 20.208$ | $d_1 = 1.40$ | $n_{d1} = 1.92286$ | $\nu_{d1} = 20.88$ |
| $r_2 = 14.652$ | $d_2 = 5.14$ | $n_{d2} = 1.69350$ | $\nu_{d2} = 53.20$ |
| $r_3 = 331.987$ (Aspheric) | $d_3 =$ (Variable) | | |
| $r_4 = -23.029$ (Aspheric) | $d_4 = 1.00$ | $n_{d3} = 1.80610$ | $\nu_{d3} = 40.92$ |
| $r_5 = 5.924$ (Aspheric) | $d_5 = 3.57$ | | |
| $r_6 = 15.713$ | $d_6 = 2.71$ | $n_{d4} = 1.92286$ | $\nu_{d4} = 18.90$ |
| $r_7 = 57.508$ | $d_7 =$ (Variable) | | |
| $r_8 = \infty$ (Stop) | $d_8 = 10.00$ | | |
| $r_9 = \infty$ (HPP) | $d_9 =$ (Variable) | | |
| $r_{10} = 10.162$ (Aspheric) | $d_{10} = 5.00$ | $n_{d5} = 1.58913$ | $\nu_{d5} = 61.25$ |
| $r_{11} = -20.305$ (Aspheric) | $d_{11} = 0.20$ | | |
| $r_{12} = 15.967$ | $d_{12} = 3.92$ | $n_{d6} = 1.57250$ | $\nu_{d6} = 57.74$ |
| $r_{13} = -10.788$ | $d_{13} = 0.65$ | $n_{d7} = 1.90366$ | $\nu_{d7} = 31.31$ |
| $r_{14} = 10.669$ | $d_{14} =$ (Variable) | | |
| $r_{15} = 12.041$ (Aspheric) | $d_{15} = 3.00$ | $n_{d8} = 1.58313$ | $\nu_{d8} = 59.46$ |
| $r_{16} = -192.547$ (Aspheric) | $d_{16} =$ (Variable) | | |
| $r_{17} = \infty$ | $d_{17} = 0.85$ | $n_{d9} = 1.54771$ | $\nu_{d9} = 62.84$ |
| $r_{18} = \infty$ | $d_{18} = 0.50$ | | |
| $d_{19} = \infty$ | $d_{19} = 0.50$ | $n_{d10} = 1.51633$ | $\nu_{d10} = 64.14$ |
| $r_{20} = \infty$ | $d_{20} = 1.00$ | | |
| $r_{21} = \infty$ (Imaging plane) | | | |

| Aspherical Coefficients |
|---|
| 3rd surface |
| K = 0.000 |
| $A_4 = 8.10303 \times 10^{-6}$ |
| $A_6 = -4.28147 \times 10^{-9}$ |
| $A_8 = -6.76544 \times 10^{-11}$ |
| $A_{10} = 3.65815 \times 10^{-13}$ |

| -continued |
|---|
| 4th surface |
| K = 0.000 |
| $A_4 = 3.48094 \times 10^{-4}$ |
| $A_6 = -3.52662 \times 10^{-6}$ |
| $A_8 = -2.69430 \times 10^{-8}$ |
| $A_{10} = 6.72906 \times 10^{-10}$ |
| 5th surface |
| K = 0.000 |
| $A_4 = -3.22507 \times 10^{-4}$ |
| $A_6 = -2.53019 \times 10^{-6}$ |
| $A_8 = -1.82882 \times 10^{-7}$ |
| $A_{10} = -1.35943 \times 10^{-8}$ |
| 10th surface |
| K = 0.126 |
| $A_4 = -9.41275 \times 10^{-5}$ |
| $A_6 = 5.88155 \times 10^{-7}$ |
| $A_8 = -3.28601 \times 10^{-8}$ |
| $A_{10} = 8.71233 \times 10^{-10}$ |
| 11th surface |
| K = 0.000 |
| $A_4 = 9.08242 \times 10^{-5}$ |
| $A_6 = 1.26308 \times 10^{-6}$ |
| $A_8 = -4.18338 \times 10^{-8}$ |
| $A_{10} = 1.31850 \times 10^{-9}$ |
| 15th surface |
| K = 0.000 |
| $A_4 = 1.84487 \times 10^{-4}$ |
| $A_6 = 7.10013 \times 10^{-6}$ |
| $A_8 = 6.61038 \times 10^{-8}$ |
| $A_{10} = -3.97319 \times 10^{-10}$ |
| $A_{12} = 4.49625 \times 10^{-11}$ |
| 16th surface |
| K = 0.000 |
| $A_4 = 3.55573 \times 10^{-4}$ |
| $A_6 = 1.02147 \times 10^{-5}$ |
| $A_8 = 2.58662 \times 10^{-8}$ |
| $A_{10} = 5.84654 \times 10^{-9}$ |

| Zooming Data ($\infty$) | | | |
|---|---|---|---|
| | WE | ST | TE |
| f (mm) | 6.44 | 16.71 | 43.40 |
| $F_{NO}$ | 2.84 | 3.34 | 3.87 |
| $2\omega$ (°) | 60.35 | 24.20 | 9.48 |
| $d_3$ | 1.43 | 10.63 | 18.63 |
| $d_7$ | 14.55 | 4.66 | 1.05 |
| $d_9$ | 4.75 | 0.80 | 0.80 |
| $d_{14}$ | 4.00 | 5.99 | 11.11 |
| $d_{16}$ | 5.97 | 7.91 | 2.75 |

EXAMPLE 2

| | | | |
|---|---|---|---|
| $r_1 = 34.215$ | $d_1 = 1.45$ | $n_{d1} = 1.80810$ | $\nu_{d1} = 22.76$ |
| $r_2 = 22.187$ | $d_2 = 0.10$ | | |
| $r_3 = 19.116$ | $d_3 = 5.10$ | $n_{d2} = 1.58913$ | $\nu_{d2} = 61.28$ |
| $r_4 = -112.861$ (Aspheric) | $d_4 =$ (Variable) | | |
| $r_5 = -20.825$ (Aspheric) | $d_5 = 1.00$ | $n_{d3} = 1.80610$ | $\nu_{d3} = 40.92$ |
| $r_6 = 7.450$ (Aspheric) | $d_6 = 3.20$ | | |
| $r_7 = 21.082$ | $d_7 = 2.05$ | $n_{d4} = 1.92286$ | $\nu_{d4} = 18.90$ |
| $r_8 = 204.903$ | $d_8 =$ (Variable) | | |
| $r_9 = \infty$ (Stop) | $d_9 = 10.00$ | | |
| $r_{10} = \infty$ (HPP) | $d_{10} =$ (Variable) | | |
| $r_{11} = 11.707$ (Aspheric) | $d_{11} = 4.35$ | $n_{d5} = 1.58913$ | $\nu_{d5} = 61.28$ |

-continued

| | | | |
|---|---|---|---|
| $r_{12} = -22.192$ (Aspheric) | $d_{12} = 0.20$ | | |
| $r_{13} = 9.203$ | $d_{13} = 4.44$ | $n_{d6} = 1.49700$ | $v_{d6} = 81.54$ |
| $r_{14} = -17.989$ | $d_{14} = 0.97$ | $n_{d7} = 1.90366$ | $v_{d7} = 31.31$ |
| $r_{15} = 7.821$ | $d_{15}$ = (Variable) | | |
| $r_{16} = 17.634$ (Aspheric) | $d_{16} = 2.00$ | $n_{d8} = 1.52542$ | $v_{d8} = 55.78$ |
| $r_{17} = -61.206$ | $d_{17}$ = (Variable) | | |
| $r_{18} = \infty$ | $d_{18} = 0.85$ | $n_{d9} = 1.54771$ | $v_{d9} = 62.84$ |
| $r_{19} = \infty$ | $d_{19} = 0.50$ | | |
| $r_{20} = \infty$ | $d_{20} = 0.50$ | $n_{d10} = 1.51633$ | $v_{d10} = 64.14$ |
| $r_{21} = \infty$ | $d_{21} = 0.60$ | | |
| $r_{22} = \infty$ (Imaging plane) | | | |

Aspherical Coefficients

4th surface $K = 0.000$
$A_4 = 1.13511 \times 10^{-5}$
$A_6 = -1.07450 \times 10^{-8}$
$A_8 = 6.85102 \times 10^{-11}$
$A_{10} = -1.05519 \times 10^{-13}$ 5th surface $K = 0.000$
$A_4 = 2.18566 \times 10^{-4}$
$A_6 = -2.82940 \times 10^{-7}$
$A_8 = -2.24959 \times 10^{-8}$
$A_{10} = 2.03799 \times 10^{-10}$ 6th surface $K = 0.000$
$A_4 = -2.58889 \times 10^{-4}$
$A_6 = 3.14646 \times 10^{-6}$
$A_8 = -1.16884 \times 10^{-7}$
$A_{10} = -2.20849 \times 10^{-10}$ 11th surface $K = 0.000$
$A_4 = -6.94100 \times 10^{-5}$
$A_6 = 1.16580 \times 10^{-6}$
$A_8 = -3.06814 \times 10^{-8}$
$A_{10} = -1.22162 \times 10^{-11}$ 12th surface $K = 0.000$
$A_4 = 2.59535 \times 10^{-5}$
$A_6 = 1.73196 \times 10^{-6}$
$A_8 = -5.05624 \times 10^{-8}$
$A_{10} = 2.44892 \times 10^{-10}$ 16th surface $K = 0.000$
$A_4 = -1.24682 \times 10^{-4}$
$A_6 = -3.73536 \times 10^{-6}$
$A_8 = 2.68726 \times 10^{-7}$
$A_{10} = -3.36559 \times 10^{-9}$ Zooming Data ($\infty$)

| | WE | ST | TE |
|---|---|---|---|
| f (mm) | 5.95 | 18.70 | 44.74 |
| $F_{NO}$ | 2.78 | 3.78 | 4.02 |
| $2\omega$ (°) | 64.55 | 21.22 | 9.00 |
| $d_4$ | 1.14 | 14.02 | 23.77 |
| $d_8$ | 21.44 | 8.50 | 1.08 |
| $d_{10}$ | 7.21 | 0.87 | 0.80 |
| $d_{15}$ | 4.48 | 9.28 | 11.96 |
| $d_{17}$ | 5.33 | 6.91 | 4.23 |

EXAMPLE 3

| | | | |
|---|---|---|---|
| $r_1 = 244.854$ | $d_1 = 1.15$ | $n_{d1} = 1.92286$ | $v_d = 20.88$ |
| $r_2 = 38.880$ | $d_2 = 0.10$ | | |
| $r_3 = 21.300$ | $d_3 = 3.39$ | $n_{d2} = 1.74330$ | $v_d = 49.33$ |
| $r_4 = -51.449$ (Aspheric) | $d_4$ = (Variable) | | |
| $r_5 = -21.640$ (Aspheric) | $d_5 = 0.90$ | $n_{d3} = 1.80610$ | $v_d = 40.92$ |
| $r_6 = 7.060$ (Aspheric) | $d_6 = 1.76$ | | |
| $r_7 = 11.751$ | $d_7 = 2.05$ | $n_{d4} = 1.92286$ | $v_d = 20.88$ |
| $r_8 = 24.727$ | $d_8 = 0.50$ | | |
| $r_9 = \infty$ (HPP) | $d_9 = 10.20$ | | |
| $r_{10} = \infty$ (HPP) | $d_{10}$ = (Variable) | | |
| $r_{11} = \infty$ (Stop) | $d_{11} = 0.40$ | | |
| $r_{12} = 10.274$ (Aspheric) | $d_{12} = 2.80$ | $n_{d5} = 1.58313$ | $v_d = 59.46$ |
| $r_{13} = -29.469$ (Aspheric) | $d_{13} = 0.16$ | | |
| $r_{14} = 9.245$ | $d_{14} = 3.83$ | $n_{d6} = 1.48749$ | $v_d = 70.23$ |
| $r_{15} = -52.560$ | $d_{15} = 0.26$ | | |
| $r_{16} = 199.572$ | $d_{16} = 0.55$ | $n_{d7} = 1.83400$ | $v_d = 37.16$ |
| $r_{17} = 6.042$ | $d_{17}$ = (Variable) | | |
| $r_{18} = -17.085$ | $d_{18} = 0.65$ | $n_{d8} = 1.84666$ | $v_d = 23.78$ |
| $r_{19} = 26.750$ | $d_{19} = 0.10$ | | |
| $r_{20} = 10.841$ (Aspheric) | $d_{20} = 3.14$ | $n_{d9} = 1.69350$ | $v_d = 53.20$ |
| $r_{21} = -10.117$ (Aspheric) | $d_{21}$ = (Variable) | | |
| $r_{22} = \infty$ | $d_{22} = 1.00$ | $n_{d10} = 1.51633$ | $v_d = 64.14$ |
| $r_{23} = \infty$ | $d_{23} = 0.50$ | | |
| $r_{24} = \infty$ | $d_{24} = 0.50$ | $n_{d11} = 1.51633$ | $v_d = 64.14$ |
| $r_{25} = \infty$ | $d_{25} = 0.60$ | | |
| $r_{26} = \infty$ (Imaging plane) | | | |

Aspherical Coefficients

4th surface $K = 0.000$
$A_4 = 2.44242 \times 10^{-5}$
$A_6 = -3.45144 \times 10^{-8}$
$A_8 = 0$
$A_{10} = 0$ 5th surface $K = 0.000$
$A_4 = 2.01680 \times 10^{-4}$
$A_6 = -2.64128 \times 10^{-6}$
$A_8 = 8.65607 \times 10^{-9}$
$A_{10} = 1.18229 \times 10^{-10}$ 6th surface $K = 0.000$
$A_4 = -2.01118 \times 10^{-4}$
$A_6 = -1.22817 \times 10^{-6}$
$A_8 = -1.43653 \times 10^{-7}$
$A_{10} = -7.10098 \times 10^{-10}$ 12th surface $K = 0.000$
$A_4 = -7.01310 \times 10^{-5}$
$A_6 = -2.52348 \times 10^{-6}$
$A_8 = 1.89707 \times 10^{-7}$
$A_{10} = 0$ 13th surface $K = 0.000$
$A_4 = 1.28030 \times 10^{-4}$
$A_6 = -1.47197 \times 10^{-6}$
$A_8 = 2.01652 \times 10^{-7}$
$A_{10} = 0$ 20th surface $K = 0.000$
$A_4 = 5.17251 \times 10^{-5}$
$A_6 = -2.00697 \times 10^{-5}$
$A_8 = 7.68022 \times 10^{-7}$
$A_{10} = 0$ 21th surface $K = 0.000$
$A_4 = 5.71194 \times 10^{-4}$
$A_6 = -1.22472 \times 10^{-5}$ -continued $A_8 = -1.28119 \times 10^{-7}$
$A_{10} = 2.46792 \times 10^{-8}$ Zooming Data (∞)

|  | WE | ST | TE |
|---|---|---|---|
| f (mm) | 6.44 | 16.98 | 45.47 |
| $F_{NO}$ | 2.84 | 3.87 | 4.97 |
| 2ω (°) | 61.99 | 23.23 | 8.86 |
| $d_4$ | 1.00 | 7.34 | 15.05 |
| $d_{10}$ | 17.52 | 5.83 | 0.50 |
| $d_{17}$ | 4.53 | 16.41 | 25.68 |
| $d_{21}$ | 6.66 | 6.48 | 2.51 |

EXAMPLE 4

| | | | |
|---|---|---|---|
| $r_1 = 102.112$ | $d_1 = 1.45$ | $n_{d1} = 1.92286$ | $\nu_{d1} = 20.88$ |
| $r_2 = 37.564$ | $d_2 = 0.10$ | | |
| $r_3 = 22.459$ | $d_3 = 4.00$ | $n_{d2} = 1.74330$ | $\nu_{d2} = 49.33$ |
| $r_4 = -122.386$ (Aspheric) | $d_4 =$ (Variable) | | |
| $r_5 = -30.875$ (Aspheric) | $d_5 = 1.00$ | $n_{d3} = 1.80610$ | $\nu_{d3} = 40.92$ |
| $r_6 = 7.108$ (Aspheric) | $d_6 = 3.00$ | | |
| $r_7 = 16.733$ | $d_7 = 2.35$ | $n_{d4} = 1.92286$ | $\nu_{d4} = 18.90$ |
| $r_8 = 58.085$ | $d_8 =$ (Variable) | | |
| $r_9 = \infty$ (Stop) | $d_9 = 10.00$ | | |
| $r_{10} = \infty$ (HPP) | $d_{10} =$ (Variable) | | |
| $r_{11} = 12.581$ (Aspheric) | $d_{11} = 3.92$ | $n_{d5} = 1.58913$ | $\nu_{d5} = 61.28$ |
| $r_{12} = -22.606$ (Aspheric) | $d_{12} = 0.20$ | | |
| $r_{13} = 8.478$ | $d_{13} = 4.61$ | $n_{d6} = 1.49700$ | $\nu_{d6} = 81.54$ |
| $r_{14} = -24.391$ | $d_{14} = 0.70$ | $n_{d7} = 1.90366$ | $\nu_{d7} = 31.31$ |
| $r_{15} = 7.231$ | $d_{15} =$ (Variable) | | |
| $r_{16} = 22.237$ (Aspheric) | $d_{16} = 2.00$ | $n_{d8} = 1.52542$ | $\nu_{d8} = 55.78$ |
| $r_{17} = -33.250$ | $d_{17} =$ (Variable) | | |
| $r_{18} = \infty$ | $d_{18} = 0.85$ | $n_{d9} = 1.54771$ | $\nu_{d9} = 62.84$ |
| $r_{19} = \infty$ | $d_{19} = 0.50$ | | |
| $r_{20} = \infty$ | $d_{20} = 0.50$ | $n_{d10} = 1.51633$ | $\nu_{d10} = 64.14$ |
| $r_{21} = \infty$ | $d_{21} = 0.60$ | | |
| $r_{22} = \infty$ (Imaging plane) | | | |

Aspherical Coefficients

4th surface

K = 0.000
$A_4 = 1.16293 \times 10^{-5}$
$A_6 = 0$
$A_8 = 0$
$A_{10} = 0$

5th surface

K = 0.000
$A_4 = 2.18771 \times 10^{-4}$
$A_6 = -2.54903 \times 10^{-6}$
$A_8 = 1.67156 \times 10^{-9}$
$A_{10} = 1.33293 \times 10^{-10}$ 6th surface K = 0.000
$A_4 = -1.73246 \times 10^{-4}$
$A_6 = -1.88427 \times 10^{-6}$
$A_8 = -1.03220 \times 10^{-7}$
$A_{10} = -1.46082 \times 10^{-9}$ 11th surface K = 0.000
$A_4 = -2.10850 \times 10^{-5}$
$A_6 = 2.70967 \times 10^{-7}$
$A_8 = -2.81874 \times 10^{-8}$
$A_{10} = 1.84433 \times 10^{-10}$ -continued 12th surface K = 0.000
$A_4 = 7.56637 \times 10^{-5}$
$A_6 = 1.10687 \times 10^{-8}$
$A_8 = -2.81308 \times 10^{-8}$
$A_{10} = 2.48539 \times 10^{-10}$ 16th surface K = 0.000
$A_4 = -1.12645 \times 10^{-4}$
$A_6 = -2.80056 \times 10^{-6}$
$A_8 = 1.50577 \times 10^{-7}$
$A_{10} = 1.84171 \times 10^{-9}$ Zooming Data (∞)

|  | WE | ST | TE |
|---|---|---|---|
| f (mm) | 5.93 | 18.59 | 45.22 |
| $F_{NO}$ | 2.83 | 3.85 | 4.12 |
| 2ω (°) | 64.29 | 21.40 | 8.91 |
| $d_4$ | 1.05 | 14.21 | 23.57 |
| $d_8$ | 23.52 | 10.36 | 0.99 |
| $d_{10}$ | 7.40 | 1.09 | 0.80 |
| $d_{15}$ | 4.76 | 10.32 | 12.87 |
| $d_{17}$ | 5.39 | 6.14 | 3.88 |

EXAMPLE 5

| | | | |
|---|---|---|---|
| $r_1 = 10000.000$ | $d_1 = 1.22$ | $n_{d1} = 1.84666$ | $\nu_{d1} = 23.78$ |
| $r_2 = 54.315$ | $d_2 = 2.28$ | $n_{d2} = 1.48749$ | $\nu_{d2} = 70.23$ |
| $r_3 = -168.262$ | $d_3 = 0.15$ | | |
| $r_4 = 17.458$ (Aspheric) | $d_4 = 3.92$ | $n_{d3} = 1.51633$ | $\nu_{d3} = 64.14$ |
| $r_5 = -80.401$ (Aspheric) | $d_5 =$ (Variable) | | |
| $r_6 = -41.373$ | $d_6 = 0.85$ | $n_{d4} = 1.74320$ | $\nu_{d4} = 49.34$ |
| $r_7 = 5.913$ (Aspheric) | $d_7 = 2.74$ | | |
| $r_8 = -18.988$ | $d_8 = 0.63$ | $n_{d5} = 1.69680$ | $\nu_{d5} = 55.53$ |
| $r_9 = -2001.711$ | $d_9 = 1.44$ | $n_{d6} = 1.92286$ | $\nu_{d6} = 20.88$ |
| $r_{10} = -32.133$ | $d_{10} =$ (Variable) | | |
| $r_{11} = \infty$ (Stop) | $d_{11} = 0.98$ | | |
| $r_{12} = 119.255$ | $d_{12} = 1.27$ | $n_{d7} = 1.66680$ | $\nu_{d7} = 33.05$ |
| $r_{13} = -37.684$ | $d_{13} = 11.00$ | | |
| $r_{14} = \infty$ (HPP) | $d_{14} =$ (Variable) | | |
| $r_{15} = 11.075$ (Aspheric) | $d_{15} = 4.48$ | $n_{d8} = 1.49700$ | $\nu_{d8} = 81.61$ |
| $r_{16} = -12.821$ (Aspheric) | $d_{16} = 0.15$ | | |
| $r_{17} = -48.898$ | $d_{17} = 0.75$ | $n_{d9} = 1.88300$ | $\nu_{d9} = 40.76$ |
| $r_{18} = 22.800$ | $d_{18} = 1.79$ | $n_{d10} = 1.67270$ | $\nu_{d10} = 32.10$ |
| $r_{19} = -1864.706$ | $d_{19} =$ (Variable) | | |
| $r_{20} = 14.504$ | $d_{20} = 3.12$ | $n_{d11} = 1.49700$ | $\nu_{d11} = 81.61$ |
| $r_{21} = -24.900$ | $d_{21} = 0.70$ | $n_{d12} = 1.90366$ | $\nu_{d12} = 31.31$ |
| $r_{22} = 12.079$ | $d_{22} =$ (Variable) | | |
| $r_{23} = 20.827$ | $d_{23} = 2.71$ | $n_{d13} = 1.58313$ | $\nu_{d13} = 59.46$ |
| $r_{24} = -21.022$ (Aspheric) | $d_{24} =$ (Variable) | | |
| $r_{25} = \infty$ | $d_{25} = 0.85$ | $n_{d14} = 1.54771$ | $\nu_{d14} = 62.84$ |
| $r_{26} = \infty$ | $d_{26} = 0.50$ | | |
| $r_{27} = \infty$ | $d_{27} = 0.50$ | $n_{d15} = 1.51633$ | $\nu_{d15} = 64.14$ |
| $r_{28} = \infty$ | $d_{28} = 0.60$ | | |
| $r_{29} = \infty$ (Imaging plane) | | | |

Aspherical Coefficients

4th surface

K = 0.000
$A_4 = -1.76939 \times 10^{-5}$
$A_6 = 1.02257 \times 10^{-7}$

-continued $A_8 = -4.28415 \times 10^{-10}$
$A_{10} = -2.96963 \times 10^{-11}$

5th surface $K = 0.000$
$A_4 = 3.87596 \times 10^{-6}$
$A_6 = 3.06743 \times 10^{-7}$
$A_8 = -5.34413 \times 10^{-9}$
$A_{10} = 5.29943 \times 10^{-12}$ 7th surface $K = 0.000$
$A_4 = -6.92555 \times 10^{-4}$
$A_6 = -3.29478 \times 10^{-6}$
$A_8 = -2.53249 \times 10^{-9}$
$A_{10} = -2.34006 \times 10^{-8}$ 15th surface $K = 0.000$
$A_4 = -1.30651 \times 10^{-4}$
$A_6 = 1.26048 \times 10^{-6}$
$A_8 = -2.17108 \times 10^{-8}$
$A_{10} = -8.42116 \times 10^{-13}$ 16th surface $K = 0.000$
$A_4 = 1.23948 \times 10^{-4}$
$A_6 = 1.55067 \times 10^{-6}$
$A_8 = -1.91419 \times 10^{-8}$
$A_{10} = 2.70402 \times 10^{-12}$ 24th surface $K = 0.000$
$A_4 = 1.03984 \times 10^{-4}$
$A_6 = -5.60430 \times 10^{-7}$
$A_8 = -1.90947 \times 10^{-8}$
$A_{10} = 4.68567 \times 10^{-10}$

| Zooming Data ($\infty$) | | | |
|---|---|---|---|
| | WE | ST | TE |
| f (mm) | 5.93 | 18.63 | 58.25 |
| $F_{NO}$ | 3.33 | 3.78 | 5.18 |
| 2ω (°) | 64.05 | 21.38 | 7.07 |
| $d_5$ | 0.52 | 10.75 | 17.93 |
| $d_{10}$ | 13.77 | 3.68 | 0.51 |
| $d_{14}$ | 8.65 | 1.17 | 0.99 |
| $d_{19}$ | 0.61 | 4.10 | 7.05 |
| $d_{22}$ | 3.80 | 5.21 | 11.91 |
| $d_{24}$ | 8.71 | 11.28 | 1.80 |

EXAMPLE 6

| | | | |
|---|---|---|---|
| $r_1 = 653.204$ | $d_1 = 1.26$ | $n_{d1} = 1.84666$ | $\nu_{d1} = 23.78$ |
| $r_2 = 43.561$ | $d_2 = 3.37$ | $n_{d2} = 1.48749$ | $\nu_{d2} = 70.23$ |
| $r_3 = -210.296$ | $d_3 = 0.15$ | | |
| $r_4 = 18.151$ (Aspheric) | $d_4 = 4.62$ | $n_{d3} = 1.62299$ | $\nu_{d3} = 58.12$ |
| $r_5 = -145.174$ (Aspheric) | $d_5 =$ (Variable) | | |
| $r_6 = -92.644$ | $d_6 = 0.90$ | $n_{d4} = 1.80610$ | $\nu_{d4} = 40.92$ |
| $r_7 = 5.852$ (Aspheric) | $d_7 = 2.86$ | | |
| $r_8 = -24.154$ | $d_8 = 0.60$ | $n_{d5} = 1.88300$ | $\nu_{d5} = 40.76$ |
| $r_9 = 16.994$ | $d_9 = 1.95$ | $n_{d6} = 1.92286$ | $\nu_{d6} = 20.88$ |
| $r_{10} = -712.410$ | $d_{10} =$ (Variable) | | |
| $r_{11} = \infty$ (Stop) | $d_{11} = 1.00$ | | |
| $r_{12} = -601.720$ | $d_{12} = 1.19$ | $n_{d7} = 1.80518$ | $\nu_{d7} = 25.42$ |
| $r_{13} = -33.661$ | $d_{13} = 10.30$ | | |
| $r_{14} = \infty$ (HPP) | $d_{14} =$ (Variable) | | |
| $r_{15} = 13.760$ (Aspheric) | $d_{15} = 7.78$ | $n_{d8} = 1.61881$ | $\nu_{d8} = 63.85$ |
| $r_{16} = -12.950$ | $d_{16} = 0.70$ | $n_{d9} = 1.90366$ | $\nu_{d9} = 31.31$ |
| $r_{17} = 86.120$ | $d_{17} = 0.15$ | | |
| $r_{18} = 16.484$ | $d_{18} = 2.85$ | $n_{d10} = 1.58423$ | $\nu_{d10} = 30.49$ |
| $r_{19} = -28.611$ (Aspheric) | $d_{19} =$ (Variable) | | |
| $r_{20} = 19.360$ | $d_{20} = 2.96$ | $n_{d11} = 1.48749$ | $\nu_{d11} = 70.44$ |
| $r_{21} = -21.122$ | $d_{21} = 0.73$ | $n_{d12} = 2.00069$ | $\nu_{d12} = 25.46$ |
| $r_{22} = 18.596$ | $d_{22} =$ (Variable) | | |
| $r_{23} = 27.717$ (Aspheric) | $d_{23} = 2.87$ | $n_{d13} = 1.52542$ | $\nu_{d13} = 55.78$ |
| $r_{24} = -14.958$ (Aspheric) | $d_{24} =$ (Variable) | | |
| $r_{25} = \infty$ | $d_{25} = 0.85$ | $n_{d14} = 1.54771$ | $\nu_{d14} = 62.84$ |
| $r_{26} = \infty$ | $d_{26} = 0.50$ | | |
| $r_{27} = \infty$ | $d_{27} = 0.50$ | $n_{d15} = 1.51633$ | $\nu_{d15} = 64.14$ |
| $r_{28} = \infty$ | $d_{28} = 0.60$ | | |
| $r_{29} = \infty$ (Imaging plane) | | | |

Aspherical Coefficients

4th surface $K = 0.000$
$A_4 = 5.07069 \times 10^{-7}$
$A_6 = -1.07496 \times 10^{-7}$
$A_8 = -2.84760 \times 10^{-10}$
$A_{10} = 1.57752 \times 10^{-12}$ 5th surface $K = 0.000$
$A_4 = 2.50503 \times 10^{-5}$
$A_6 = -2.66972 \times 10^{-7}$
$A_8 = 1.18662 \times 10^{-9}$
$A_{10} = -1.69886 \times 10^{-12}$ 7th surface $K = 0.000$
$A_4 = -4.89796 \times 10^{-4}$
$A_6 = -5.38468 \times 10^{-6}$
$A_8 = -2.51002 \times 10^{-9}$
$A_{10} = -1.67791 \times 10^{-8}$ 15th surface $K = 0.000$
$A_4 = 3.28920 \times 10^{-5}$
$A_6 = 1.13870 \times 10^{-6}$
$A_8 = -1.30908 \times 10^{-8}$
$A_{10} = 1.67483 \times 10^{-10}$ 19th surface $K = 0.000$
$A_4 = 1.74075 \times 10^{-4}$
$A_6 = 2.01408 \times 10^{-6}$
$A_8 = -3.08884 \times 10^{-8}$
$A_{10} = 4.92822 \times 10^{-10}$ 23th surface $K = 0.000$
$A_4 = -4.08561 \times 10^{-4}$
$A_6 = 1.38541 \times 10^{-6}$
$A_8 = -1.40860 \times 10^{-7}$
$A_{10} = -3.27813 \times 10^{-10}$ 24th surface $K = 0.000$
$A_4 = -2.49782 \times 10^{-4}$
$A_6 = 8.61175 \times 10^{-7}$
$A_8 = -1.05973 \times 10^{-7}$
$A_{10} = -2.81721 \times 10^{-11}$

| Zooming Data ($\infty$) | | | |
|---|---|---|---|
| | WE | ST | TE |
| f (mm) | 4.75 | 14.68 | 46.38 |
| $F_{NO}$ | 3.46 | 3.99 | 4.99 |
| 2ω (°) | 79.46 | 27.08 | 8.95 |
| $d_5$ | 0.51 | 9.56 | 16.39 |
| $d_{10}$ | 13.48 | 4.67 | 0.98 |
| $d_{14}$ | 9.18 | 1.25 | 0.95 |
| $d_{19}$ | 1.39 | 5.16 | 9.55 |

-continued

| | | | |
|---|---|---|---|
| $d_{22}$ | 4.63 | 6.67 | 9.63 |
| $d_{24}$ | 6.17 | 8.29 | 1.25 |

EXAMPLE 7

| | | | |
|---|---|---|---|
| $r_1 = 633.665$ | $d_1 = 1.22$ | $n_{d1} = 1.84666$ | $\nu_{d1} = 23.78$ |
| $r_2 = 50.330$ | $d_2 = 2.80$ | $n_{d2} = 1.48749$ | $\nu_{d2} = 70.23$ |
| $r_3 = -80.739$ | $d_3 = 0.15$ | | |
| $r_4 = 19.524$ (Aspheric) | $d_4 = 3.17$ | $n_{d3} = 1.58913$ | $\nu_{d3} = 61.28$ |
| $r_5 = 14313.525$ (Aspheric) | $d_5 =$ (Variable) | | |
| $r_6 = -229.738$ | $d_6 = 0.84$ | $n_{d4} = 1.74320$ | $\nu_{d4} = 49.34$ |
| $r_7 = 7.215$ (Aspheric) | $d_7 = 2.69$ | | |
| $r_8 = -16.087$ | $d_8 = 0.78$ | $n_{d5} = 1.72916$ | $\nu_{d5} = 54.68$ |
| $r_9 = 23.566$ | $d_9 = 1.56$ | $n_{d6} = 1.92286$ | $\nu_{d6} = 20.88$ |
| $r_{10} = 365.979$ | $d_{10} =$ (Variable) | | |
| $r_{11} = \infty$ (Stop) | $d_{11} = 1.00$ | | |
| $r_{12} = 98.169$ | $d_{12} = 1.22$ | $n_{d7} = 1.83481$ | $\nu_{d7} = 42.71$ |
| $r_{13} = -58.012$ | $d_{13} = 10.30$ | | |
| $r_{14} = \infty$ (HPP) | $d_{14} =$ (Variable) | | |
| $r_{15} = 10.954$ (Aspheric) | $d_{15} = 4.87$ | $n_{d8} = 1.49700$ | $\nu_{d8} = 81.61$ |
| $r_{16} = -10.658$ (Aspheric) | $d_{16} = 0.15$ | | |
| $r_{17} = -24.588$ | $d_{17} = 0.75$ | $n_{d9} = 1.88300$ | $\nu_{d9} = 40.76$ |
| $r_{18} = 31.642$ | $d_{18} = 1.97$ | $n_{d10} = 1.67270$ | $\nu_{d10} = 32.10$ |
| $r_{19} = -45.379$ | $d_{19} =$ (Variable) | | |
| $r_{20} = 29.701$ | $d_{20} = 3.06$ | $n_{d11} = 1.49700$ | $\nu_{d11} = 81.61$ |
| $r_{21} = -14.406$ | $d_{21} = 0.70$ | $n_{d12} = 1.90366$ | $\nu_{d12} = 31.31$ |
| $r_{22} = 20.241$ | $d_{22} =$ (Variable) | | |
| $r_{23} = 88.742$ (Aspheric) | $d_{23} = 2.54$ | $n_{d13} = 1.58313$ | $\nu_{d13} = 59.46$ |
| $r_{24} = -13.428$ (Aspheric) | $d_{24} =$ (Variable) | | |
| $r_{25} = \infty$ | $d_{25} = 0.85$ | $n_{d14} = 1.54771$ | $\nu_{d14} = 62.84$ |
| $r_{26} = \infty$ | $d_{26} = 0.50$ | | |
| $r_{27} = \infty$ | $d_{27} = 0.50$ | $n_{d15} = 1.51633$ | $\nu_{d15} = 64.14$ |
| $r_{28} = \infty$ | $d_{28} = 0.60$ | | |
| $r_{29} = \infty$ (Imaging plane) | | | |

Aspherical Coefficients

4th surface

K = 0.000
$A_4 = -3.72162 \times 10^{-6}$
$A_6 = -8.21416 \times 10^{-8}$
$A_8 = -7.59290 \times 10^{-10}$
$A_{10} = -3.86636 \times 10^{-12}$ 5th surface K = 0.000
$A_4 = 6.32385 \times 10^{-6}$
$A_6 = -1.23106 \times 10^{-7}$
$A_8 = -7.39925 \times 10^{-10}$
$A_{10} = 9.42069 \times 10^{-13}$ 7th surface K = 0.000
$A_4 = -1.94793 \times 10^{-4}$
$A_6 = 2.03756 \times 10^{-6}$
$A_8 = -4.21904 \times 10^{-8}$
$A_{10} = -2.05749 \times 10^{-9}$ 15th surface K = 0.148
$A_4 = -1.53405 \times 10^{-4}$
$A_6 = 1.14566 \times 10^{-6}$
$A_8 = -2.68332 \times 10^{-8}$
$A_{10} = -6.55570 \times 10^{-10}$ 16th surface K = 0.000
$A_4 = 1.88758 \times 10^{-4}$
$A_6 = 2.90402 \times 10^{-6}$
$A_8 = -8.02417 \times 10^{-8}$
$A_{10} = 2.85326 \times 10^{-10}$ 23th surface K = 0.000
$A_4 = -2.31264 \times 10^{-4}$
$A_6 = 8.09133 \times 10^{-6}$
$A_8 = -4.77171 \times 10^{-7}$
$A_{10} = 1.29270 \times 10^{-8}$ 24th surface K = 0.000
$A_4 = -1.02238 \times 10^{-4}$
$A_6 = 4.65634 \times 10^{-6}$
$A_8 = -3.32015 \times 10^{-7}$
$A_{10} = 9.70259 \times 10^{-9}$ Zooming Data ($\infty$)

| | WE | ST | TE |
|---|---|---|---|
| f (mm) | 5.92 | 17.67 | 57.19 |
| $F_{NO}$ | 3.50 | 3.95 | 5.14 |
| $2\omega$ (°) | 67.35 | 22.80 | 7.28 |
| $d_5$ | 0.56 | 10.49 | 18.34 |
| $d_{10}$ | 15.49 | 5.33 | 1.03 |
| $d_{14}$ | 8.02 | 0.83 | 0.94 |
| $d_{19}$ | 1.40 | 4.31 | 8.92 |
| $d_{22}$ | 3.94 | 4.89 | 10.61 |
| $d_{24}$ | 8.80 | 12.12 | 1.69 |

EXAMPLE 8

| | | | |
|---|---|---|---|
| $r_1 = 673.793$ | $d_1 = 1.30$ | $n_{d1} = 1.84666$ | $\nu_{d1} = 23.78$ |
| $r_2 = 52.632$ | $d_2 = 2.77$ | $n_{d2} = 1.48749$ | $\nu_{d2} = 70.23$ |
| $r_3 = -106.741$ | $d_3 = 0.15$ | | |
| $r_4 = 20.563$ (Aspheric) | $d_4 = 3.26$ | $n_{d3} = 1.58913$ | $\nu_{d3} = 61.28$ |
| $r_5 = -393.064$ (Aspheric) | $d_5 =$ (Variable) | | |
| $r_6 = -165.505$ | $d_6 = 0.90$ | $n_{d4} = 1.74320$ | $\nu_{d4} = 49.34$ |
| $r_7 = 7.887$ (Aspheric) | $d_7 = 2.98$ | | |
| $r_8 = -19.686$ | $d_8 = 0.83$ | $n_{d5} = 1.77250$ | $\nu_{d5} = 49.60$ |
| $r_9 = 19.904$ | $d_9 = 1.71$ | $n_{d6} = 1.92286$ | $\nu_{d6} = 20.88$ |
| $r_{10} = 212.774$ | $d_{10} =$ (Variable) | | |
| $r_{11} = \infty$ (Stop) | $d_{11} = 1.00$ | | |
| $r_{12} = 142.798$ | $d_{12} = 1.33$ | $n_{d7} = 1.60311$ | $\nu_{d7} = 60.64$ |
| $r_{13} = -30.008$ | $d_{13} = 11.00$ | | |
| $r_{14} = \infty$ (HPP) | $d_{14} =$ (Variable) | | |
| $r_{15} = 13.668$ (Aspheric) | $d_{15} = 4.51$ | $n_{d8} = 1.49700$ | $\nu_{d8} = 81.61$ |
| $r_{16} = -14.634$ (Aspheric) | $d_{16} = 0.15$ | | |
| $r_{17} = -68.494$ | $d_{17} = 0.85$ | $n_{d9} = 1.83481$ | $\nu_{d9} = 42.71$ |
| $r_{18} = 33.935$ | $d_{18} = 1.70$ | $n_{d10} = 1.67270$ | $\nu_{d10} = 32.10$ |
| $r_{19} = -201.057$ | $d_{19} =$ (Variable) | | |
| $r_{20} = 27.102$ | $d_{20} = 3.57$ | $n_{d11} = 1.49700$ | $\nu_{d11} = 81.61$ |
| $r_{21} = -13.854$ | $d_{21} = 0.78$ | $n_{d12} = 1.90366$ | $\nu_{d12} = 31.31$ |
| $r_{22} = 25.010$ | $d_{22} =$ (Variable) | | |
| $r_{23} = 154.360$ (Aspheric) | $d_{23} = 2.67$ | $n_{d13} = 1.58913$ | $\nu_{d13} = 61.28$ |
| $r_{24} = -13.456$ (Aspheric) | $d_{24} =$ (Variable) | | |
| $r_{25} = \infty$ | $d_{25} = 0.85$ | $n_{d14} = 1.54771$ | $\nu_{d14} = 62.84$ |
| $r_{26} = \infty$ | $d_{26} = 0.50$ | | |
| $r_{27} = \infty$ | $d_{27} = 0.50$ | $n_{d15} = 1.51633$ | $\nu_{d15} = 64.14$ |
| $r_{28} = \infty$ | $d_{28} = 0.60$ | | |
| $r_{29} = \infty$ (Imaging plane) | | | |

-continued

Aspherical Coefficients

4th surface

K = 0.000
$A_4 = 1.31074 \times 10^{-6}$
$A_6 = -7.65863 \times 10^{-8}$
$A_8 = -2.61029 \times 10^{-10}$
$A_{10} = 1.36136 \times 10^{-12}$ 5th surface K = 0.000
$A_4 = 1.31905 \times 10^{-5}$
$A_6 = -1.45275 \times 10^{-7}$
$A_8 = 4.13701 \times 10^{-10}$
$A_{10} = -9.48730 \times 10^{-14}$ 7th surface K = 0.000
$A_4 = -1.79208 \times 10^{-4}$
$A_6 = 4.85330 \times 10^{-6}$
$A_8 = -2.03327 \times 10^{-7}$
$A_{10} = 2.13211 \times 10^{-9}$ 15th surface K = -0.054
$A_4 = -1.06426 \times 10^{-4}$
$A_6 = 1.35813 \times 10^{-6}$
$A_8 = -2.53397 \times 10^{-8}$
$A_{10} = -2.47379 \times 10^{-10}$ 16th surface K = 0.000
$A_4 = 4.18820 \times 10^{-5}$
$A_6 = 1.96264 \times 10^{-6}$
$A_8 = -4.33068 \times 10^{-8}$
$A_{10} = 0$ 23th surface K = 0.000
$A_4 = -1.83225 \times 10^{-4}$
$A_6 = 7.52358 \times 10^{-6}$
$A_8 = -1.22202 \times 10^{-7}$
$A_{10} = 3.29718 \times 10^{-9}$ 24th surface K = 0.000
$A_4 = -5.69683 \times 10^{-5}$
$A_6 = 5.02624 \times 10^{-6}$
$A_8 = -8.57219 \times 10^{-8}$
$A_{10} = 3.13423 \times 10^{-9}$ Zooming Data (∞)

|  | WE | ST | TE |
|---|---|---|---|
| f (mm) | 6.32 | 18.30 | 60.99 |
| $F_{NO}$ | 3.56 | 3.99 | 5.50 |
| 2ω (°) | 67.21 | 23.37 | 7.33 |
| $d_5$ | 0.59 | 10.85 | 19.15 |
| $d_{10}$ | 15.45 | 5.17 | 1.10 |
| $d_{14}$ | 9.32 | 1.43 | 1.00 |
| $d_{19}$ | 1.39 | 4.54 | 8.82 |
| $d_{22}$ | 3.84 | 5.62 | 12.13 |
| $d_{24}$ | 9.25 | 12.22 | 1.85 |

EXAMPLE 9

| | | | |
|---|---|---|---|
| $r_1 = 633.665$ | $d_1 = 1.22$ | $n_{d1} = 1.84666$ | $\nu_{d1} = 23.78$ |
| $r_2 = 50.904$ | $d_2 = 2.71$ | $n_{d2} = 1.48749$ | $\nu_{d2} = 70.23$ |
| $r_3 = -97.884$ | $d_3 = 0.15$ | | |
| $r_4 = 20.036$ (Aspheric) | $d_4 = 3.27$ | $n_{d3} = 1.58913$ | $\nu_{d3} = 61.28$ |
| $r_5 = -424.570$ (Aspheric) | $d_5$ = (Variable) | | |

-continued

| | | | |
|---|---|---|---|
| $r_6 = -154.607$ | $d_6 = 0.85$ | | |
| $r_7 = 7.037$ (Aspheric) | $d_7 = 3.13$ | $n_{d4} = 1.74320$ | $\nu_{d4} = 49.34$ |
| $r_8 = -13.249$ | $d_8 = 0.65$ | $n_{d5} = 1.72916$ | $\nu_{d5} = 54.68$ |
| $r_9 = -400.246$ | $d_9 = 1.44$ | $n_{d6} = 1.92286$ | $\nu_{d6} = 20.88$ |
| $r_{10} = -31.893$ | $d_{10}$ = (Variable) | | |
| $r_{11} = \infty$ (Stop) | $d_{11} = 0.99$ | | |
| $r_{12} = -2601.620$ | $d_{12} = 1.14$ | $n_{d7} = 1.90366$ | $\nu_{d7} = 31.31$ |
| $r_{13} = -48.956$ | $d_{13} = 11.00$ | | |
| $r_{14} = \infty$ (HPP) | $d_{14}$ = (Variable) | | |
| $r_{15} = 11.696$ (Aspheric) | $d_{15} = 4.30$ | $n_{d8} = 1.49700$ | $\nu_{d8} = 81.61$ |
| $r_{16} = -13.542$ (Aspheric) | $d_{16} = 0.15$ | | |
| $r_{17} = -186.492$ | $d_{17} = 0.75$ | $n_{d9} = 1.88300$ | $\nu_{d9} = 40.76$ |
| $r_{18} = 18.191$ | $d_{18} = 1.76$ | $n_{d10} = 1.67270$ | $\nu_{d10} = 32.10$ |
| $r_{19} = 88.947$ | $d_{19}$ = (Variable) | | |
| $r_{20} = 13.139$ | $d_{20} = 3.44$ | $n_{d11} = 1.49700$ | $\nu_{d11} = 81.61$ |
| $r_{21} = -22.439$ | $d_{21} = 0.70$ | $n_{d12} = 1.90366$ | $\nu_{d12} = 31.31$ |
| $r_{22} = 12.447$ | $d_{22}$ = (Variable) | | |
| $r_{23} = 37.219$ | $d_{23} = 2.40$ | $n_{d13} = 1.58913$ | $\nu_{d13} = 61.28$ |
| $r_{24} = -15.857$ (Aspheric) | $d_{24}$ = (Variable) | | |
| $r_{25} = \infty$ | $d_{25} = 0.85$ | $n_{d14} = 1.54771$ | $\nu_{d14} = 62.84$ |
| $r_{26} = \infty$ | $d_{26} = 0.50$ | | |
| $r_{27} = \infty$ | $d_{27} = 0.50$ | $n_{d15} = 1.51633$ | $\nu_{d15} = 64.14$ |
| $r_{28} = \infty$ | $d_{28} = 0.60$ | | |
| $r_{29} = \infty$ (Imaging plane) | | | |

Aspherical Coefficients

4th surface

K = 0.000
$A_4 = -5.42983 \times 10^{-6}$
$A_6 = 1.38492 \times 10^{-8}$
$A_8 = -1.14651 \times 10^{-10}$
$A_{10} = -1.84230 \times 10^{-11}$ 5th surface K = 0.000
$A_4 = 4.72650 \times 10^{-6}$
$A_6 = 8.65089 \times 10^{-8}$
$A_8 = -2.41488 \times 10^{-9}$
$A_{10} = -1.57422 \times 10^{-12}$ 7th surface K = 0.000
$A_4 = -2.92122 \times 10^{-4}$
$A_6 = 4.31976 \times 10^{-6}$
$A_8 = -2.28965 \times 10^{-7}$
$A_{10} = 3.36891 \times 10^{-10}$ 15th surface K = 0.597
$A_4 = -1.90173 \times 10^{-4}$
$A_6 = 1.68973 \times 10^{-6}$
$A_8 = -4.82919 \times 10^{-8}$
$A_{10} = -2.13859 \times 10^{-11}$ 16th surface K = 0.000
$A_4 = 9.02659 \times 10^{-5}$
$A_6 = 2.98286 \times 10^{-6}$
$A_8 = -7.15741 \times 10^{-8}$
$A_{10} = 4.04396 \times 10^{-10}$ 24th surface K = 0.000
$A_4 = 1.14189 \times 10^{-4}$
$A_6 = -4.67268 \times 10^{-6}$
$A_8 = 1.49193 \times 10^{-7}$
$A_{10} = -1.97043 \times 10^{-9}$ -continued

| Zooming Data (∞) | | | |
|---|---|---|---|
| | WE | ST | TE |
| f (mm) | 5.93 | 17.72 | 57.17 |
| $F_{NO}$ | 3.29 | 3.74 | 5.12 |
| 2ω (°) | 66.47 | 22.63 | 7.27 |
| $d_5$ | 0.53 | 10.81 | 18.72 |
| $d_{10}$ | 15.11 | 4.51 | 0.49 |
| $d_{14}$ | 8.16 | 1.50 | 1.00 |
| $d_{19}$ | 0.71 | 4.07 | 8.96 |
| $d_{22}$ | 4.36 | 4.96 | 10.54 |
| $d_{24}$ | 8.85 | 11.58 | 1.57 |

EXAMPLE 10

$r_1 = 653.204$    $d_1 = 1.22$    $n_{d1} = 1.84666$    $v_{d1} = 23.78$
$r_2 = 45.090$    $d_2 = 2.75$    $n_{d2} = 1.48749$    $v_{d2} = 70.23$
$r_3 = -1318.530$    $d_3 = 0.15$
$r_4 = 17.489$ (Aspheric)    $d_4 = 3.89$    $n_{d3} = 1.58913$    $v_{d3} = 61.28$
$r_5 = -89.343$ (Aspheric)    $d_5 = $ (Variable)
$r_6 = -69.566$    $d_6 = 0.85$    $n_{d4} = 1.74320$    $v_{d4} = 49.34$
$r_7 = 5.831$ (Aspheric)    $d_7 = 3.24$
$r_8 = -17.167$    $d_8 = 0.65$    $n_{d5} = 1.72916$    $v_{d5} = 54.68$
$r_9 = 36.171$    $d_9 = 1.67$    $n_{d6} = 1.92286$    $v_{d6} = 20.88$
$r_{10} = -70.564$    $d_{10} = $ (Variable)
$r_{11} = \infty$ (Stop)    $d_{11} = 0.99$
$r_{12} = 270.431$    $d_{12} = 1.22$    $n_{d7} = 1.80610$    $v_{d7} = 40.92$
$r_{13} = -40.685$    $d_{13} = 10.30$
$r_{14} = \infty$ (HPP)    $d_{14} = $ (Variable)
$r_{15} = 10.699$ (Aspheric)    $d_{15} = 5.20$    $n_{d8} = 1.49700$    $v_{d8} = 81.61$
$r_{16} = -9.876$ (Aspheric)    $d_{16} = 0.30$
$r_{17} = -17.644$    $d_{17} = 0.75$    $n_{d9} = 1.88300$    $v_{d9} = 40.76$
$r_{18} = 43.893$    $d_{18} = 1.92$    $n_{d10} = 1.67270$    $v_{d10} = 32.10$
$r_{19} = -34.846$    $d_{19} = $ (Variable)
$r_{20} = 24.139$    $d_{20} = 3.18$    $n_{d11} = 1.49700$    $v_{d11} = 81.61$
$r_{21} = -14.346$    $d_{21} = 0.70$    $n_{d12} = 1.90366$    $v_{d12} = 31.31$
$r_{22} = 20.703$    $d_{22} = $ (Variable)
$r_{23} = 78.738$ (Aspheric)    $d_{23} = 2.44$    $n_{d13} = 1.58313$    $v_{d13} = 59.46$
$r_{24} = -13.952$ (Aspheric)    $d_{24} = $ (Variable)
$r_{25} = \infty$    $d_{25} = 0.85$    $n_{d14} = 1.54771$    $v_{d14} = 62.84$
$r_{26} = \infty$    $d_{26} = 0.50$
$r_{27} = \infty$    $d_{27} = 0.50$    $n_{d15} = 1.51633$    $v_{d15} = 64.14$
$r_{28} = \infty$    $d_{28} = 0.60$
$r_{29} = \infty$ (Imaging plane)

Aspherical Coefficients

4th surface $K = 0.000$
$A_4 = -1.16015 \times 10^{-5}$
$A_6 = -4.58545 \times 10^{-8}$
$A_8 = -3.84761 \times 10^{-10}$
$A_{10} = -3.35581 \times 10^{-12}$ 5th surface $K = 0.000$
$A_4 = 1.33373 \times 10^{-5}$
$A_6 = -4.99311 \times 10^{-8}$
$A_8 = -5.87507 \times 10^{-10}$
$A_{10} = 1.02292 \times 10^{-12}$ 7th surface $K = 0.000$
$A_4 = -5.20765 \times 10^{-4}$
$A_6 = -2.71776 \times 10^{-6}$
$A_8 = -1.24289 \times 10^{-7}$
$A_{10} = -1.36863 \times 10^{-8}$ 15th surface $K = -0.134$
$A_4 = -1.02927 \times 10^{-4}$
$A_6 = 1.88604 \times 10^{-6}$
$A_8 = -3.12601 \times 10^{-8}$
$A_{10} = -5.20707 \times 10^{-10}$ 16th surface $K = 0.000$
$A_4 = 2.18544 \times 10^{-4}$
$A_6 = 4.30526 \times 10^{-6}$
$A_8 = -1.07154 \times 10^{-7}$
$A_{10} = 6.47450 \times 10^{-10}$ 23th surface $K = 0.000$
$A_4 = -4.32618 \times 10^{-4}$
$A_6 = 2.38110 \times 10^{-5}$
$A_8 = -1.34005 \times 10^{-6}$
$A_{10} = 2.83017 \times 10^{-8}$ 24th surface $K = 0.000$
$A_4 = -2.89557 \times 10^{-4}$
$A_6 = 1.99791 \times 10^{-5}$
$A_8 = -1.10217 \times 10^{-6}$
$A_{10} = 2.24820 \times 10^{-8}$

| Zooming Data (∞) | | | |
|---|---|---|---|
| | WE | ST | TE |
| f (mm) | 5.45 | 16.62 | 52.65 |
| $F_{NO}$ | 3.45 | 3.90 | 4.99 |
| 2ω (°) | 71.40 | 24.07 | 7.92 |
| $d_5$ | 0.51 | 9.94 | 16.76 |
| $d_{10}$ | 14.78 | 5.07 | 1.03 |
| $d_{14}$ | 8.04 | 1.00 | 0.94 |
| $d_{19}$ | 1.38 | 4.23 | 8.75 |
| $d_{22}$ | 3.93 | 4.95 | 9.98 |
| $d_{24}$ | 8.25 | 11.41 | 1.93 |

FIGS. 11 to 20 are aberration diagrams indicative of spherical aberration (SA), astigmatism (AS), distortion (DT) and chromatic aberration of magnification (CC) at the wide-angle ends (a), in the intermediate states (b) and at the telephoto ends (c) of Examples 1 to 10, respectively, upon focusing on an infinite object point, with "ω" standing for a half angle of view.

The values of conditions (1) and (2) in Examples 5 to 10 are given below.

| | Ex. 1 | Ex. 2 | Ex. 3 | Ex. 4 | Ex. 5 | Ex. 6 |
|---|---|---|---|---|---|---|
| (1) $f_t/f_2$ | −8.72 | −8.97 | −9.00 | −8.90 | −8.03 | −8.96 |
| (2) $f_t/f_{tg12}$ | −1.19 | −1.42 | −1.39 | −1.34 | −1.15 | −1.32 |

By the way, an antireflection coating is generally applied to the air contact surface of a lens for the purpose of preventing ghosts and flares. At the cementing surface of a cemented lens, on the other hand, the refractive index of an adhesive material is much higher than that of air; in most cases, the cementing surface has a reflectivity that is on a par with or lower than that of a single layer coating, so that there is little need of applying the antireflection coating to it. However, if the antireflection coating is intentionally applied to the cementing surface too, there are then further reductions achievable in ghosts and flares, which could in turn make sure images of better quality.

Especially in recent years, vitreous materials having high refractive indices have gained popularity, and they have often been used with camera optical systems for the reasons of their enhanced effect on correction of aberrations. When a high-refractive-index vitreous material is used as a cemented lens, the reflection of light off the cementing surface would also be not negligible. In such a case, it would be particularly effective to have an antireflection coating applied on the cementing surface.

Effective use of cementing surface coating is disclosed in JP(A)'s 2-27301, 2001-324676 and 2005-92115 and U.S. Pat. No. 7,116,482, etc. In those publications, there is the particular mention of the cementing lens surface coating in the first lens group of the zoom lens having positive power at the foremost lens group. In the examples of the invention, too, it goes without saying that the cementing surface coating on the basis of the same idea takes effect.

Depending on the refractive index of the lens involved and the refractive index of the adhesive material used, use may be made of coating materials of relatively high refractive index such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ as well as coating materials of relatively low refractive index such as $MgF_2$, $SiO_2$, and $Al_2O_3$. These coating materials may then have a suitable thickness selected in such a way as to meet phase conditions.

As a matter of course, the cementing surface coating may just as well be multi-coating as is the case with the coating to the air contact surface of the lens. By optional combinations of two- or multi-layer coating materials with thicknesses, it is possible to achieve a further lowering of reflectivity, and control the spectral and angle properties of reflectivity, etc.

On the base of a similar idea, cementing surface coating can effectively be applied to lens cementing surfaces other than those in the first lens group, too.

Figure 21A:
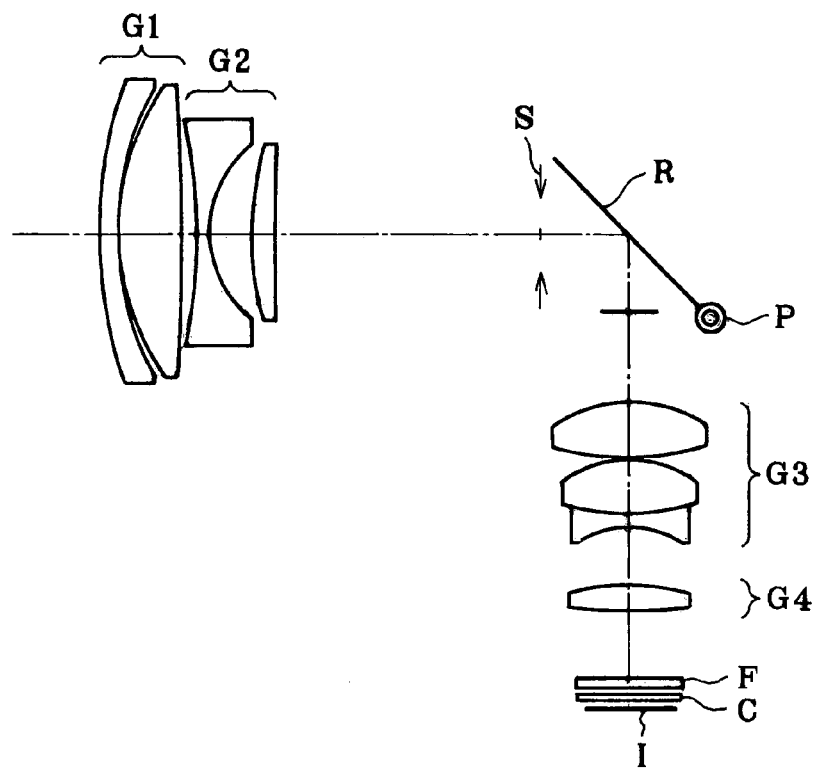
FIG. 21 is illustrative in section of one example of how to tuck away the inventive bent type zoom optical system in an associated lens mount.
Figure 21B:
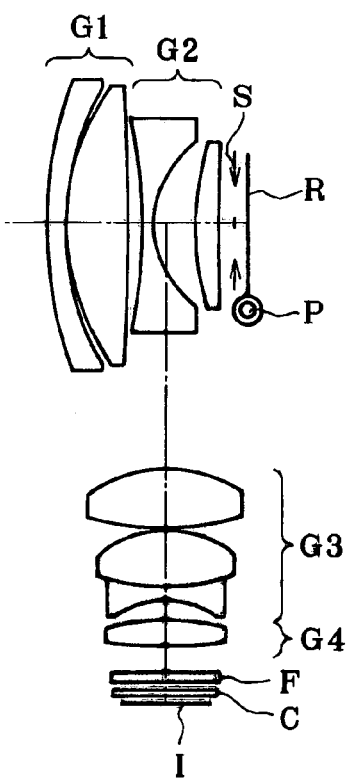

One example of the reflecting mirror arrangement for bending the optical axis of such an inventive bent type zoom optical system as described above through 90° at the time of taking operation and the mode of how to tuck away the lens groups in a space left open by moving back the reflecting mirror is shown in FIG. 21 with reference to Example 2. FIG. 21(a) is a sectional view, including the optical axis, of the optical system of Example 2 at the time of taking operation, and FIG. 21(b) is a sectional view of that optical system when the reflecting mirror is tucked away in the space left open upon the lens groups moved back. At the time of taking operation here, as shown in FIG. 21(a), a reflecting mirror R is rotated counterclockwise about a fixed pivotal axis P for insertion into the optical axis through the first G1 and the second lens group G2 between the aperture stop S and the third lens group G3 at an angle of 45° with respect to that optical axis so that the third G3 and the fourth lens group G4 are located in the optical axis in such a way as to be movable along the optical axis bent down at right angles by the reflecting mirror R. And then, an optical low-pass filter F, a cover glass C and the image plane I of CCD are fixed on the image side of the fourth lens group G4.

When the bent type zoom optical system is not in use or tucked away in an associated mechanical housing, as shown in FIG. 21(b), the reflecting mirror R is rotated clockwise about the pivotal axis P and moved back away from the optical axis in such a way that the normal to the reflecting mirror R is nearly parallel with the optical axis through the first G1 and the second lens group G2, and the aperture stop S, the second G2 and the first lens group G1 are moved along the optical axis in such a way as to draw near to the moved-back reflecting mirror R, whereby the bent type zoom optical system can be slimmed down in the direction of the axis of incidence of light. And then, to enlarge a space between the reflecting mirror R at the time of taking operation and the next lens group (the third lens group G3) thereby making sure a space for tucking away mechanical parts such as a lens frame, the third G3 and the fourth lens group G4 are allowed to close in on the optical low-pass filter F.

Reference is then made to FIG. 22 illustrative of one exemplary construction for tucking away such an inventive bent type zoom optical system. More specifically, FIG. 22(a) is a sectional view f the optical system at the time of taking operation, and FIG. 22(b) is a sectional view of that optical system tucked away in place. FIG. 22(c) is an enlarged view of a split nut portion encircled in FIG. 22(b) in the fourth lens frame.

The first lens group G1 and the second lens group G2 are held by the first lens frame 11 and the second lens frame 12, respectively. The aperture stop S that remains fixed at the time of taking operation is located on the lower side of the inside surface of a coupler frame 14. Just below the fixed stop S there is a pivotal lever 16 located that comprises a torsion spring mounted on an outer frame 15 and a support shaft and includes a pivotal shaft P, and the reflecting mirror R is joined to that pivotal lever 16. The first lens frame 11 and the second lens frame 12 as well as a cam frame 13 and the coupler frame 14 are coupled to a motor not shown.

There is also a key provided that guides the first lens frame 11 and the second lens frame 12 along the optical axis direction. To bring the optical axis through the first lens group G1 in alignment with the optical axis through the second lens group G2, a part of the inner periphery of the first lens frame 11 and a part of the outer periphery of the second lens frame 12 are in engagement. And, to maintain the state shown in FIG. 22(a) so that the first lens frame 11 is prevented from popping out of the cam frame 13, the first lens frame 11 is kept against movement in the optical axis direction.

Also, to bring the optical axis through the second lens group G2 in alignment with the optical axis through the aperture stop S provided on the inner periphery of the coupler frame 14, a part of the outer surface of the second lens frame 12 and a part of the inside surface of the cam frame 13 are in engagement.

Further, to bring the center of the cam frame 13 in alignment with the optical axis through the reflecting mirror R mounted on the outer frame 15, a part of the outside surface of the cam frame 13 and a part of the inside surface of the coupler frame 14 are in engagement. Thus, the optical axis through the first G1 and the second lens group G2 is constantly in alignment with the optical axis through the aperture stop S.

And, the axis of light incident from the object side is bent about 90° by the reflecting mirror R on the side of the imaging device with respect to the second lens group G2, entering the third lens group G3. On the side of the outer frame 15 there is an opening formed vertically to the optical axis through the third lens group G3. Further, between the third lens group G3 and the imaging device D, there is the fourth lens group G4 positioned that moves by itself in the optical axis direction.

The rotation of the rotor shaft of the aforesaid motor transmits via a screw to the engagements so that the first lens frame 11, the second lens frame 12 and the aperture stop S move along the key shaft. Note here that the drive motor for moving the first lens frame 11 and the second lens frame 12 along the key shaft and the drive motor for moving the coupler frame 14 to which the aperture stop S is mounted along the guide may be separately provided.

At the time from tucking away to taking operation or from taking operation to tucking away and in the state where the third G3 and the fourth lens group G4 move through the opening in the outer frame 15 to the side of the imaging device D, the coupler frame 14 moves down. While images are being taken, the third G3 and the fourth lens group G4 may be positioned on the side of the imaging device D with respect to the opening. Further, a part of the inside of the coupler frame 14 abuts upon the pivotal lever 16, the coupler frame 14 moves further down, and the motor stops with an energizing force applied to the pivotal shaft P of the pivotal lever 16.

The foregoing are a series of operations of the zoom lens (zoom optical system) from taking operation to tucking away. At the time from tucking away to taking operation, the drive shaft of the motor is reversely rotated to kick off movement of the coupler frame 14, so that the first lens frame 11, the second lens frame 12 and the aperture stop S come out of the lens mount, ready for taking operation. In synchronization with the outer frame 15 moving up from the upper surface of the opening, the third G3 and the fourth lens group G4 move to a given position for taking operation. As the first G1 and the second lens group G2 stop at the desired position for taking operation, the optical system is readied up for taking operation. The technique similar to this operating arrangement is shown in FIG. 1 of Patent Publication 8.

The relations between the third lens group G3 and the third lens frame 17 and the fourth lens group G4 and the fourth lens frame 18 are now explained.

A cam pin 19 is integral with the outer peripheral side of the third lens frame 17, and the end of this cam pin 19 is going to engage within a given cam groove. Further, there are integral arms provided, that have holes through which guide shafts 21 are inserted and supported. Accordingly, the third lens frame 17 is supported by two parallel guide shafts 21 so that it moves by a cam frame 20 in the optical axis direction.

The fourth lens frame 18 is supported by the hole through which one guide shaft 21 is inserted and supported and a threaded shaft 22. A projection of a split nut 23 having a coil spring 24 is going to engage a nut in threaded mesh with the threaded shaft 22 that is the rotary shaft of an AF motor M. This ensures that as AF motor M rotates, the split nut 23 moves in a direction along the optical axis. Actually, the AF motor M and the guide shaft for the threaded shaft 22 or the like are disposed on the taking operation side with respect to the bottom of the outer frame 15.

The transition from taking operation to tucking away is now explained. The third lens frame 17 that supports the third lens group G3 is positioned on the inner side of the outer frame 15, and the fourth G4 and the third lens group G3 moves to the side of the imaging device D, after which it stops. It is here noted that the rotation of the cam frame 20 that drives the cam pin 19 on the third lens frame 17 is transmitted by the power of a transmission gear (not shown) located between it and the coupler frame 14. Upon the start of movement, the coupler frame 14 moves down after the third lens frame 17 moves left from the outer frame 15; both frames 14 and 17 do not hit each other. Alternatively, a motor may be independently provided for direct connection of the cam frame 20 to the motor.

Figure 23A:
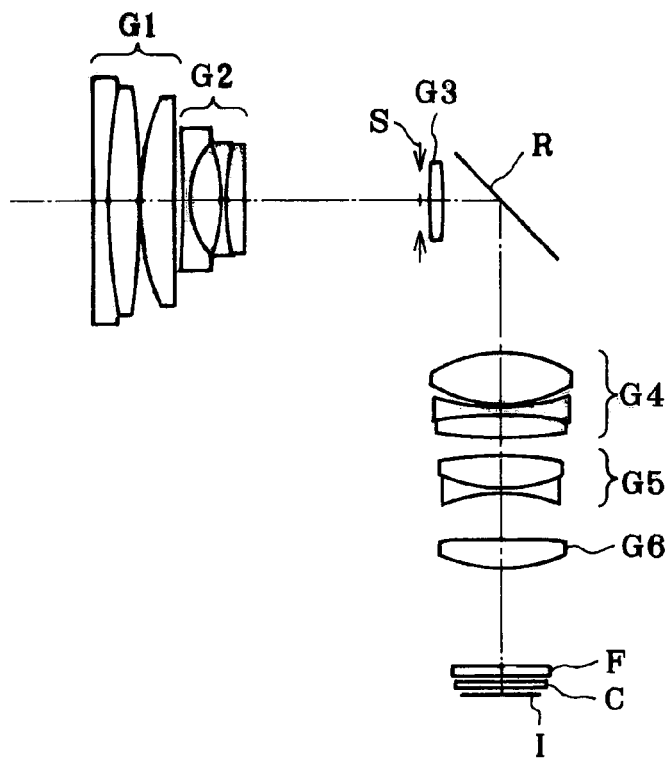
FIG. 23 is illustrative in section of the bent type zoom optical system of Example 7 with the optical path bent 90° at the wide-angle end (a) and the telephoto end (c).
Figure 23B:
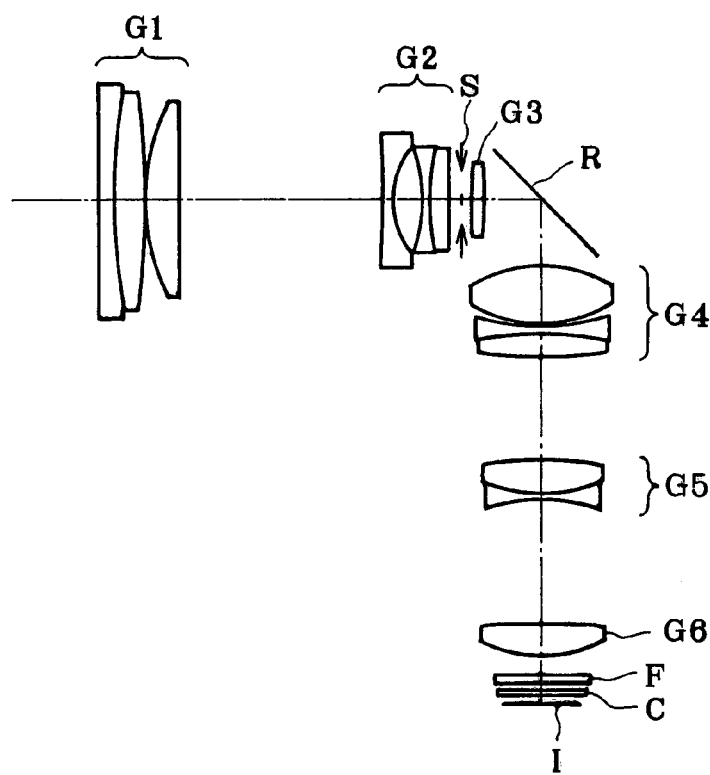

Another example of the reflecting mirror arrangement for bending the optical axis of the inventive bent type zoom optical system through 90° at the time of taking operation and the mode of how to tuck away the lens groups in a space left open by moving back the reflecting mirror is shown in FIG. 23 with reference to Example 7. FIG. 23 is illustrative in section of the bent type zoom optical system of Example 7 at the wide-angle end (a) and the telephoto end (c), wherein the surface reflecting mirror R for bending the optical axis 90° between the third G3 and the fourth lens group G4 is disposed at an angle of 45° with the optical axis. The same will hold for other bent type zoom optical systems of Examples 5 and 6, and 8, 9 and 10.

Figure 24A:
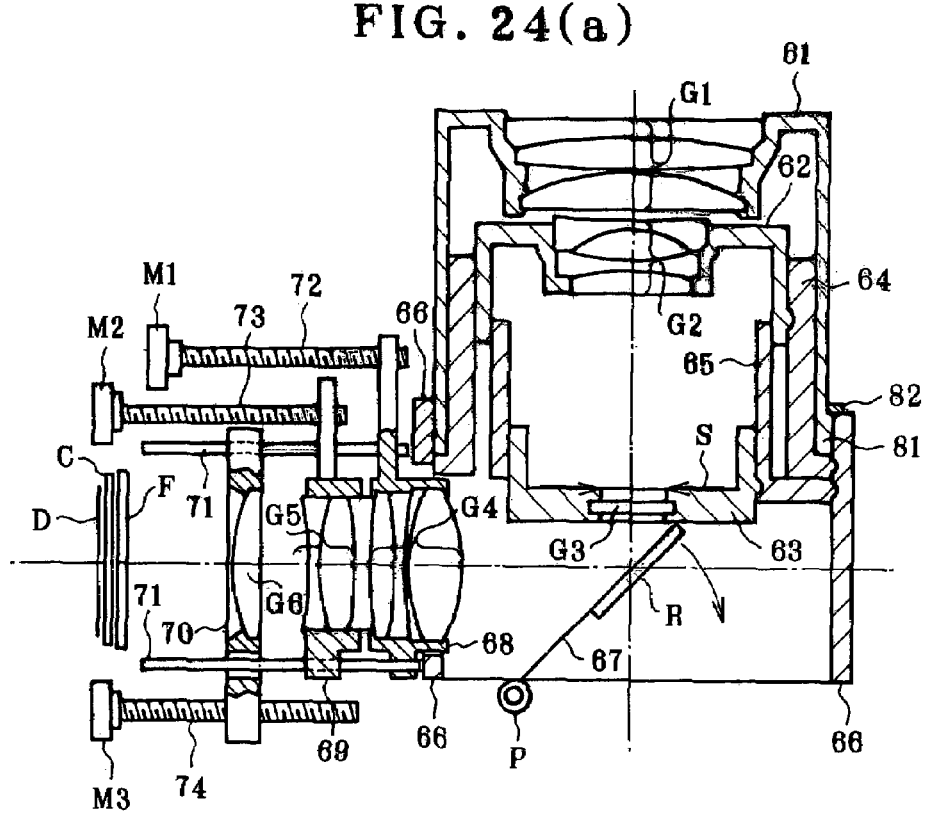
FIG. 24 is illustrative of another example of the mechanical setup for tucking away the inventive bent type zoom optical system in an associated lens mount.
Figure 24B:
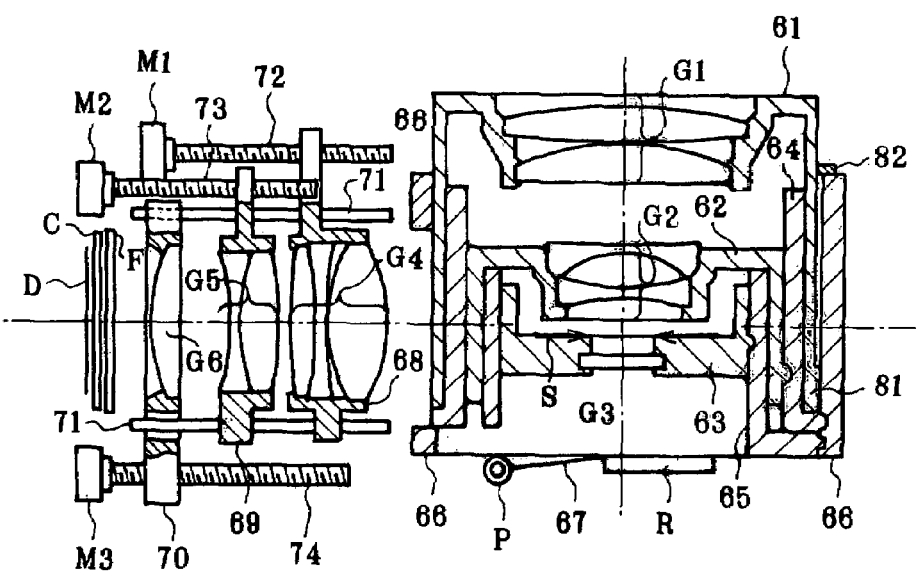

FIG. 24 is illustrative of another example of the mechanical setup for tucking away the inventive bent type zoom optical system in the lens mount, wherein such surface reflecting mirror R is disposed. FIG. 24(*a*) is a sectional view of the optical system at the time of taking operation, and FIG. 24(*b*) is a sectional view of the optical system at the time of being tucked away in the lens mount.

From outside to inside about the optical axis, the first lens frame 61, the first cam frame 64, the second lens frame 62, the second cam frame 65 and the third lens frame 63 are concentrically in engagement. The first G1, the second G2, and the third lens group G3 are held by the first 61, the second 62, and the third lens frame 63, respectively. The aperture stop S is held by the third lens frame 63. And the first G1, the second G2 and the third lens group G3 are each provided with a key for guiding and moving it in the optical axis direction.

A part of the outer periphery of the lower end of the first cam frame 64 and a part of the outer periphery of the lower end of the second cam frame 65 are in engagement with a part of the inner periphery of an outer frame 66, and a cam pin on the outer periphery of the lower end of each is in engagement within a cam groove in the inner periphery of the outer frame 66.

Further, a stopper piece 82 is bonded onto the upper surface of the outer frame 66 by means of an UV curing type adhesive, and there is a projection 81 provided at the lower portion of the first lens frame 61.

The first lens frame 61 moves in the optical axis direction following movement of the first cam frame 64 in the optical axis direction.

A cam pin located on the outer periphery of the second lens frame 62 is in engagement within a cam groove in the inner periphery of the first cam frame 64.

Likewise, a cam pin located on the outer periphery of the third lens frame 63 is in engagement within a cam groove in the inner periphery of the second cam frame 65.

Thus, in association with the rotation of the first cam frame 64, the first 61 and the second lens frame 62 move axially in a given orbit, and in association with the rotation of the second cam frame 65, the third lens frame 63 moves to a given position in the optical axis direction. And to get hold of the state shown in FIG. 24(*a*) or prevent the first lens frame 61 from popping out of the first cam frame 64 and the outer frame 66, the projection 81 on the first lens frame 61 abuts upon the stopper piece 82 on the outer frame 66 so that it is kept against movement.

The first 64 and the second cam frame 65 are coupled to a motor not shown.

Just below the third lens frame 63 there is a pivotal arm 67 located that comprises a torsion spring mounted on an outer frame 66 and a support shaft and includes a pivotal shaft P, and the reflecting mirror R is joined to that pivotal lever 67.

And the axis of light incident from the object side is bent about 90° by the reflecting mirror R on the imaging device side of the third lens group G3, entering the fourth lens group G4. On the side of the outer frame 66 there is an opening located vertically to the optical axis through the fourth lens group G4. Further between the fourth lens group G4 and the imaging device D, there are the fifth G5 and the sixth lens group G6 located, each moving by itself in the optical axis direction.

The rotation of the rotary shaft of the aforesaid motor transmits via a screw to the engagements so that the first e 61, the second 62 and the third lens frame 63 move along the key shaft. Note here that the drive motor for moving the first lens frame 61 and the second lens frame 62 along the key shaft and the drive motor for moving the third lens frame 63 along the key shaft to a given position may be separately provided.

At the time from tucking away to taking operation or from taking operation to tucking away and in the state where the fourth G4, the fifth G5 and the sixth lens group G6 move through the opening in the outer frame 66 to the side of the imaging device D, the first 64 and the second cam frame 65 move down. While images are being taken, the fourth G4, the fifth G5 and the sixth lens group G6 may be positioned on the side of the imaging device D with respect to the opening. Further, a part of the inside of the second cam frame 65 abuts upon the pivotal lever 67, the second cam frame 65 moves further down, and the motor stops with an energizing force applied to the pivotal shaft P of the pivotal lever 67.

The foregoing are a series of operations of the zoom lens (zoom optical system) from taking operation to tucking away. At the time from tucking away to taking operation, the drive shaft of the motor is reversely rotated to kick off movement of the first 64 and the second cam frame 65, so that the first 61, the second 62 and the third lens frame 63 come out of the lens mount, ready for taking operation. In synchronization with the outer frame 66 moving up from the upper surface of the opening, the fourth G4, the fifth G5 and the sixth lens group G6 move to a given position for taking operation. As the first G1, the second G2 and the third lens group G3 stop at the desired position for taking operation, the optical system is readied up for taking operation. The technique similar to this operating arrangement is shown in FIG. 1 of Patent Publication 8.

The relations between the fourth lens group G4 and the fourth lens frame 68, the fifth lens group G5 and the fifth lens frame 69, and the sixth lens group G6 and the sixth lens frame 70 are now explained.

The fourth lens frame 68 is supported by a hole through which one of guide shafts 71 is inserted and supported and a threaded shaft 72 that is the rotor shaft of a motor M1. This ensures that as the motor M1 rotates, it causes the fourth lens frame 68 to move in a direction along the optical axis.

The fifth 69 and the sixth lens frame 70 are supported by a hole through which one of the guide shafts 71 is inserted and supported and threaded shafts 73, 74 that are the rotor shafts of motors M2 and M3. This ensures that as the motors M2 and M3 rotate, it causes the fifth 69 and the sixth lens frame 70 to move in a direction along the optical axis.

The transition from taking operation to tucking away is now explained. The fourth lens frame 68 that supports the fourth lens group G4, the fifth lens frame 69 that supports the fifth lens group G5 and the sixth lens frame 70 that supports the sixth lens group G6 move to the side of the imaging device D, after which they stop. Upon the start of movement, the fourth lens frame 68 moves left from the outer frame 66, and then the first lens frame 61, the first cam frame 64, etc. move down, so that they do not hit one upon another.

Next, a digital camera with the inventive bent type zoom optical system (zoom lens) incorporated in it is explained.

Figure 25:
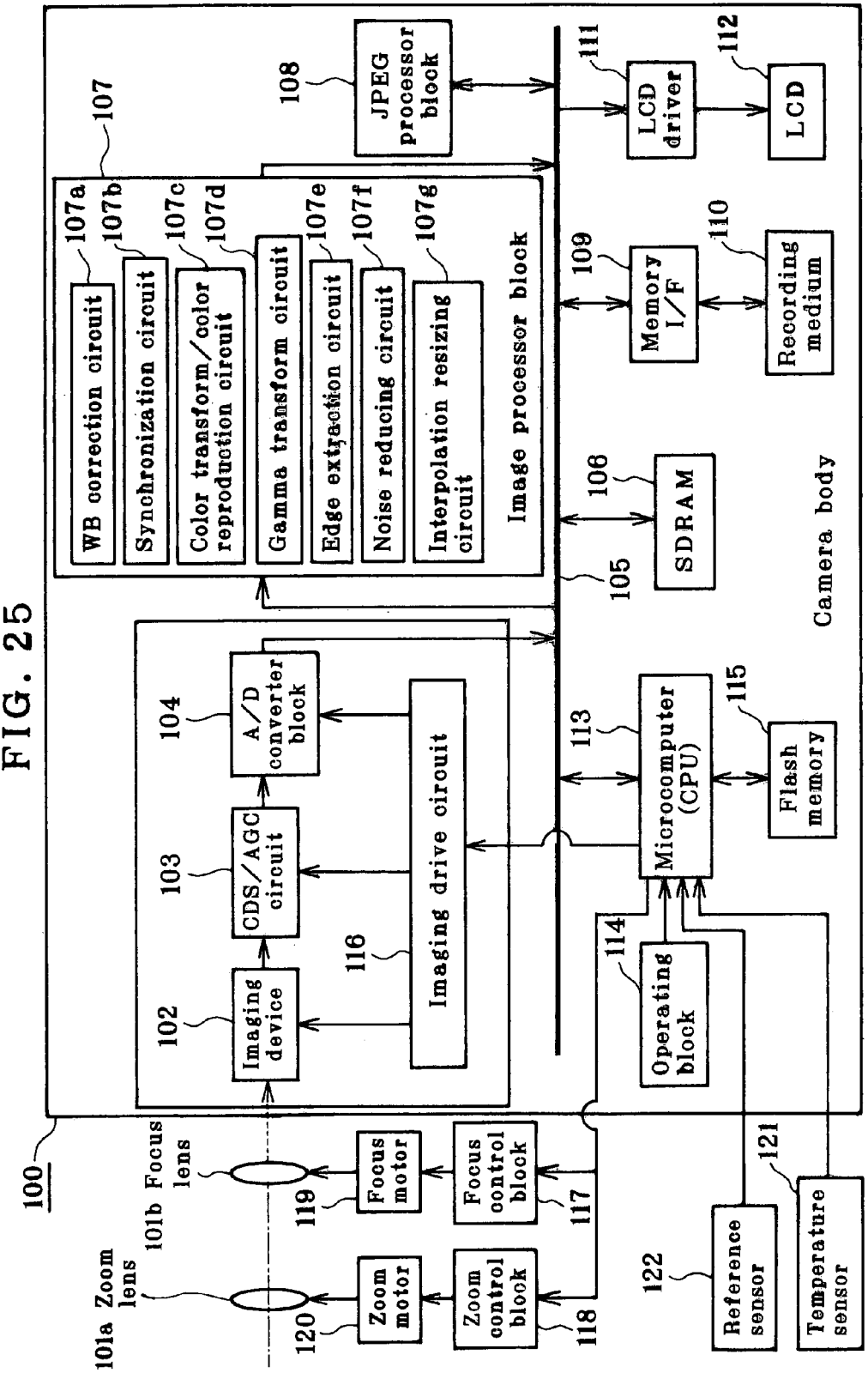
FIG. 25 is a block diagram of internal circuits in the main part of the digital camera with the inventive bent type zoom optical system built in it.

FIG. 25 is a block diagram for the internal circuits of the main part of such digital camera 40. Reference is now made to FIG. 25. There is an imaging device 102 provided, in which color filters in a Bayer array are arranged on the front surface of photodiodes defining pixels. An imaging drive circuit 116 is activated in response to an order from a microcomputer (CPU) 113. The imaging drive circuit 116 is built up of a CDS/AFC circuit comprising a CDS (correlated double sampling) for reducing a noise component and an AGC (automatic gain control) for stabilizing a signal level, and an A/D converter block for converting analog electric signals into digital electric signals.

At the imaging device 102, an object image formed via a zoom lens 101*a* and a focus lens 101*b* that form together a taking optical system is received at a photo-diode defined by each pixel. In the zoom lenses of Examples 1 to 4, it is noted that the fourth lens group G4 of each zoom lens constitutes the focus lens 101*b* as shown in FIGS. 1-4, and in the zoom lenses of Examples 5-10, it is noted that the sixth lens group G6 of each zoom lens constitutes the focus lens 101*b* as shown in FIG. 5-10. Then, photoelectric conversion is applied to the object image to produce the quantity of light to the CDS/AGC circuit 103 as the quantity of charges. The Bayer array here is a pixel array wherein lines each having R pixels and G (Gr) pixels alternately in the horizontal direction and lines each having G (Gr) pixels and B pixels alternately in the horizontal direction are lined up alternately in the vertical direction. It is noted that the imaging device 102 may operate in either a CMOS mode or a CCD mode. Although not illustrated, the imaging drive circuit 116 including a timing generator for driving the imaging device, CDS/AGC circuit 103 and A/D converter block 104 are each constructed of an AFE (analog front end circuit) IC device.

Suppose here that the imaging device 102 can be driven in multiple modes at least involving a pixel addition read mode and a full pixel addition read mode. The pixel addition read mode is a drive mode adapted to read a plurality of adjacent pixels after the addition of their charges, while the full pixel addition read mode is a drive mode adapted to read all charges out of the effective pixels of the imaging device.

The CDS (correlated double sampling)/AGC (auto gain control) circuit 103 applies waveform shaping to electric signals (analog image signals) read out of the imaging device 102 after reducing noises, etc., and further achieves high gain in such a way that the brightness of the image becomes the desired one. The A/D converter block 104 is adapted to convert the analog image signals pre-processed at the CDS/AGC circuit 103 into digital image signals (hereinafter called the image data).

A bus 105 is a transfer path for transferring various data produced within the camera to the respective parts of the camera, and is connected to the A/D converter block 104, SDRAM 106, an image processor block 107, a JPEG processor block 108, a memory I/F 109, an LCD driver 111 and CPU 113. The image data garnered at A/D converter block 104 is once stored in the SDRAM 106 via the bus 105. The SDRAM 106 is adapted to temporarily store various data such as image data obtained at the A/D converter block 104, and image data processed at the image processor block 107 and JPEG processor block 108.

At the image processor block 107, the image data stored in the SDRAM 106 are read out to apply image processing to them. This image processor block 107 is constructed of a WB correction circuit 107*a*, a synchronization circuit 107*b*, a color transform/color reproduction circuit 107*c*, a gamma transform circuit 107*d*, an edge extraction circuit 107*e*, a noise reduction circuit 107*f* and an interpolation resizing circuit 107*g*.

The white balance (WB) correction circuit 107*a* multiplies R data and B data of the image data read out of the SDRAM 106 by white balance gain ordered from the CPU 113 to implement white balance correction. The synchronization circuit 107*b* generates from the image data produced out of the WB correction circuit 107*a* image data wherein three colors R, G and B constitute one pixel component. The color transform/color reproduction circuit 107*c* implements linear transform to multiply the image data produced out of the synchronization circuit 107b by a color matrix ordered from the CPU 113, thereby correcting the image data for colors, and changing the tint of the image by calculation using a color saturation·hue coefficient. The gamma transform circuit 107d applies gamma transform (tone transform) processing to the image data produced out of the color transform/color reproduction circuit 107c so that the tone of the image data is corrected in such a way as to fit for displaying or printing.

The edge extraction circuit 107e extracts the edge component of the image data using a BPF (band-pass filter) coefficient ordered from the CPU 113. The noise reducing circuit 107f working as a block for extracting information about a flat portion and reducing noises applies filtering to the image data using a filter parameter ordered from the CPU 113, thereby reducing noises in the image data. The interpolation resizing circuit 107g implements resizing for image data interpolation processing and for adjustment of output size as well.

At such image processor block 107 as described above, the image data already subjected to image processing are again stored in the SDRAM 106.

The JPEG processor block 108 reads out of the SDRAM 106 the image data to which image processing has been applied to implement compression in the JPEG or other mode. The JPEG processor block 108 has also another function of reading the JPEG compressed image data to be recorded in the recording medium 110 and apply extension processing to them. The image data compressed at the JPEG processor block 108 are stored in the SDRAM 106, and then recorded in the recording medium 110 via the memory I/F 109. Not exclusively, the recording medium 110 comprises a memory card detachably attached to the camera body.

The LCD driver 111 is to display an image on the LCD 112. When the JPEG compressed image data recorded in the recording medium 110 are displayed, the JPEG compressed image data recorded in the recording medium 110 are read at the JPEG processor block 108, and extension processing is then applied to them, after which they are once stored in the SDRAM 106. The LCD driver 111 reads such image data out of the SDRAM 106 and converts them into image signals, which are then displayed on the LCD 112.

The CPU 113 working as a co-taking block and a noise reduction assessment block has centralized control over various sequences in the camera body. The CPU 113 is connected with an operating block 114 and a flash memory 115 having a camera program and focus lens position data loaded in it. The operating block 114 comprises a power button, a release button, various enter keys, etc. As the operating block 114 is operated by the user, it allows the CPU 113 to implement various sequences depending on the operation of the operating block 114. The flash memory 115 is to store white balance gain, color matrix, and various parameters such as filter parameters. The CPU 113 reads from the flash memory 115 the parameters necessary for various sequences and issue orders to the respective processing blocks. A reference sensor 122 is to detect whether or not the focus lens 101b lies at a reference position. A temperature sensor 121 is to detect temperature and deliver the result of detection to the CPU 113.

The operating block 114 comprises buttons, switches, etc. for receiving various orders from the operator and delivering them to the CPU 113. Although not illustrated, for instance, it comprises a release button for instructing when to start shooting, a focus mode switch button for selecting an AF (autofocus means) mode/MF (manual focus means):(modes), an MF drive button for selectively moving the focus lens 101b at the time of MF mode selection, a preset button for storing and instructing the position data about the focus lens 101b, a preset value read button for reading and instructing the stored position data about the focus lens 101b, an infinity button for instructing the focus lens 101b to move to a position corresponding to infinity depending on a zoom ratio, etc.

The CPU 113 implements the camera program preloaded in the flash memory 115, thereby controlling the overall operation of this electronic camera. For instance, it implements AF processing (contrast AF processing) or the like on the basis of the contrast of a subject image.

A zoom motor 120 drives the zoom lens 101a via a zoom control block 118 comprising a drive circuit in response to an order from the CPU 113, and a focus motor 119 drives the focus lens 101b via a focus control block 117 comprising a drive circuit in response to an order from the CPU 113. It is here noted that the focus lens 101b is driven by the focus motor 119 in both the AF (autofocus) mode and the MF mode.

Figure 26A:
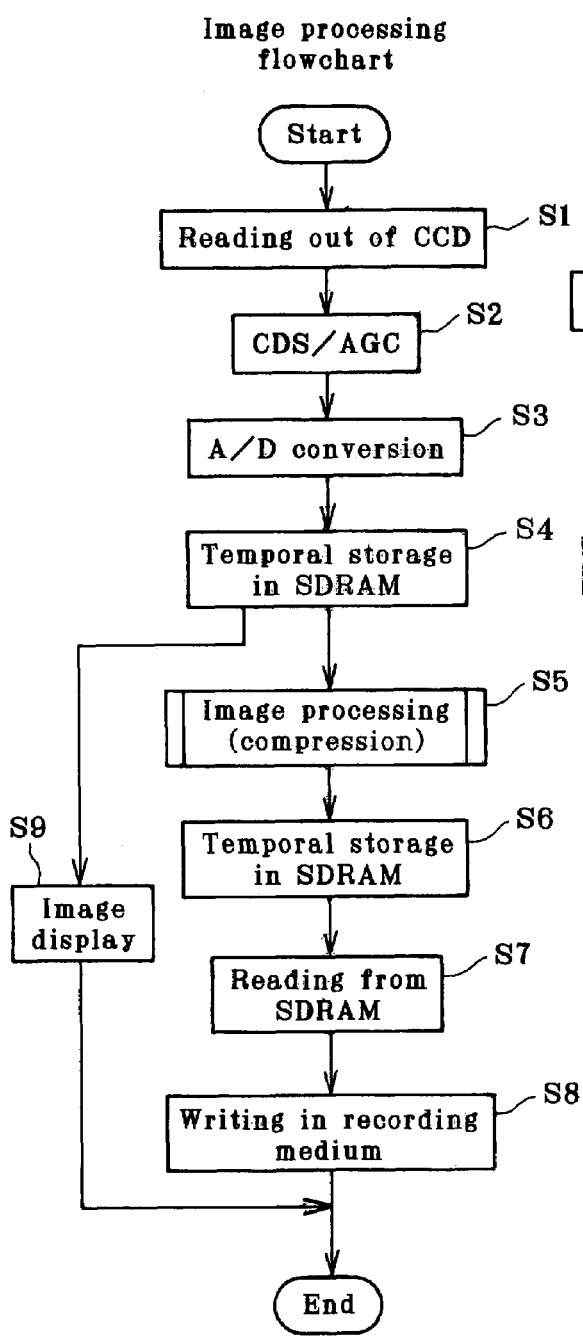
FIG. 26 is a flowchart illustrative of image storage and what is displayed and processed.
Figure 26B:
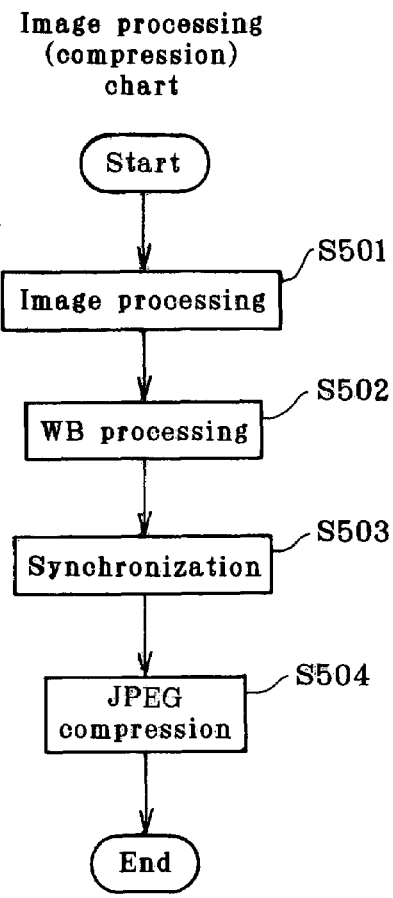

FIGS. 26(a) and 26(b) are each a flowchart of image storage and what is displayed and processed. The CPU 113 implements all operation controls on an operating program stored in the flash memory 115 in it.

The flowcharts of FIGS. 26(a) and 26(b) are now explained. As shown in FIG. 26(a), there is an imaging device provided at a step S1 wherein an object image formed by way of the zoom lens 101a and 101b that are an imaging system is received at photodiodes defined by pixels.

At step S2, the CDS/AGC circuit 103 applies waveform shaping to electric signals (analog image signals) read out of the imaging device 102 after reducing reset noises, etc., and further achieves high gain in such a way that the brightness of the image becomes the desired one. Then, at A/D conversion step S3, the analog image signals pre-processed at the CDS/AGC circuit 103 are converted into digital image signals (hereinafter called the image data). At step S4, the image data obtained at the A/D conversion step S3 are once stored in SDRAM 106 by way of the bus 105. Similarly, the LCD driver 111 reads the image data out of SDRAM 106 at step S4, then converts them into image signals, and finally displays an image on the LCD 112 at step S9.

As shown in FIG. 26(b), image processing (compression) (step S5) involves image processing (step S501), WB processing for implementing white balance correction by multiplying R data and B data of the image data read out of SDRAM 106 by white balance gain ordered from CPU 113 (step S502), synchronization step (step S503) of generating image data wherein three colors R, G and B constitute one pixel component, and JPEG compression step (step S504) of compressing image data.

At step S6, various data such as image data are temporarily stored by way of the image processing (step S501) to the image processing step (step S5) via the synchronization step (step S503).

Then, at JPEG processing step S504, the JPEG compressed image data to be recorded in the recording medium 110 are read out, and the image data compressed at the JPEG processing step S504 are stored in SDRAM 106. Then, at step S8, the image data are written in the recording medium 110 via the memory I/F 109. In this way, a series to steps are over.

One example of the camera program loaded in the flash memory 115 is now explained.

FIGS. 27(a) and 27(b) are one exemplary flowchart indicative of the contents of processing implemented when the focus lens at the focusing block is preset at a position in focus at infinity (position corresponding to infinity). In FIG. 27(a), as the power is put on (step S01), it causes initialization to be implemented (step S02). The initialization here means that when it is ascertained that none of position data in a memory that is storage means is loaded at the time the power is on, the zoom lens and focus lens go back to the reference position and the data in the memory are initialized. At step S21, whether the focus mode being selected is the MF mode or not is judged, and when the result of judgment is Yes, processing goes to step S22 whereas, when the answer is No, processing goes to step S23. It is noted that the focus mode is switched over to either the MF mode or the AF mode upon the focus mode select button operated (pressed down) by the operator, as already described.

As step S23, the release button is operated to judge whether or not the release button is pressed down to the first release position, and when the result of judgment is Yes, processing goes to step S24 whereas, when the answer is No, this step is repeated. At step S24, ordinary AF processing is implemented in the contrast AF mode shown in FIG. 27(b).

At step S25, whether or not the release button is pressed down to the second release position to issue a taking start order is judged, and when the result of judgment is Yes, processing goes to step S26 whereas, when the answer is No, this step is repeated. At step S26, AF processing is implemented to determine exposure conditions (shutter speed, aperture value, etc.). At step S27, exposure is implemented based on the exposure conditions determined at the previous step. That is, a subject image formed based on those exposure conditions is photo-electrically converted by CCD so that the aforesaid processing takes place at the imaging block to obtain image data that are digital electric signals. And then, given image processing such as compression processing is applied to those image data to record them in the memory card. In this way, the flow of processing is over.

Referring back to FIG. 27(b), at step S41, the focus lens moves down to the lower-limit position. At step S42, the focus lens moves a given unit amount up to the upper-limit position. At step S43, an image in a given area of the subject image formed on the imaging device is taken in to find the contrast value of the image in the given area. At step S44, whether or not there is a given contrast peak found during the movement of the focus lens from the lower-limit position to the way so far is judged, and when the result of judgment is Yes, processing goes to step S47 whereas, when the answer is No, processing goes to step S45. Thus, when that there is the contrast peak clearly found in the range of the lower-limit position to the upper-limit position is judged, the focus lens position at which that contrast peak is obtained is determined as a focus position so that the time taken by the detection of the focus position can be cut down. At step S45, whether or not the focus lens position is the upper-limit position is judged, and when the result of judgment is Yes, processing goes to step S46 whereas, when the answer is No, processing goes back to step S42. At step 46, when there is no clear contrast peak at the aforesaid processing step S44, the focus lens position having the highest contrast value, that is, the focus lens position having a contrast peak value is found from the contrast value found at the aforesaid processing step S43 and lying at a position for each unit amount from the lower-limit position to the upper-limit position. At step S47, the focus lens is moved to the focus lens position found at the previous step and having a contrast peak value, the flow of FIG. 27(b) is returned back, and processing goes back to FIG. 27(a). At step S25, whether or not the release button is pressed down to the second release position is judged, and the result of judgment is Yes, processing goes to step S26 whereas, when the answer is No, this step is repeated.

What I claim is:

1. A bent type zoom optical system comprising, in order from an object side thereof, a first lens group having positive refracting power, a second lens group having negative refracting power, an aperture stop, a reflecting mirror located on an image side with respect to the second lens group and adapted to bend an optical axis at substantially right angles upon taking operation, and a plurality of lens groups including a third lens group of positive refracting power and a fourth lens group of positive refracting power disposed between the reflecting mirror and an imaging plane, wherein for zooming, at least one lens group of the plurality of lens groups located on an imaging plane side with respect to the reflecting mirror moves with a varying spacing between the first lens group and the second lens group, characterized in that:

the reflecting mirror remains fixed with respect to the imaging plane upon taking operation, and upon tucked away in a lens mount, the reflecting mirror has an angle varying such that a normal to a reflecting surface is substantially parallel with an optical axis through the first lens group and the second lens group, and the first lens group and the second lens group draw near to the reflecting mirror with a narrowing space therebetween.

2. A bent type zoom optical system comprising, in order from an object side thereof, a first lens group having positive refracting power, a second lens group having negative refracting power, an aperture stop, a reflecting member located on an image side with respect to the second lens group and adapted to bend an optical axis at substantially right angles upon taking operation, and a plurality of lens groups including a third lens group of positive refracting power and a fourth lens group of positive refracting power disposed between the reflecting member and an imaging plane, wherein for zooming, at least one lens group of the plurality of lens groups located on an imaging plane side with respect to the reflecting member moves with a varying spacing between the first lens group and the second lens group, characterized in that:

the reflecting member remains fixed with respect to the imaging plane upon taking operation, and upon tucked away in a lens mount, the reflecting member moves back off an optical axis through the first lens group and the second lens group to leave open a space in which the first lens group and the second lens group are tucked away.

3. The bent type zoom optical system according to claim 1 or 2, characterized in that upon taking operation, an aperture stop is integral with the reflecting mirror or the reflecting member, or with an adjacent lens group.

4. The bent type zoom optical system according to claim 1 or 2, characterized by satisfying the following condition (A):

$$-1.2 > f_2/f_w > -3.0 \tag{A}$$

where $f_w$ is a focal length of the whole zoom optical system at a wide-angle end, and $f_2$ is a focal length of the second lens group.

5. A bent type zoom optical system comprising, in order from an object side thereof, a first lens group having positive refracting power; a second lens group negative refracting power, and producing a maximum zooming effect upon zooming; a third lens group that includes a shutter and an aperture stop, remains fixed during zooming, and has positive refracting power; a reflecting mirror for bending an optical axis at substantially right angles toward an imaging plane side of said third lens group; and at least one or more lens groups, including a fourth lens group of positive refracting power that moves on an optical axis bent by said reflecting mirror, characterized in that said second lens group is made up of a plurality of lens components including a single negative lens component; the zoom optical system characterized by satisfying the following conditions (1) and (2):

$$-10 < f_t/f_2 < -7 \quad (1)$$

$$-1.8 \leq f_t/f_{tg12} \leq -0.92 \quad (2)$$

where $f_t$ is a focal length of the whole system at a telephoto end, $f_2$ is a focal length of the second lens group, and $f_{tg12}$ is a combined focal length of the first lens group and the second lens group at the telephoto end.

6. A zoom optical system comprising, in order from an object side thereof, a first lens group having positive refracting power, a second lens group that has negative refracting power and produces a maximum zooming effect upon zooming, a third lens group that includes a shutter and an aperture stop, remains fixed during zooming and has positive refracting power, a fourth lens group having positive refracting power, a fifth lens group having negative refracting power, and a sixth lens group having positive refracting power, characterized by satisfying the following conditions (1) and (2):

$$-10 < f_t/f_2 < -7 \quad (1)$$

$$-1.8 \leq f_t/f_{tg12} \leq -0.92 \quad (2)$$

where $f_t$ is a focal length of the whole system at a telephoto end, $f_2$ is a focal length of the second lens group, and $f_{tg12}$ is a combined focal length of the first lens group and the second lens group at the telephoto end.

7. The zoom optical system according to claim 6, characterized by further comprising a reflecting mirror for bending an optical axis at substantially right angles on an imaging plane side of said third lens group.

8. The bent type zoom optical system according to claim 5, characterized in that upon tucked away in a collapsible lens mount, said first lens group, said second lens group and said third lens group move back with a narrowing spacing between adjacent lens groups while an angle of said reflecting mirror varies such that a normal to a reflecting surface is substantially parallel with the optical axis through said third lens group.

9. The bent type zoom optical system according to claim 7, characterized in that upon tucked away in a collapsible lens mount, said first lens group, said second lens group and said third lens group move back with a narrowing spacing between adjacent lens groups while an angle of said reflecting mirror varies such that a normal to a reflecting surface is substantially parallel with the optical axis through said third lens group.

10. An imaging system, characterized by comprising a bent type zoom optical system as recited in claim 5, and an imaging device located on an image side of said bent type zoom optical system for converting an optical image into electric signals.

11. The imaging system according to claim 10, characterized in that a low-pass filter is interposed between said bent type zoom optical system and said imaging device.

12. An imaging system, characterized by comprising a bent type zoom optical system as recited in claim 6, and an imaging device located on an image side of said bent type zoom optical system for converting an optical image into electric signals.

13. The imaging system according to claim 12, characterized in that a low-pass filter is interposed between said bent type zoom optical system and said imaging device.

14. A method of recording an image using a bent type zoom optical system and a recording medium, the bent type zoom optical system comprising, in order from an object side thereof: a first lens group having positive refracting power, a second lens group having negative refracting power, an aperture stop, a reflecting mirror located on an image side with respect to the second lens group and adapted to bend an optical axis at substantially right angles upon taking operation, and a plurality of lens groups including a third lens group of positive refracting power and a fourth lens group of positive refracting power disposed between the reflecting mirror and an imaging plane, wherein for zooming, at least one lens group of the plurality of lens groups located on an imaging plane side with respect to the reflecting mirror moves with a varying spacing between the first lens group and the second lens group, and wherein the reflecting mirror remains fixed with respect to the imaging plane upon taking operation, and upon tucked away in a lens mount, the reflecting mirror has an angle varying such that a normal to a reflecting surface is substantially parallel with an optical axis through the first lens group and the second lens group, and the first lens group and the second lens group draw near to the reflecting mirror with a narrowing space therebetween, the method comprising:

forming an image through the bent type zoom optical system;

wherein the image formed through the bent type zoom optical system is received at an imaging device; an image signal produced out of said imaging device is retained, then subjected to gain control and then subjected to A/D conversion; an image signal subjected to said A/D conversion is stored in a memory, after which an image signal read out of said memory is subjected to compression processing; and finally said image signal is recorded in the recording medium.

15. A method of displaying an image using a bent type zoom optical system and a display, the bent type zoom optical system comprising, in order from an object side thereof: a first lens group having positive refracting power, a second lens group having negative refracting power, an aperture stop, a reflecting mirror located on an image side with respect to the second lens group and adapted to bend an optical axis at substantially right angles upon taking operation, and a plurality of lens groups including a third lens group of positive refracting power and a fourth lens group of positive refracting power disposed between the reflecting mirror and an imaging plane, wherein for zooming, at least one lens group of the plurality of lens groups located on an imaging plane side with respect to the reflecting mirror moves with a varying spacing between the first lens group and the second lens group, and wherein the reflecting mirror remains fixed with respect to the imaging plane upon taking operation, and upon tucked away in a lens mount, the reflecting mirror has an angle varying such that a normal to a reflecting surface is substantially parallel with an optical axis through the first lens group and the second lens group, and the first lens group and the second lens group draw near to the reflecting mirror with a narrowing space therebetween, the method comprising:

forming an image through the bent type zoom optical system;

wherein the image formed through the bent type zoom optical system is received at an imaging device; an image signal produced out of said imaging device is retained, then subjected to gain control and then subjected to A/D conversion; and an image signal subjected to said A/D conversion is stored in a memory, after which the image signal is read out of said memory to display an image on the display.

16. A method for taking an image by means of a taking system including a bent type zoom optical system, the bent type zoom optical system comprising, in order from an object side thereof: a first lens group having positive refracting power, a second lens group having negative refracting power, an aperture stop, a reflecting mirror located on an image side with respect to the second lens group and adapted to bend an optical axis at substantially right angles upon taking operation, and a plurality of lens groups including a third lens group of positive refracting power and a fourth lens group of positive refracting power disposed between the reflecting mirror and an imaging plane, wherein for zooming, at least one lens group of the plurality of lens groups located on an imaging plane side with respect to the reflecting mirror moves with a varying spacing between the first lens group and the second lens group, and wherein the reflecting mirror remains fixed with respect to the imaging plane upon taking operation, and upon tucked away in a lens mount, the reflecting mirror has an angle varying such that a normal to a reflecting surface is substantially parallel with an optical axis through the first lens group and the second lens group, and the first lens group and the second lens group draw near to the reflecting mirror with a narrowing space therebetween, the method comprising:

performing an autofocus step of implementing autofocusing having an AF processing function implemented on the basis of a contrast of a subject image and a manual focus step of manually implementing focusing, wherein:

either one of said autofocus step and said manual focus step is selected, and whether or not a taking start order is issued is judged by a taking operation member, exposure conditions are determined after the taking start order is issued, and on the basis of said exposure conditions, a subject image is formed through the bent type zoom optical system and received at an imaging device.

* * * * *